(12) United States Patent
Schamp

(10) Patent No.: US 10,719,723 B2
(45) Date of Patent: Jul. 21, 2020

(54) PATH SENSING USING STRUCTURED LIGHTING

(71) Applicant: JOYSON SAFETY SYSTEMS ACQUISITION LLC, Auburn Hills, MI (US)

(72) Inventor: Gregory Gerhard Schamp, South Lyon, MI (US)

(73) Assignee: JOYSON SAFETY SYSTEMS ACQUISITION LLC, Auburn Hills, MI (US)

( * ) Notice: Subject to any disclaimer, the term of this patent is extended or adjusted under 35 U.S.C. 154(b) by 0 days.

(21) Appl. No.: 16/141,688

(22) Filed: Sep. 25, 2018

(65) Prior Publication Data

US 2020/0065594 A1    Feb. 27, 2020

Related U.S. Application Data

(63) Continuation of application No. 14/852,704, filed on Sep. 14, 2015, now Pat. No. 10,083,361, and a continuation of application No. PCT/US2014/027376, filed on Mar. 14, 2014.

(51) Int. Cl.
| | |
|---|---|
| *G06K 9/00* | (2006.01) |
| *B60R 1/00* | (2006.01) |
| *G06K 9/20* | (2006.01) |
| *G01B 11/25* | (2006.01) |
| *B60G 17/019* | (2006.01) |
| *B60K 31/00* | (2006.01) |

(52) U.S. Cl.
CPC ....... *G06K 9/00825* (2013.01); *B60G 17/019* (2013.01); *B60K 31/0008* (2013.01); *B60R 1/00* (2013.01); *G01B 11/2513* (2013.01); *G01B 11/2545* (2013.01); *G06K 9/00791* (2013.01); *G06K 9/00805* (2013.01); *G06K 9/2036* (2013.01); *B60G 2400/82* (2013.01); *B60Q 2400/50* (2013.01); *B60R 2300/10* (2013.01); *B60W 2520/16* (2013.01); *B60W 2552/05* (2020.02); *B60W 2552/35* (2020.02)

(58) Field of Classification Search
CPC ..... G01B 11/2513; G01B 11/14; G01B 11/26; G06K 9/00805; G06K 9/00791; G06K 9/00825; B60R 1/00; B60G 17/019; B60G 2400/82; B60K 31/0008
See application file for complete search history.

(56) References Cited

U.S. PATENT DOCUMENTS

| | | | |
|---|---|---|---|
| 6,285,778 B1 * | 9/2001 | Nakajima | G05D 1/0248 180/167 |
| 2008/0013790 A1 * | 1/2008 | Ihara | B60W 40/109 382/104 |

* cited by examiner

*Primary Examiner* — Obafemi O Sosanya
(74) *Attorney, Agent, or Firm* — Gordon Rees Scully; Mansukhani, LLP

(57) ABSTRACT

A structured light pattern is projected onto the path of a vehicle so as to generate a plurality of light spots, and an image thereof is captured from the vehicle. A world-space elevation of at least a portion of the light spots is responsive to a pitch angle of the vehicle determined responsive to image-space locations of down-range-separated light spots.

23 Claims, 54 Drawing Sheets

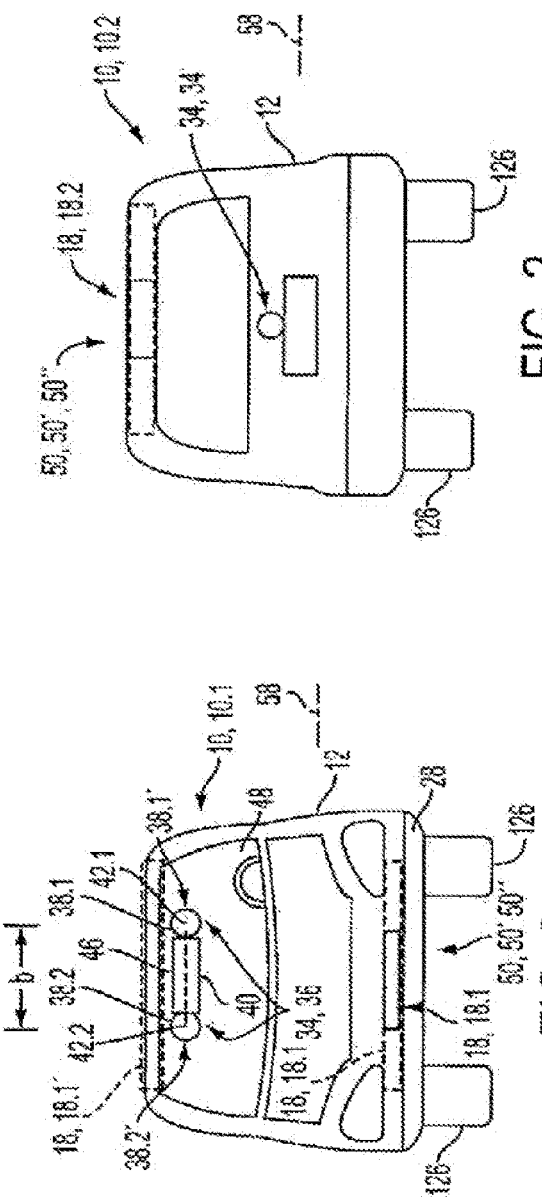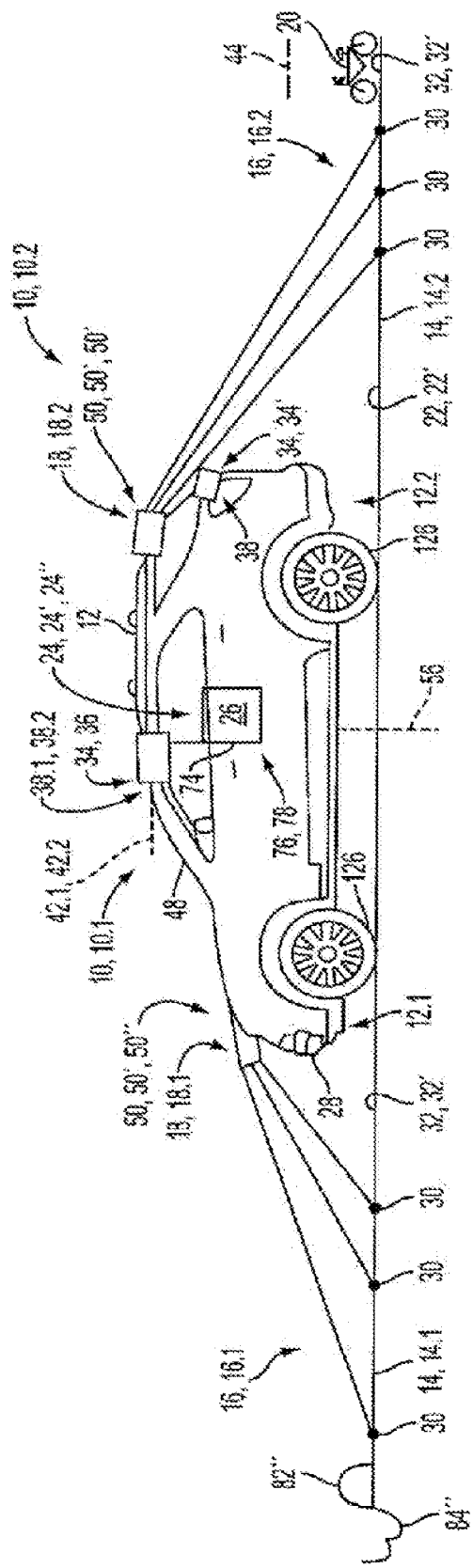

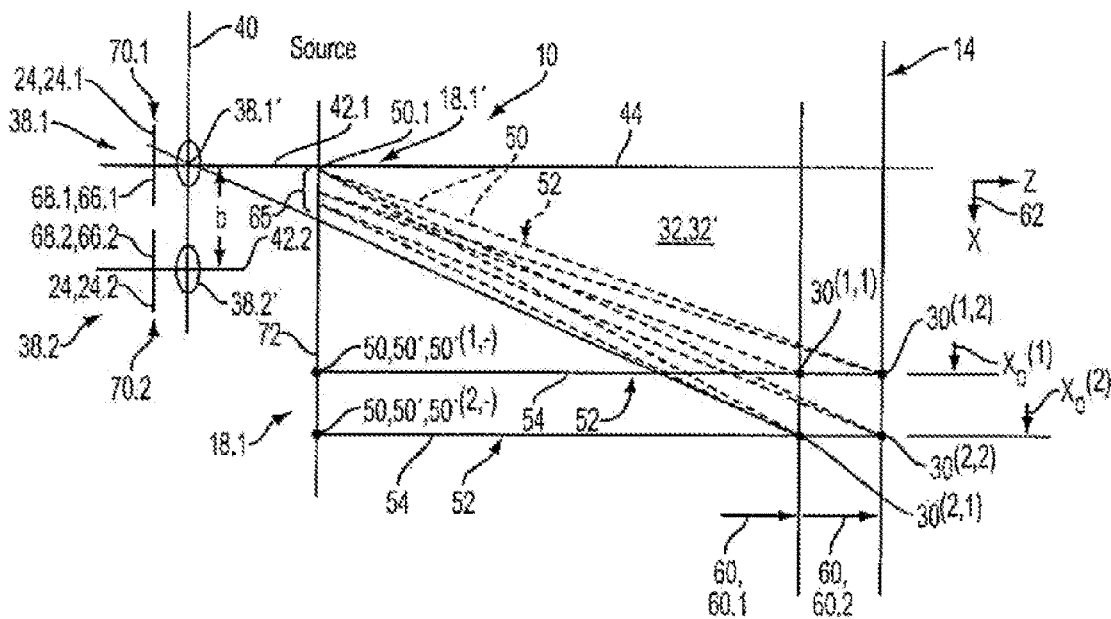
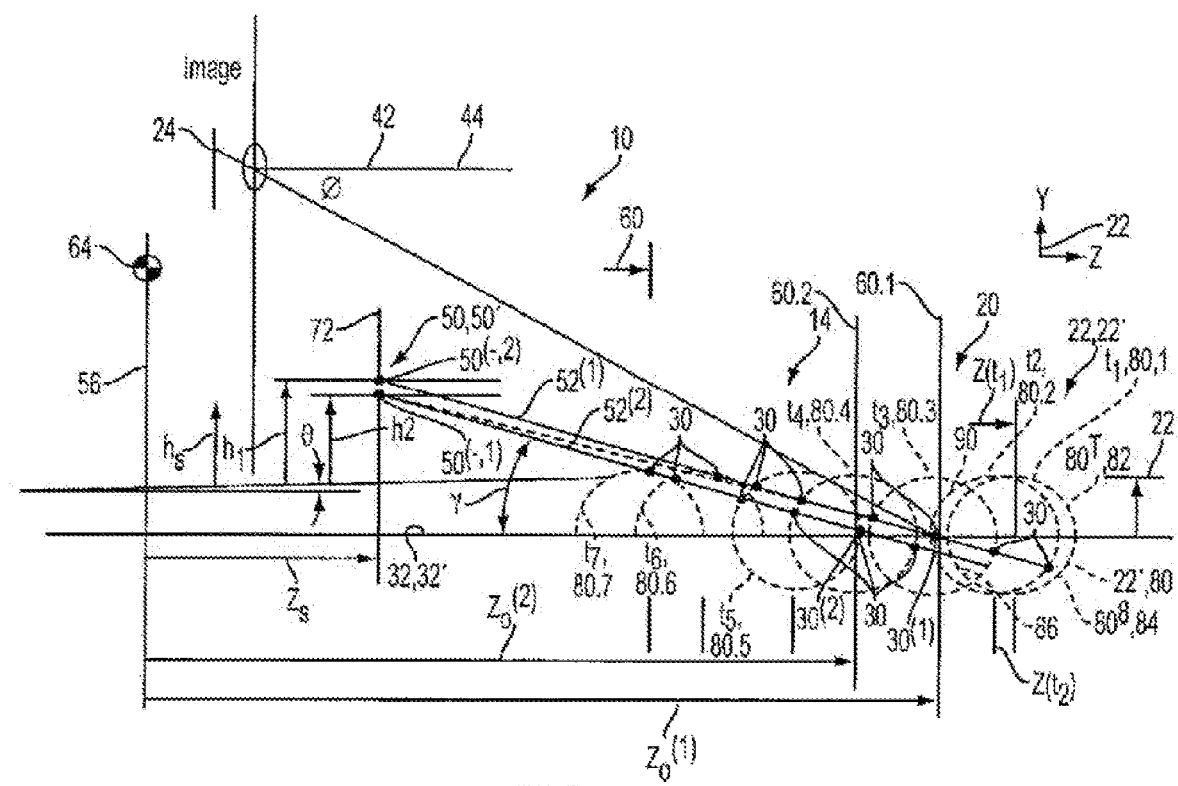
FIG. 4a

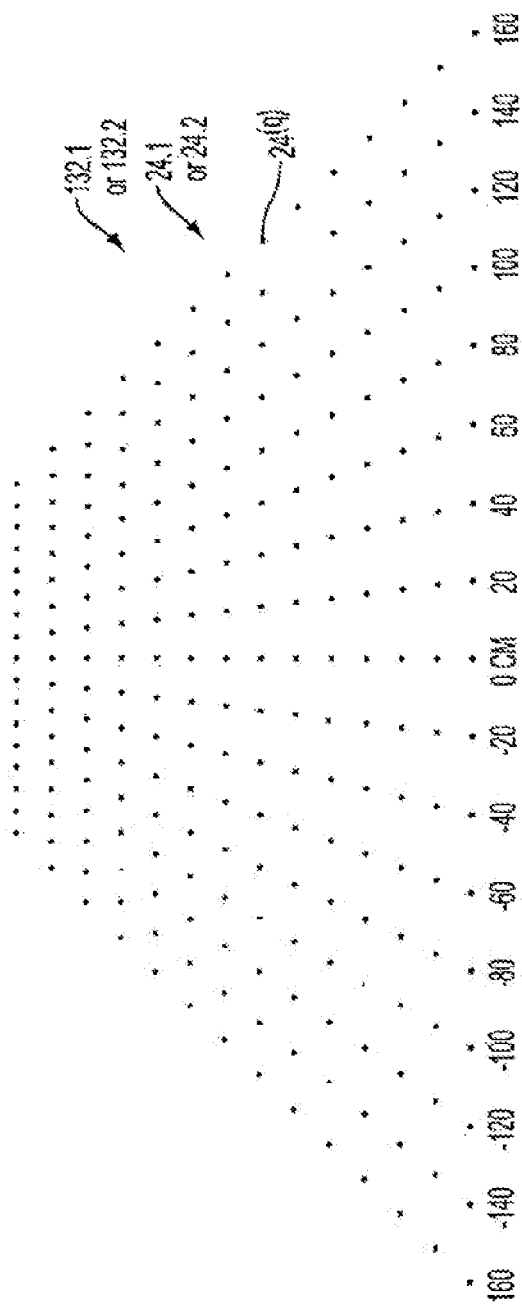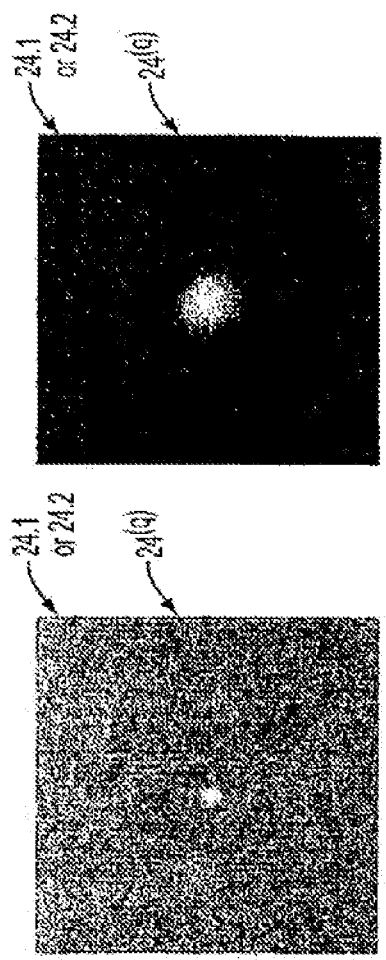

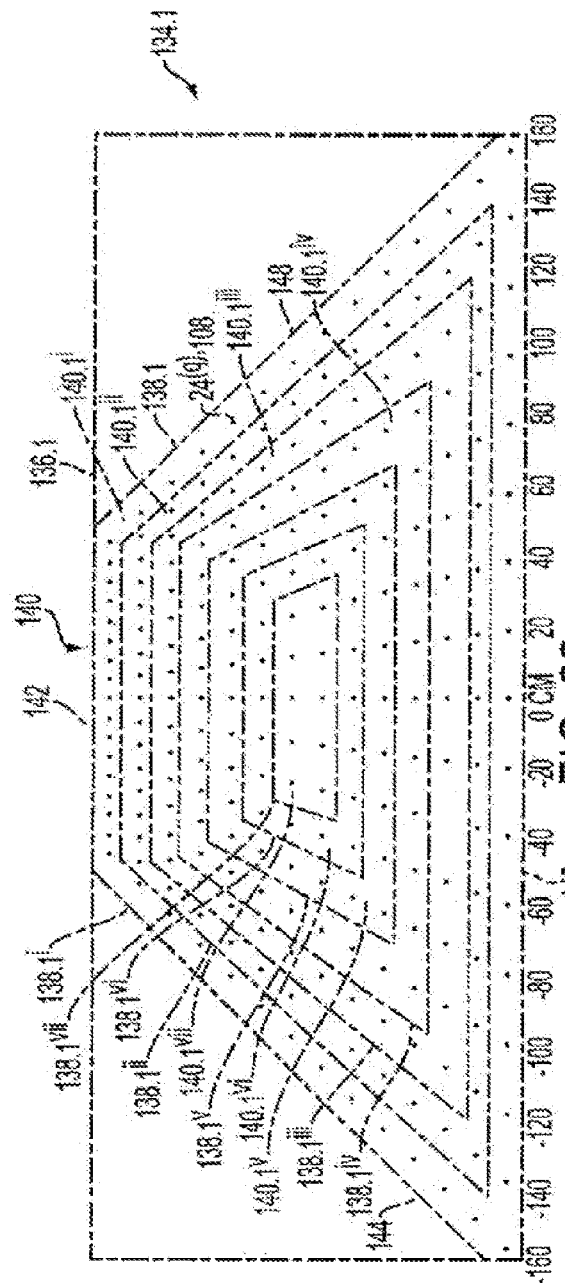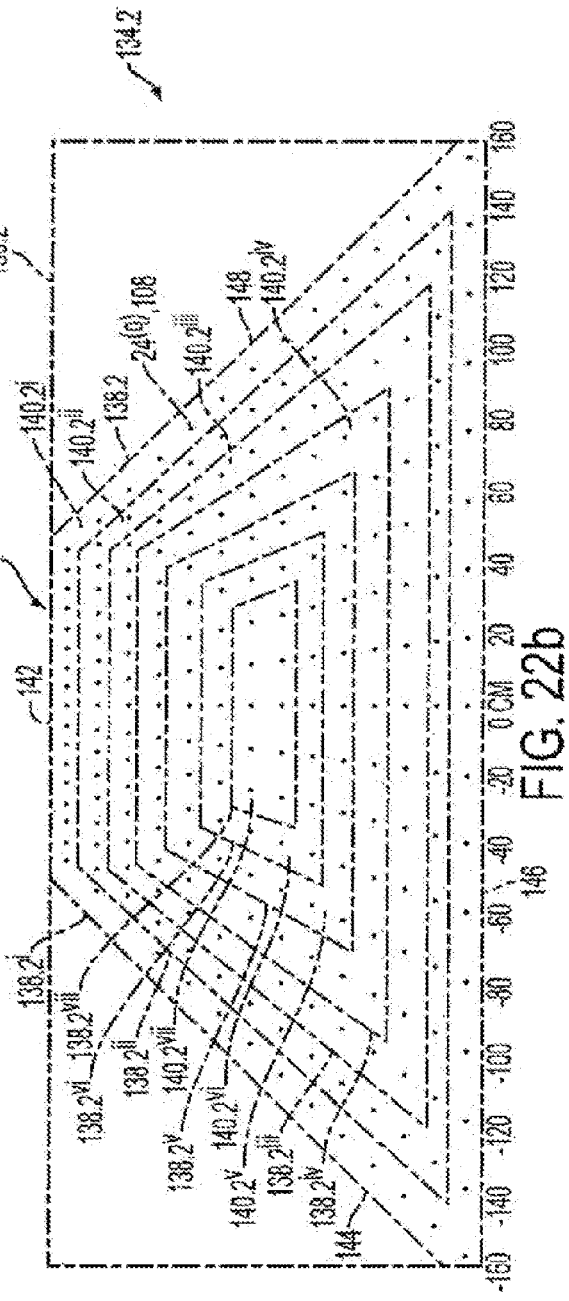
FIG. 22a
FIG. 22b

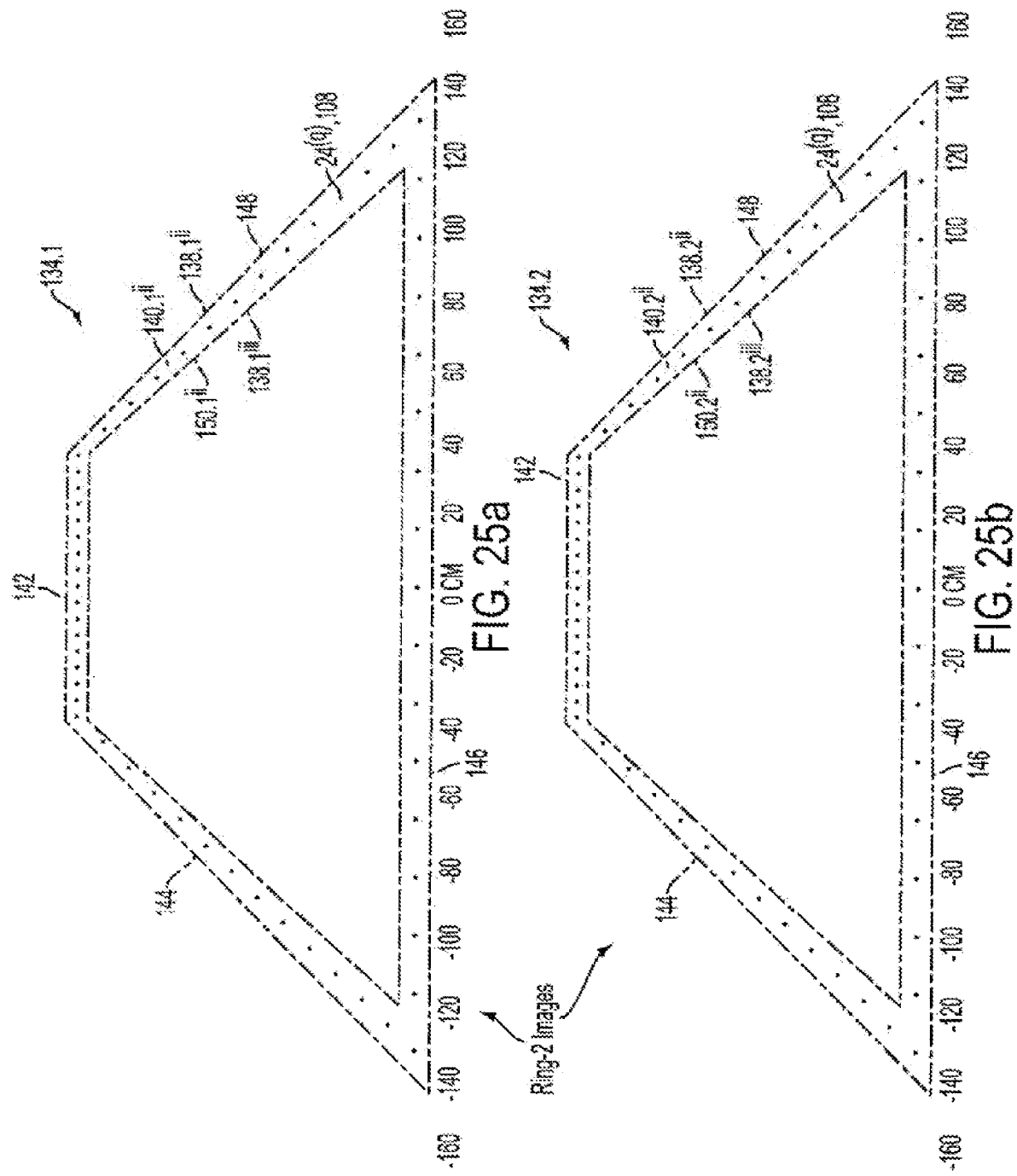

Ring-3 Images

Ring-4 Images

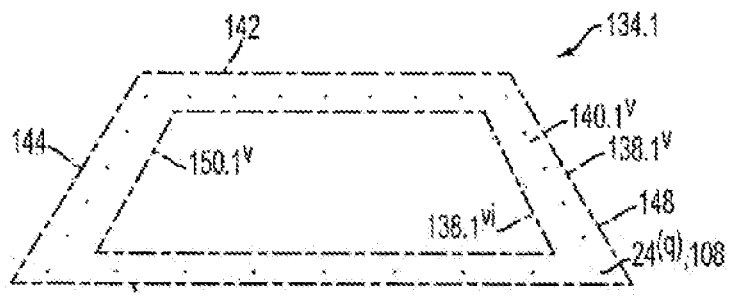
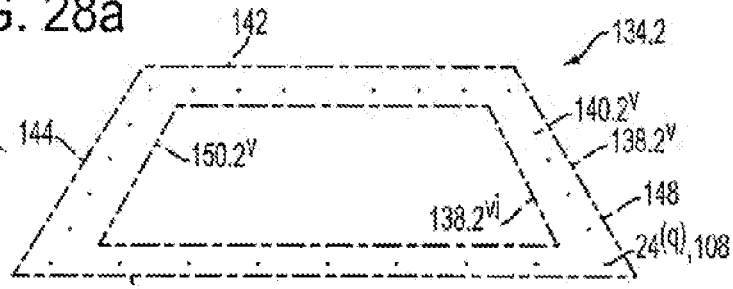
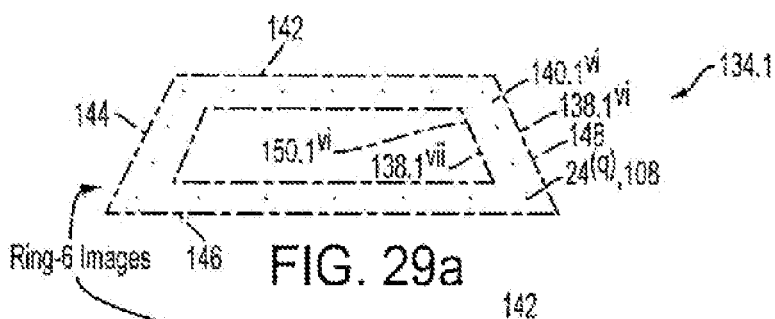
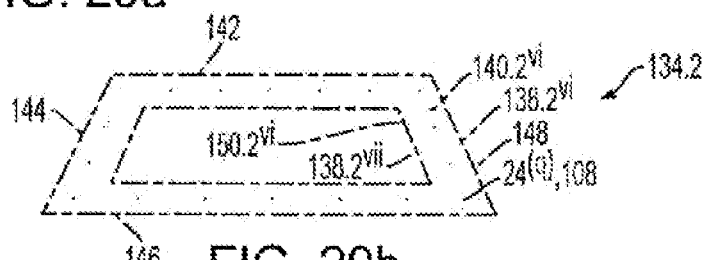
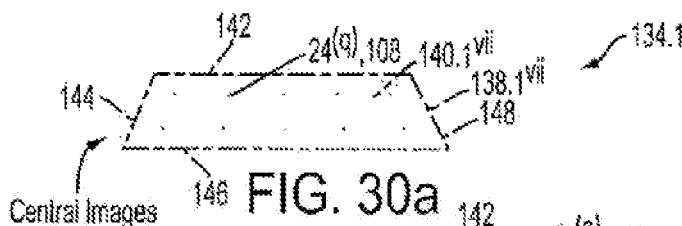
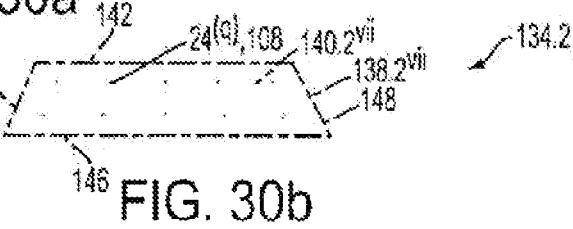

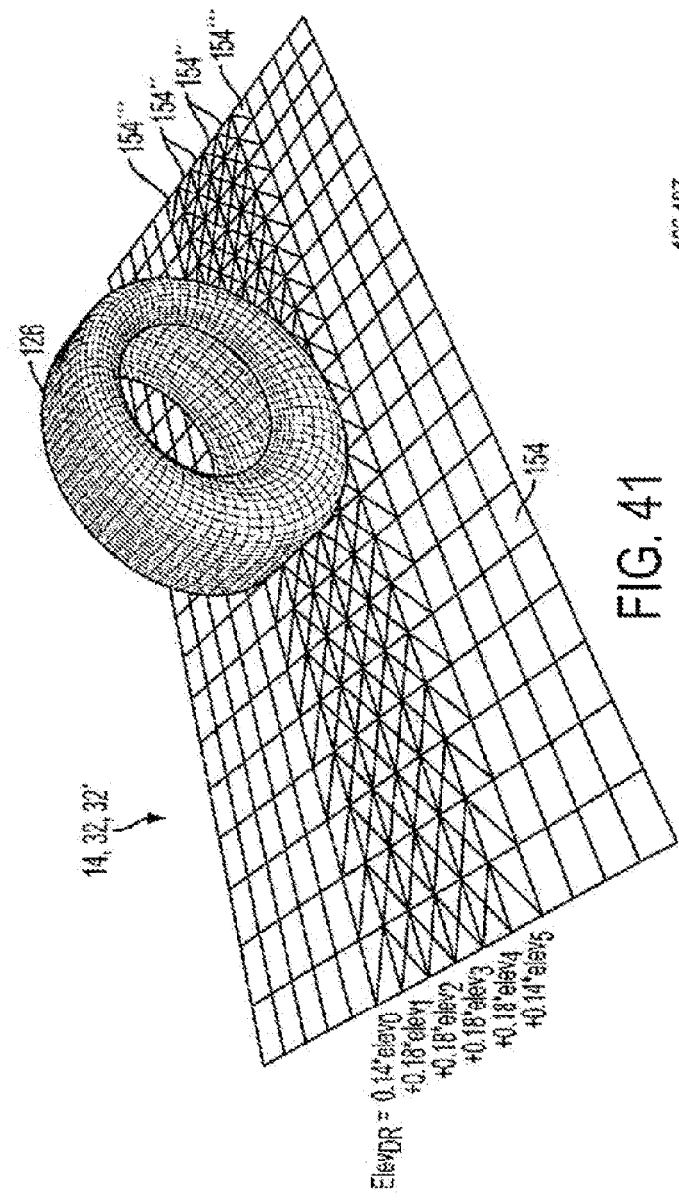
FIG. 41
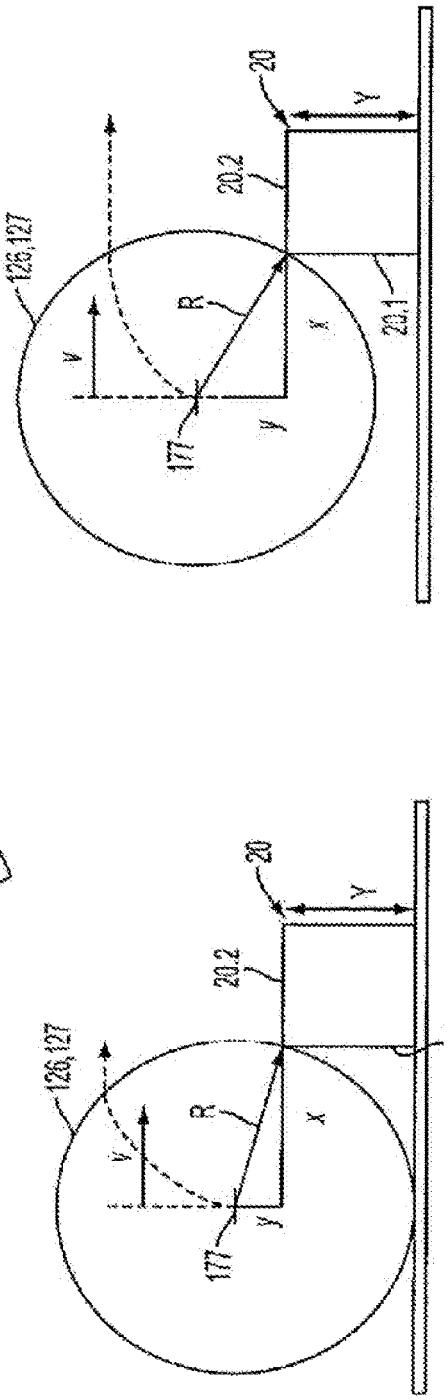
FIG. 42b
FIG. 42a

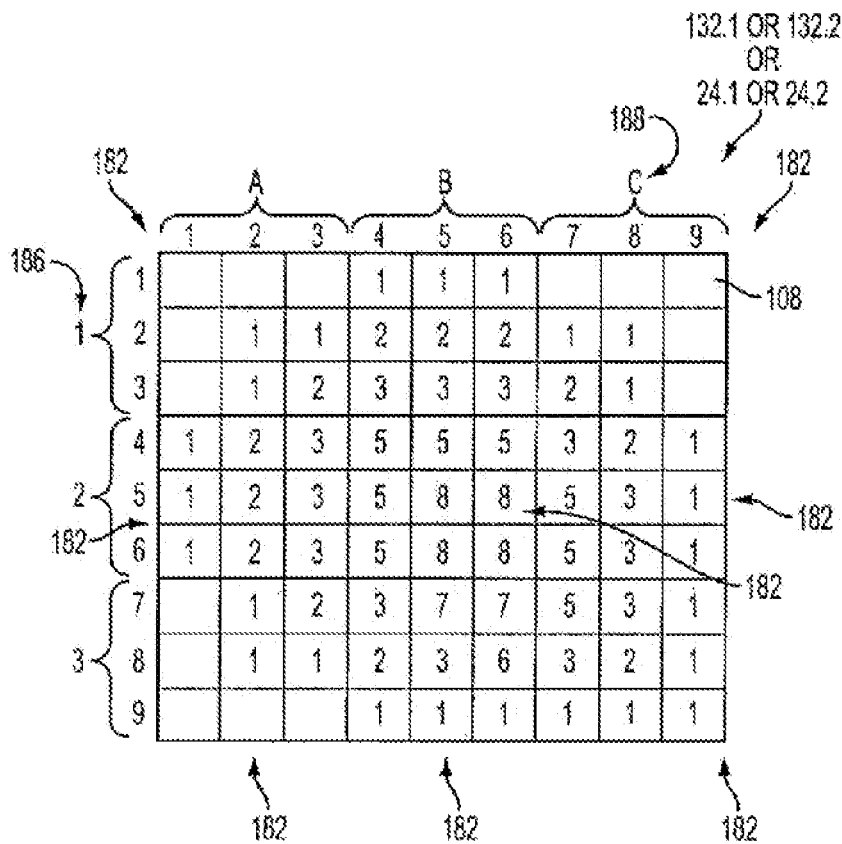
FIG. 50
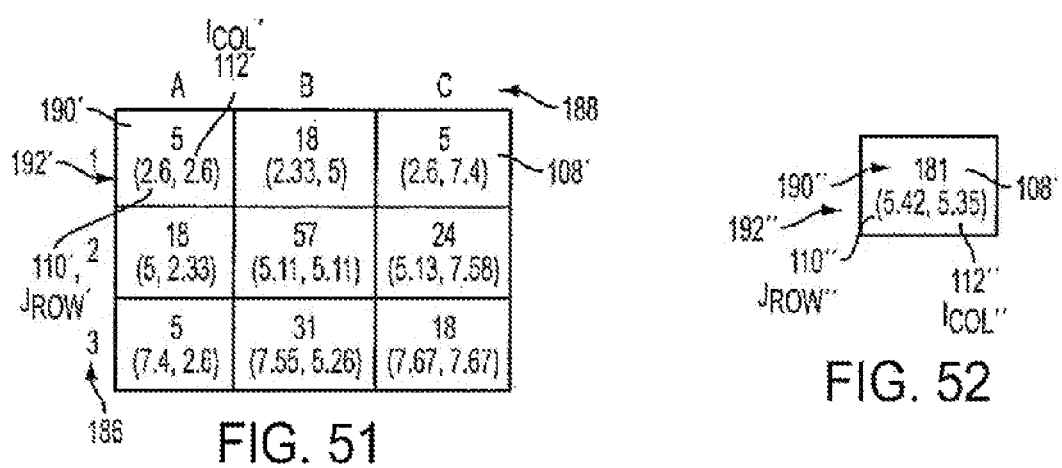
FIG. 51
FIG. 52

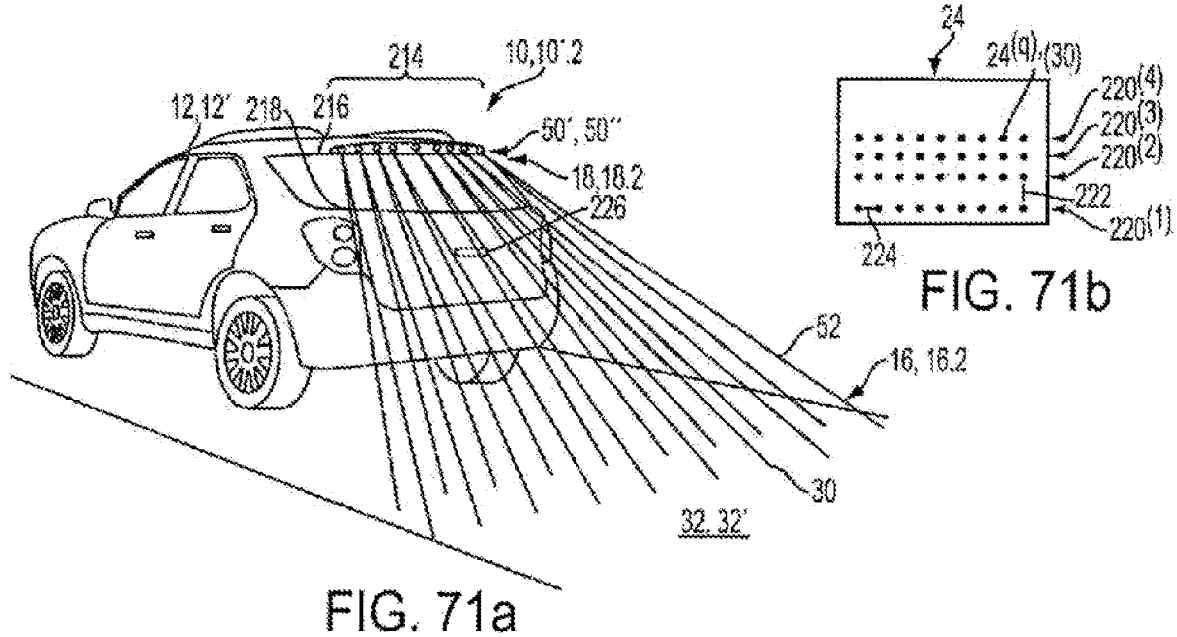
FIG. 71a
FIG. 71b
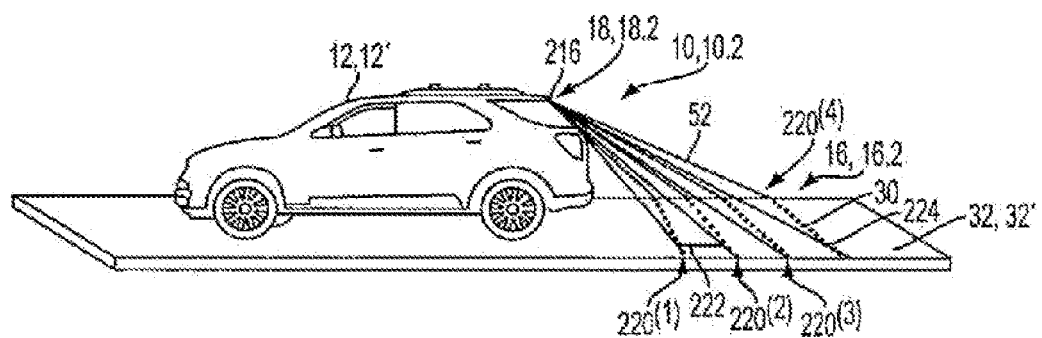
FIG. 72
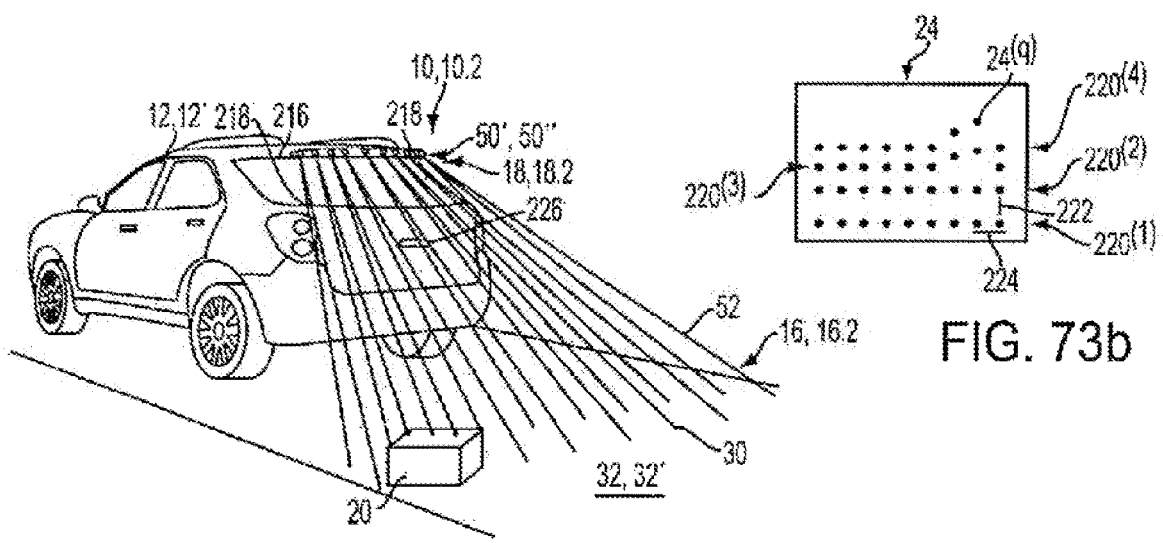
FIG. 73a
FIG. 73b

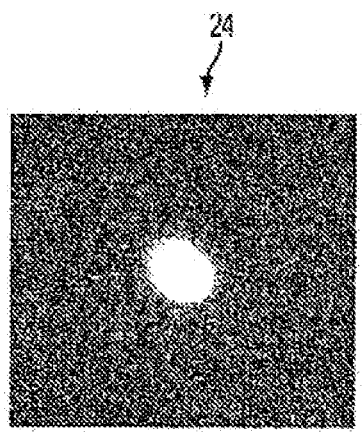
FIG. 89a  FIG. 89b
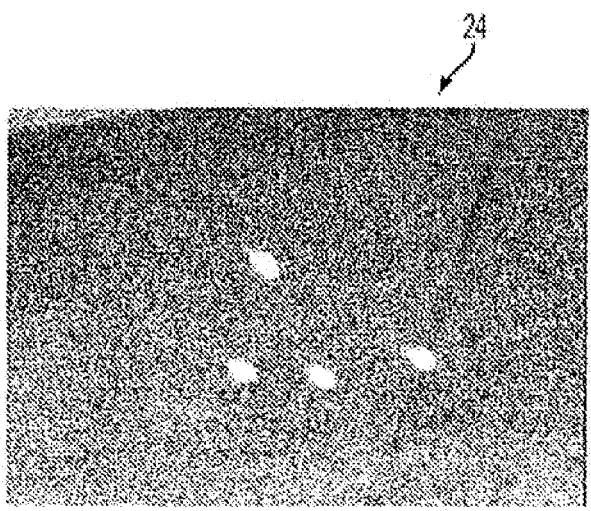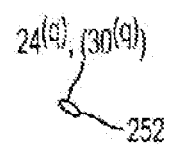
FIG. 90a  FIG. 90b
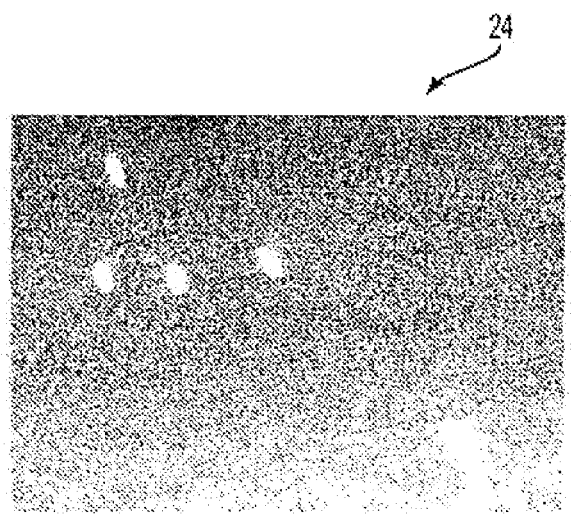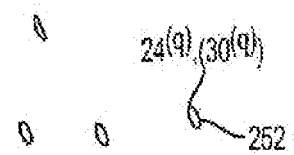
FIG. 91a  FIG. 91b

PATH SENSING USING STRUCTURED LIGHTING

CROSS-REFERENCE TO RELATED APPLICATIONS

The instant application is a continuation of International Application No. PCT/US2014/027376 filed on 14 Mar. 2014, which claims the benefit of prior U.S. Provisional Application Ser. No. 61/799,376 filed on 15 Mar. 2013. Each of the above-identified applications is incorporated herein by reference in its entirety.

BRIEF DESCRIPTION OF THE DRAWINGS

FIG. 1 illustrates a side view of a vehicle incorporating both forward-looking and rearward-looking vehicular path sensing systems;

FIG. 2 illustrates a rear view of the vehicle illustrated in FIG. 1, showing features of the associated rearward-looking vehicular path sensing system;

FIG. 3 illustrates a front view of the vehicle illustrated in FIG. 1, showing features of the associated forward-looking vehicular path sensing system;

FIG. 4a illustrates an elevation view geometry of a vehicular path sensing system;

FIG. 4b illustrates an expanded view of a portion of FIG. 4a;

FIG. 5 illustrates a plan view geometry of the vehicular path sensing system, corresponding to the elevation view illustrated in FIG. 4;

FIG. 20c illustrates the structured light pattern of FIG. 20b, isolated from the background by subtracting the image of FIG. 20a from the image of FIG. 20b;

FIG. 21a illustrates an image of a light spot of a structured light pattern projected by an associated light projection system of a vehicular path sensing system onto a concrete roadway surface, and viewed by an associated imaging subsystem under daylight conditions;

FIG. 21b illustrates an image of the light spot of a structured light pattern projected as in FIG. 21a by the associated light projection system of the vehicular path sensing system onto the concrete roadway surface, and viewed by the associated imaging subsystem at night;

FIGS. 22a and 22b illustrate first and second images of a plurality of distinct light spots of a structured light pattern, further illustrating boundaries between associated nested rings of distinct light spots developed during an associated image processing process;

FIGS. 25a and 25b illustrate a second pair of nested rings from FIGS. 22a and 22b that are adjacently-nested within the first pair of nested rings illustrated in FIGS. 24a and 24b;

FIGS. 28a and 28b illustrate a fifth pair of nested rings from FIGS. 22a and 22b that are adjacently-nested within the fourth pair of nested rings illustrated in FIGS. 27a and 27b;

FIGS. 29a and 29b illustrate a sixth pair of nested rings from FIGS. 22a and 22b that are adjacently-nested within the fifth pair of nested rings illustrated in FIGS. 28a and 28b;

FIGS. 30a and 30b illustrate a seventh pair of nested rings from FIGS. 22a and 22b that are adjacently-nested within the sixth pair of nested rings illustrated in FIGS. 29a and 29b;

FIG. 37c illustrates a black and white representation of the half-tone image of FIG. 37b that emphasizes the associated reference pattern in relation to the projected straight-line tire paths illustrated in FIG. 37a;

FIG. 41 illustrates a tire on an associated tire track along a plurality of associated tiles, together with associated weighting factors used to determine the effective tire elevation responsive to the associated tile elevations;

FIG. 42a illustrates a tire abutting an obstruction, and a geometry of associated motion of the wheel;

FIG. 42b illustrates the tire of FIG. 42a in the process of beginning to move over the obstruction;

FIG. 50 illustrates a portion of an image o a single light spot;

FIG. 51 illustrates a first binned representation of the light spot image illustrated in FIG. 50;

FIG. 52 illustrates a second and final binned representation of the light spot image illustrated in FIGS. 50 and 51, that provides for locating the light spot within the image;

FIG. 71a illustrates a first perspective view of a right rear quarter of the vehicle incorporating a rearward-looking vehicular path sensing system in operation from a vehicle along an unimpeded vehicular path;

FIG. 71b illustrates a structured light pattern projected and viewed by the rearward-looking vehicular path sensing system illustrated in FIG. 71a;

FIG. 72 illustrates a perspective view of a left side of the vehicle incorporating the rearward-looking vehicular path sensing system as in FIG. 71a, in operation from a vehicle along the unimpeded vehicular path;

FIG. 73a illustrates a third perspective view of a right rear quarter of the vehicle incorporating a rearward-looking vehicular path sensing system as in FIG. 71a, in operation from the vehicle along a vehicular path impeded with an obstacle;

FIG. 73b illustrates a structured light pattern projected and viewed by the rearward-looking vehicular path sensing system illustrated in FIG. 73a;

FIG. 89a illustrates an image of a distinct light spot generated by a light beam projected from a vehicle onto a roadway surface, wherein the vehicle is in a nominally level attitude, i.e. not subject to either roll or pitch;

FIG. 89b illustrates a detected outline of the distinct light spot illustrated in FIG. 89a, responsive to a Canny Edge Detection algorithm;

FIG. 90a illustrates an image of a plurality of distinct light spots generated by a plurality of light beams projected from the vehicle onto a roadway surface, wherein the vehicle is subject to roll relative to the nominally level attitude;

FIG. 90b illustrates detected outlines of the distinct light spots illustrated in FIG. 90a, responsive to a Canny Edge Detection algorithm;

FIG. 91a illustrates an image of a plurality of distinct light spots generated by a plurality of light beams projected from the vehicle onto a roadway surface, wherein the vehicle is subject to pitch relative to the nominally level attitude;

FIG. 91b illustrates detected outlines of the distinct light spots illustrated in FIG. 91a, responsive to a Canny Edge Detection algorithm;

DESCRIPTION OF EMBODIMENT(S)

Figure 4B:
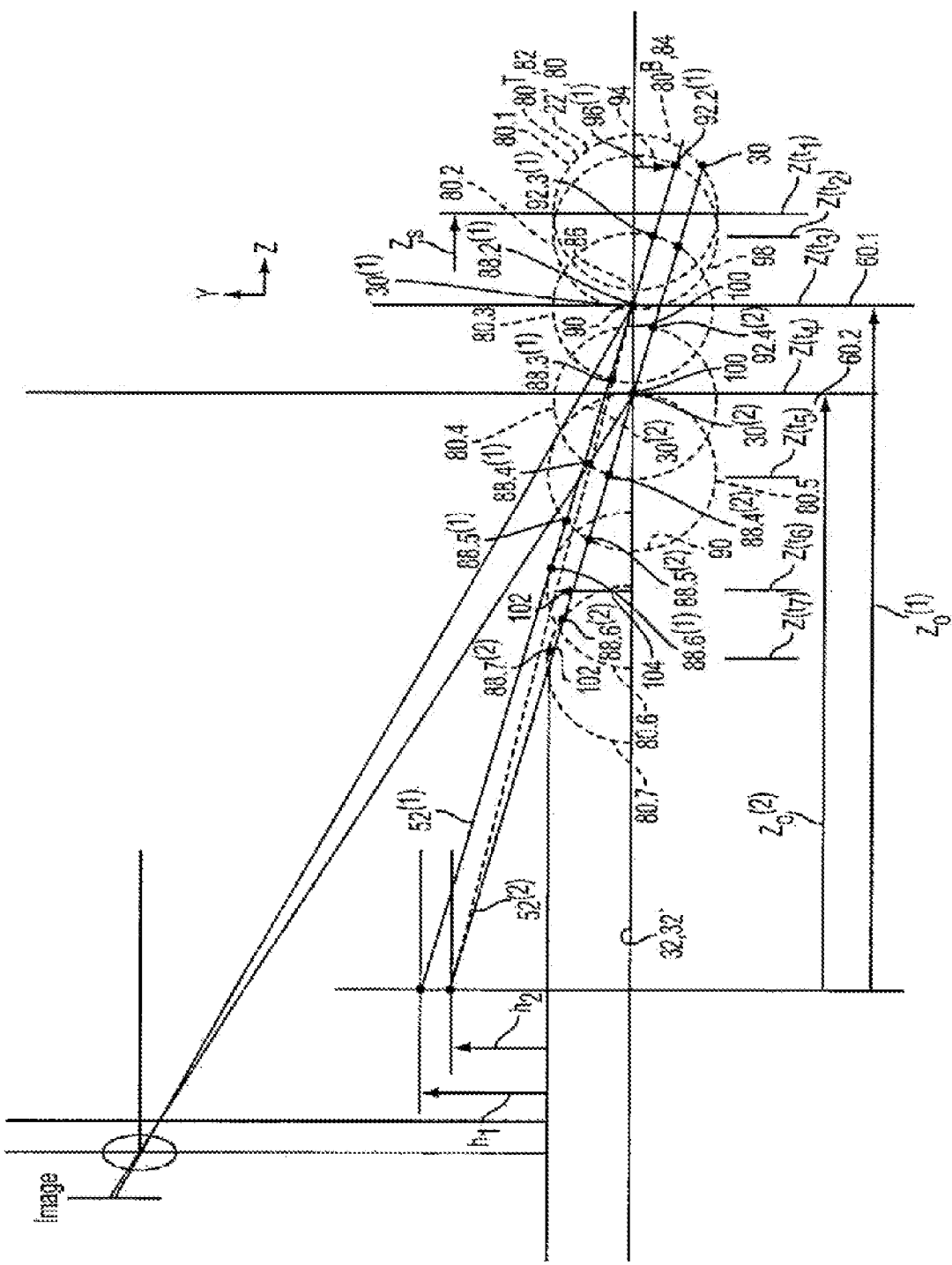

Referring to FIGS. 1-3, forward-looking 10.1 and rearward-looking 10.2 vehicular path sensing systems 10 are respectively incorporated in front 12.1 and rear 12.2 portions of a vehicle 12 for sensing a physical feature of or along a path 14 of the vehicle 12, either forward 14.1 or rearward 14.2 thereof, respectively, responsive to the image of a corresponding structured light pattern 16, 16.1, 16.2 projected onto the corresponding path 14, 14.1, 14.2 forward 14.1 or rearward 14.2 of the vehicle 12 by a corresponding light projection system 18, 18.1, 18.2, whereby one or more objects 20 along the path 14, 14.1, 14.2, or the elevation 22 or elevation profile 22' of the path 14, 14.1, 14.2, are sensed responsive to a corresponding image 24, 24', 24" of the corresponding structured light pattern 16, 16.1, 16.2 in relation to corresponding stored reference information 26 corresponding to the corresponding structured light pattern 16, 16.1, 16.2.

For example, referring to FIGS. 1 and 3, in accordance with one embodiment, the light projection system 18, 18.1 of a forward-looking vehicular path sensing system 10.1 is mounted at the front 12.1 of the vehicle 12 above the front bumper 28, and provides for projecting a corresponding structured light pattern 16, 16.1 comprising a plurality of distinct light spots 30 onto the surface 32, for example, a roadway surface 32', of the path 14, 14.1 of the vehicle 12, forward 14.1 thereof. The forward-looking vehicular path sensing system 10.1 further incorporates a corresponding imaging system 34, for example, comprising a stereo vision system 36, for example, comprising a pair of cameras 38.1, 38.2, with associated lenses 38.1, 38.2 located along an image system baseline 40 and separated by an associated baseline distance b, with each corresponding associated camera axis 42.1, 42.2 substantially perpendicular to the baseline 40 and parallel to the roll axis 44 (i.e. longitudinal axis 44) also referred to as the centerline 44—of the vehicle 12, for example, with the cameras 38.1, 38.2 straddling the rear view mirror 46 and looking forward through the windshield 48 of the vehicle 12.

For example, referring to FIGS. 4a-b and 5, in one embodiment, the light projection system 18, 18.1 comprises a plurality of light sources 50, for example, laser light sources 50', each projecting a corresponding beam of light 52 along a corresponding plane 54 that is both substantially parallel to the roll axis 44 of the vehicle 12 and substantially parallel to the yaw axis 56 (i.e. vertical axis) of the vehicle 12, and substantially perpendicular to the pitch axis 58 (i.e. transverse horizontal axis) of the vehicle 12. Each light source 50 projects a different beam of light 52 so as to generate a corresponding distinct light spot 30 on the surface 32 of the path 14, 14.1 at given longitudinal 60 and transverse 62 location, for example, relative to the center-of-gravity 64 of the vehicle 12, with different beams of light 52 generating different distinct light spots 30 at different corresponding distinct combinations of longitudinal 60 and transverse 62 location.

Alternatively, one or more beams of light 52 could be generated from a relatively narrow transverse region 65 so as to be oriented at particular associated elevation and azimuth angles relative to the roll axis 44 of the vehicle 12, so as to provide for a relatively more compact light projection system 18, 18.1. Furthermore, one or more of the associated distinct light spots 30 could be generated from a common light source 50.1, either using one or more associated beam splitters to generated the separate associated beams of light 52, or scanning an associated beam of light 52, wherein one or more beams of light 52 could be scanned.

Each camera 38.1, 38.2 of the stereo vision system 36 generates a corresponding image 66.1, 66.2 of the path 14, 14.1 of the vehicle 12, forward 14.1 thereof, portions of which include corresponding images 68.1, 68.2 of the associated structured light pattern 16, 16.1 when the latter is projected by the corresponding light projection system 18, 18.1, wherein the focal planes 70.1, 70.2 of the lenses 38.1, 38.2 of the cameras 38.1, 38.2 are substantially parallel to the plane or planes 72 in which are located the corresponding light source(s) 50. Referring again to FIG. 1, the forward-looking vehicular path sensing system 10.1 further incorporates an image processing system 74 incorporating or cooperating with an associated memory 75—that provides for determining either the real-world location of the distinct light spots 30, or determining whether or not, and if so, where, and object 20 is located along the path 14 of the vehicle 12.

In one set of embodiments, the image processing system 74 also provides for generating a range-map image 76 of the path 14, 14.1 of the vehicle 12, forward 14.1 a portion of which includes a corresponding range map image 78 of the associated structured light pattern 16, 16.1 when the latter is projected by the corresponding light projection system 18, 18.1, for example, in accordance with the imaging and image processing systems as described in U.S. application Ser. No. 13/465,059, filed on 7 May 2012, which is incorporated herein by reference.

For example, in accordance with one set of embodiments, a first plurality of laser light sources 50' are located at each of a second plurality of transverse locations 62 from the centerline 44 of the vehicle 12, wherein at each transverse location 62, each of the first plurality of laser light sources 50' is oriented either at a variety of heights $h_S$ relative to the roadway surface 32' or at a variety of projection elevation angles γ relative to the roll axis 44 of the vehicle 12, or both, so as to provide for projecting onto an associated roadway surface 32' a structured light pattern 16 comprising a Cartesian array of distinct light spots 30. For example, for purposes of clarity, FIGS. 4a-b and 5 illustrate only four of a greater plurality of distinct light spots 30, wherein each of the four distinct light spots 30, $30^{(1,1)}$, $30^{(1,2)}$, $30^{(2,1)}$, $30^{(2,2)}$ is generated at a different combination of one of two different longitudinal locations 60 ($Z_0^{(1)}$, $Z_0^{(2)}$) and one of two different transverse location 62 ($X_0^{(1)}$, $X_0^{(2)}$). Each distinct light spot 30 is generated by a corresponding laser light source 50', $50'^{(1,1)}$, $50'^{(1,2)}$, $50'^{(2,1)}$, $50'^{(2,2)}$, each of which is shown generating corresponding beams of light 52 at a common projection elevation angle γ so that the relatively far-range laser light source 50', $50'^{(1,1)}$, $50'^{(2,1)}$ are located above the relatively near-range laser light source 50', $50'^{(1,2)}$, $50'^{(2,2)}$. Generally, for a given transverse location 62, the different corresponding beams of light 52 need not necessarily be generated a common projection elevation angle γ, but instead, each could be generated from a location at some combination of height $h_S$ relative to the roadway surface 32' and longitudinal distance $Z_s$ relative to the center-of-gravity 64 of the vehicle 12, at a corresponding projection elevation angle γ, so that the resulting spot is located at a particular corresponding longitudinal location 60 ($Z_0^{(1)}$, $Z_0^{(2)}$) relative to the center-of-gravity 64 of the vehicle 12.

The use of each distinct light spot 30 for vehicular path sensing depends upon both the actual location—i.e. three-dimensional coordinates—of the distinct light spot 30 relative to the vehicle 12, and upon the detection of that location—either qualitatively or quantitatively—by the associated imaging 34 and image processing 74 systems. For each beam of light 52 located in a corresponding plane 54 that is both substantially parallel to the roll axis 44 of the vehicle 12 and substantially parallel to the yaw axis 56 (i.e. vertical axis) of the vehicle 12, and substantially perpendicular to the pitch axis 58 (i.e. transverse horizontal axis) of the vehicle 12, the transverse location 62 of the distinct light spot 30 will be the same as that of the corresponding laser light source 50'. The corresponding vertical Y and longitudinal Z locations of each distinct light spot 30 will depend upon the geometry of the associated beam of light 52 and the elevation profile 22' of the path 14 at the intersection thereof with the beam of light 52.

For example, FIGS. 4a-b illustrate a hypothetical circular-cross-section elevation profile 22', 80—also referred to as a circular profile 80—centered vertically on the roadway surface 32' at various longitudinal locations relative to the vehicle 12, corresponding to various points in time for the vehicle 12 traveling therealong, wherein the top portion $80^T$ thereof represents the surface of a circular-cross-section bump 82—also referred to as a circular bump 82—along the path 14, and the bottom portion $80^B$ thereof represents the surface of a circular-cross-section dip 84—also referred to as a circular dip 84—along the path 14. FIGS. 4a-b illustrate first $52^{(1)}$ and second $52^{(2)}$ beams of light projected from the vehicle 12 so as to generate corresponding first $30^{(1)}$ and second $30^{(2)}$ distinct light spots at corresponding first 60.1 ($Z_0^{(1)}$) and second 60.2 ($Z_0^{(2)}$) longitudinal locations on a flat roadway surface 32'.

In FIGS. 4a-b, the circular profile 80 is illustrated at seven different relative longitudinal locations ($Z(t_1)$, $Z(t_2)$, $Z(t_3)$, $Z(t_4)$, $Z(t_5)$, $Z(t_6)$, $Z(t_7)$) relative to vehicle 12, e.g. relative to the center-of-gravity 64 of the vehicle 12, for example, corresponding to seven different points in time $t_1$, $t_2$, $t_3$, $t_4$, $t_5$, $t_6$, $t_7$ for the vehicle 12 traveling in the positive Z direction, wherein the relatively fixed circular profile 80 is separately identified at each corresponding point in time in FIGS. 4a-b by a corresponding index of relative position, i.e. 80.1, 80.2, 80.3, 80.4, 80.5, 80.6, 80.7.

For example, at a first point in time $t_1$ and a corresponding first relative longitudinal location ($Z(t_1)$), the leading edge 86 of the corresponding circular profile 80, 80.1 is beyond both the first $30^{(1)}$ and second $30^{(2)}$ distinct light spots so as to not interact therewith, so that the first $30^{(1)}$ and second $30^{(2)}$ distinct light spots remain located on the flat roadway surface 32' at the corresponding respective nominal longitudinal locations $Z_0^{(1)}$, $Z_0^{(2)}$ at the elevation of the flat roadway surface 32'.

At the second point in time $t_2$ and a corresponding second relative longitudinal location ($Z(t_2)$), the leading edge 86 of the corresponding circular profile 80, 80.2 is at the first longitudinal location 60.1 ($Z_0^{(1)}$) of the first distinct light spot $30^{(1)}$, so that for the circular bump 82 as illustrated, the first beam of light $52^{(1)}$ projects the first distinct light spot $30^{(1)}$ at a location $88.2^{(1)}$ that is beginning to rise up on a forward portion 90 thereof, whereas for the circular dip 84 as illustrated, the first beam of light $52^{(1)}$ projects the first distinct light spot $30^{(1)}$ onto a corresponding depressed location $92.2^{(1)}$ on a relatively-aft portion 94 of the circular dip 84 at a corresponding maximum-detectable depth $96^{(1)}$, so that elevation the first distinct light spot $30^{(1)}$ makes a corresponding downward step transition to a location below the nominal location of the first distinct light spot $30^{(1)}$ on an otherwise flat roadway surface 32'. Accordingly, the first beam of light $52^{(1)}$ is blind to a forward portion 98 of the circular dip 84 forward of the corresponding location 92.2 of maximum-detectable depth $96^{(1)}$ because of shadowing by the leading edge 86 of the corresponding circular profile 80, 80.2, wherein the extent of the shadowed forward portion 98 of the circular dip 84 depends upon the geometry of the first beam of light $52^{(1)}$ in relation to that of the circular profile 80, 80.2. At the second point in time $t_2$, the second distinct light spot $30^{(2)}$ is forward of the leading edge 86 of the corresponding circular profile 80, 80.2, so as to remain located on the flat roadway surface 32'.

At the third point in time $t_3$ and a corresponding third relative longitudinal location ($Z(t_3)$), the center of the corresponding circular profile 80, 80.3 is at the first longitudinal location 60.1 ($Z_0^{(1)}$) of the first distinct light spot $30^{(1)}$ and the leading edge 86 of the circular profile 80, 80.3 is just beyond the second longitudinal location 60.2 ($Z_0^{(2)}$) of the second distinct light spot $30^{(2)}$, so that for the circular bump 82 as illustrated, the first beam of light $52^{(1)}$ projects the first distinct light spot $30^{(1)}$ at an elevated location $88.3^{(1)}$ on the forward portion 90 of the circular bump 82, above the corresponding elevation that would result if otherwise on the flat roadway surface 32', whereas for the circular dip 84 as illustrated, the first beam of light $52^{(1)}$ projects the first distinct light spot $30^{(1)}$ onto a corresponding depressed location $92.3^{(1)}$ on the relatively-aft portion 94 of the circular dip 84 at a depth less than the maximum-detectable depth $96^{(1)}$ at the second point in time 6. At the third point in time $t_3$, the second distinct light spot $30^{(2)}$ continues to be forward of the leading edge 86 of the corresponding circular profile 80, 80.2, so as to remain located on the flat roadway surface 32'.

At the fourth point in time $t_4$ and a corresponding fourth relative longitudinal location $(Z(t_4))$, the center of the corresponding circular profile 80, 80.4 is at the second longitudinal location 60.2 $(Z_0^{(2)})$ of the second distinct light spot $30^{(2)}$, so that for the circular bump 82 as illustrated, the first $52^{(1)}$ and second $52^{(2)}$ beams of light respectively project the corresponding respective first $30^{(1)}$ and second $30^{(2)}$ distinct light spots at corresponding respective elevated locations $88.4^{(1)}$ and $88.4^{(2)}$ on the forward portion 90 of the circular bump 82, each above the corresponding elevation that would result if otherwise on the flat roadway surface 32', wherein the elevated location $88.4^{(1)}$ of the first distinct light spot $30^{(1)}$ is above the elevated location $88.4^{(2)}$ of the second distinct light spot $30^{(2)}$. For the circular dip 84 as illustrated, the first beam of light $52^{(1)}$ projects the first distinct light spot $30^{(1)}$ at the trailing edge 100 of the circular dip 84 at the elevation of the roadway surface 32', whereas the second beam of light $52^{(2)}$ projects the second distinct light spot $30^{(2)}$ at a corresponding depressed location $92.4^{(2)}$ on the relatively-aft portion 94 of the circular dip 84 at a depth less than the maximum-detectable depth $96^{(1)}$ at the second point in time $t_2$. Thereafter, as the vehicle 12 continues to move in the +Z direction, for the circular dip 84 as illustrated, the first beam of light $52^{(1)}$ continues to project the first distinct light spot $30^{(1)}$ onto the roadway surface 32' so the first distinct light spot $30^{(1)}$ will remain the elevation thereof.

At the fifth point in time $t_5$ and a corresponding fifth relative longitudinal location $(Z(t_5))$, the trailing edge 100 of the corresponding circular profile 80, 80.5 is at the second longitudinal location 60.2 $(Z_0^{(2)})$ of the second distinct light spot $30^{(2)}$, so that for the circular bump 82 as illustrated, the first $52^{(1)}$ and second $52^{(2)}$ beams of light respectively project the corresponding respective first $30^{(1)}$ and second $30^{(2)}$ distinct light spots at corresponding respective elevated locations $88.5^{(1)}$ and $88.5^{(2)}$ on the forward portion 90 of the circular bump 82, each above the corresponding elevation that would result if otherwise on the flat roadway surface 32' and above the corresponding elevations of the corresponding elevated locations $88.4^{(1)}$ and $88.4^{(2)}$ at the fourth point in time $t_4$, wherein the elevated location $88.5^{(1)}$ of the first distinct light spot $30^{(1)}$ is above the elevated location $88.5^{(2)}$ of the second distinct light spot $30^{(2)}$. For the circular dip 84 as illustrated, the second beam of light $52^{(2)}$ projects the second distinct light spot $30^{(1)}$ at the trailing edge 100 of the circular dip 84 at the elevation of the roadway surface 32'. Thereafter, as the vehicle 12 continues to move in the +Z direction, for the circular dip 84 as illustrated, the second beam of light $52^{(2)}$ continues to project the second distinct light spot $30^{(2)}$ onto the roadway surface 32' so the second distinct light spot $30^{(2)}$ will remain at the elevation thereof.

At the sixth point in time $t_6$ and a corresponding sixth relative longitudinal location $(Z(t_6))$, the trailing edge 100 of the corresponding circular profile 80, 80.6 is at a first location between the vehicle 12 and the second longitudinal location 60.2 $(Z_0^{(2)})$ of the second distinct light spot $30^{(2)}$, so that for the circular bump 82 as illustrated, the first $52^{(1)}$ and second $52^{(2)}$ beams of light respectively project the corresponding respective first $30^{(1)}$ and second $30^{(2)}$ distinct light spots at corresponding respective elevated locations $88.6^{(1)}$ and $88.6^{(2)}$ on the circular bump 82, each above the corresponding elevation that would result if otherwise on the flat roadway surface 32' and above the corresponding elevations of the corresponding elevated locations $88.5^{(1)}$ and $88.5^{(2)}$ at the fifth point in time $t_5$, wherein the sixth relative longitudinal location $(Z(t_6))$ is such that the first beam of light $52^{(1)}$ is tangential to the circular bump 82 at a relatively-further-distant location than the location 102 of maximum elevation 104 of the circular bump 82. Thereafter, as the vehicle 12 continues to move in the +Z direction, for the circular bump 82 as illustrated, the first beam of light $52^{(1)}$ will no longer intersect the circular bump 82, but instead will project the first distinct light spot $30^{(1)}$ onto the roadway surface 32' so the first distinct light spot $30^{(1)}$ will then be at the elevation thereof.

At the seventh point in time $t_7$ and a corresponding seventh relative longitudinal location $(Z(t_7))$, the corresponding circular profile 80, 80.7 is at a relatively-closer second location between the vehicle 12 and the second longitudinal location 60.2 $(Z_0^{(2)})$ of the second distinct light spot $30^{(2)}$, so that for the circular bump 82 as illustrated, the second beam of light $52^{(2)}$ projects the corresponding second distinct light spot $30^{(2)}$ at a corresponding elevated location $88.7^{(2)}$ on the forward portion 90 of the circular bump 82 at the location 102 of maximum elevation 104 thereof. Thereafter, as the vehicle 12 continues to move in the +Z direction, for the circular bump 82 as illustrated, the second beam of light $52^{(2)}$ will eventually be tangential to the circular bump 82 at a relatively-further-distant location than the location 102 of maximum elevation 104 of the circular bump 82, after which the second beam of light $52^{(2)}$ will no longer intersect the circular bump 82, but instead will project the second distinct light spot $30^{(2)}$ onto the roadway surface 32' so the first distinct light spot $30^{(1)}$ will then be at the elevation thereof.

For a light projection system 18 that projects first $30^{(1)}$ and second $30^{(2)}$ distinct light spots as described hereinabove in respect of FIGS. 4a-b, FIGS. 6a-6f illustrate a progression of corresponding images 24 generated by the imaging system 34 of the first $30^{(1)}$ and second $30^{(2)}$ distinct light spots as the vehicle 12 moves in a positive Z direction relative to the above-described circular bump 82. Each image 24 comprises a Cartesian array 106 of pixels 108 organized by pluralities of rows 110 and columns 112. For the first $52^{(1)}$ and second $52^{(2)}$ beams of light each projected parallel to the roll axis 44/centerline 44 of the vehicle 12, the particular corresponding common column position $112^{(1, 2)}$ of each first $24^{(1)}$ and second $24^{(2)}$ distinct light spot images will be invariant with respect to the relative longitudinal location $(Z(t))$ of the vehicle 12 relative to the elevation profile 22' (for example, that of the circular bump 82) of the path 14, and with respect to the particular size or shape of that elevation profile 22'. However, the respective corresponding row position $110^{(1)}$, $110^{(2)}$ of the respective first $24^{(1)}$ and second $24^{(2)}$ distinct light spot images will be different for the different corresponding first $52^{(1)}$ and second $52^{(2)}$ beams of light, and will be responsive to the relative longitudinal location $(Z(t))$ of the vehicle 12 relative to the elevation profile 22' (for example, that of the circular bump 82) of the path 14 and responsive to the particular size or shape of that elevation profile 22'.

Figure 6A:
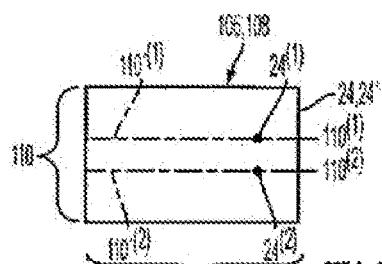
FIGS. 6a-6f illustrate a sequence of images over time of two light spots projected from a forward-moving vehicle, responsive to an interaction with a bump on the roadway surface.
Figure 6F:
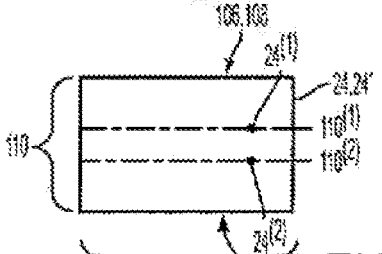

For example, FIG. 6a illustrates the first $24^{(1)}$ and second $24^{(2)}$ distinct light spot images corresponding to the above-referenced first $t_1$ and second $t_2$ points in time in respect of the first relative longitudinal location $(Z(t_1))$ of the circular bump 82, wherein the corresponding respective row positions $110^{(1)}$, $110^{(2)}$ of the first $24^{(1)}$ and second $24^{(2)}$ distinct light spot images are at corresponding respective nominal row positions $110'^{(1)}$, $110'^{(2)}$ corresponding to a flat roadway surface 32', wherein at the first point in time $t_1$, the row positions $110^{(1)}$, $110^{(2)}$ of the first $24^{(1)}$ and second $24^{(2)}$ distinct light spot images are relatively fixed, whereas at the second point in time $t_2$, the row position $110^{(1)}$ of the first distinct light spot image $24^{(1)}$ is moving upwards while the row position $110^{(2)}$ of the second distinct light spot image $24^{(2)}$ remains relatively fixed. In the image 24 illustrated in FIG. 6b, the row position $110^{(1)}$ of the first distinct light spot image $24^{(1)}$ is above the corresponding nominal row position $110'^{(1)}$ as a result of the corresponding elevated location $88.3^{(1)}$ of the associated first distinct light spot $30^{(1)}$ at the above-referenced third point in time $t_3$. In the image 24 illustrated in FIG. 6c, the row positions $110^{(1)}$, $110^{(2)}$ of the first $24^{(1)}$ and second $24^{(2)}$ distinct light spot images are both above the corresponding respective nominal row positions $110'^{(1)}$, $110'^{(2)}$ as a result of the corresponding elevated locations $88.4^{(1)}$ and $88.4^{(2)}$ and $88.5^{(1)}$ and $88.5^{(2)}$ of the associated first $30^{(1)}$ and second $30^{(2)}$ distinct light spots at the above-referenced fourth $t_4$ and fifth $t_5$ points in time. Alternatively, if either the nominal longitudinal locations 60 ($Z_0^{(1)}$), $Z_0^{(2)}$) of the first $30^{(1)}$ and second $30^{(2)}$ distinct light spots were separated farther, or if the circular profile 80 was smaller, then the image 24 illustrated in FIG. 6b would be followed by that illustrated in FIG. 6d following the interaction of the first beam of light $52^{(1)}$ with the circular bump 82, after which both the first $30^{(1)}$ and second $30^{(2)}$ distinct light spots return to their corresponding nominal longitudinal locations 60 ($Z_0^{(1)}$, $Z_0^{(2)}$) on the roadway surface 32'. In the image 24 illustrated in FIG. 6e, the row position $110^{(1)}$ of the first distinct light spot image $24^{(1)}$ returns to the corresponding nominal row position $110'^{(1)}$ following interaction of the first beam of light $52^{(1)}$ with the circular bump 82, whereas the row position $110^{(2)}$ of the second distinct light spot image $24^{(2)}$ is above the corresponding nominal row position $110'^{(2)}$ responsive to the interaction of the second beam of light $52^{(2)}$ with the circular bump 82, for example, as described hereinabove in respect of FIGS. 4a-b for the sixth $t_6$ and seventh $t_7$ points in time. Finally, the image 24 illustrated in FIG. 6f illustrates the row positions $110^{(1)}$, $110^{(2)}$ of both the first $24^{(1)}$ and second $24^{(2)}$ distinct light spot images are each at the corresponding respective nominal row position $110'^{(1)}$, $110'^{(2)}$ following interaction of the second beam of light $52^{(2)}$ with the circular bump 82.

Figure 7A:
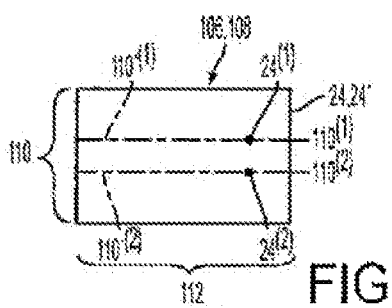
FIGS. 7a-7e illustrate a sequence of images over time of two light spots projected from a forward-moving vehicle, responsive to an interaction with a dip in the roadway surface.
Figure 6B:
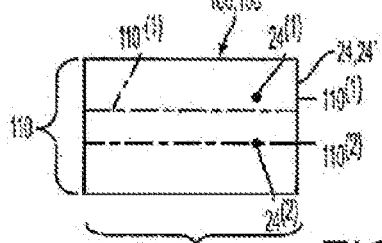
Figure 7B:
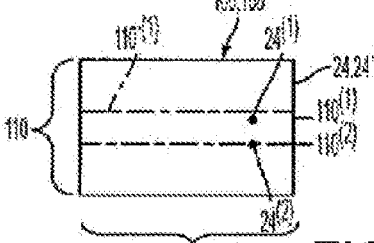
Figure 6C:
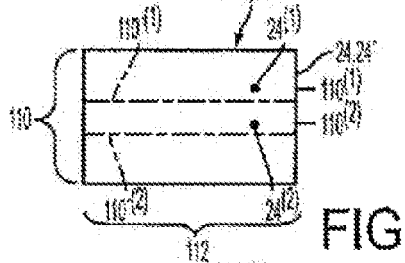
Figure 7C:
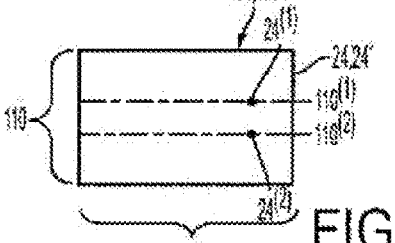
Figure 6D:
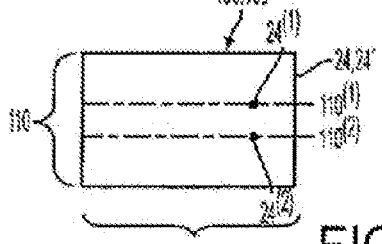
Figure 7D:
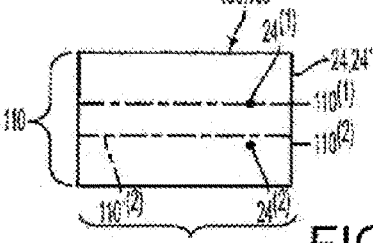
Figure 6E:
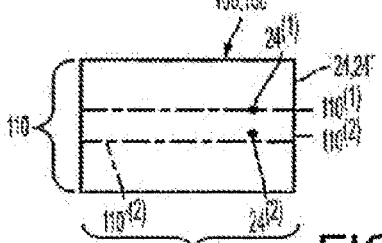
Figure 7E:
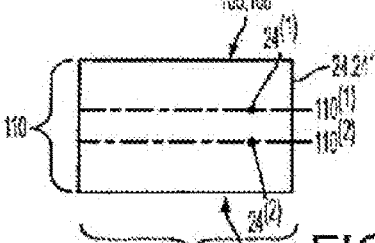

Similarly, FIG. 7a illustrates the first $24^{(1)}$ and second $24^{(2)}$ distinct light spot images corresponding to the above-referenced first $t_1$ and second $t_2$ points in time in respect of the first relative longitudinal location ($Z(t_1)$) of the circular dip 82, wherein the corresponding respective row positions $110^{(1)}$, $110^{(2)}$ of the first $24^{(1)}$ and second $24^{(2)}$ distinct light spot images are at corresponding respective nominal row positions $110'^{(1)}$, $110'^{(2)}$ corresponding to a flat roadway surface 32'. In the image 24 illustrated in FIG. 7b, the row position $110^{(1)}$ of the first distinct light spot image $24^{(1)}$ is below the corresponding nominal row position $110'^{(1)}$ as a result of the corresponding depressed locations $92.2^{(1)}$, $92.3^{(1)}$ of the associated first distinct light spot $30^{(1)}$ at the above-referenced second $t_2$ and third $t_3$ points in time. In an alternative configuration, if either the nominal longitudinal locations 60 ($Z_0^{(1)}$, $Z_0^{(2)}$) of the first $30^{(1)}$ and second $30^{(2)}$ distinct light spots were separated farther, or if the circular profile 80 was smaller, then the image 24 illustrated in FIG. 7b would be followed by that illustrated in FIG. 7c following the interaction of the first beam of light $52^{(1)}$ with the circular dip 82, after which both the first $30^{(1)}$ and second $30^{(2)}$ distinct light spots return to their corresponding nominal longitudinal locations 60 ($Z_0^{(1)}$, $Z_0^{(2)}$) on the roadway surface 32'. Otherwise, in the image 24 illustrated in FIG. 7d, the row position $110^{(1)}$ of the first distinct light spot image $24^{(1)}$ returns to the corresponding nominal row position $110'^{(1)}$ following interaction of the first beam of light $52^{(1)}$ with the circular dip 82, whereas the row position $110^{(2)}$ of the second distinct light spot image $24^{(2)}$ is below the corresponding nominal row position $110'^{(2)}$ responsive to the interaction of the second beam of light $52^{(2)}$ with the circular dip 82, for example, as described hereinabove in respect of FIGS. 4a-b for the above-referenced fourth point in time $t_4$. Finally, the image 24 illustrated in FIG. 7e illustrates the row positions $110^{(1)}$, $110^{(2)}$ of both the first $24^{(1)}$ and second $24^{(2)}$ distinct light spot images are each at the corresponding respective nominal row position $110'^{(1)}$, $110'^{(2)}$ following interaction of the second beam of light $52^{(2)}$ with the circular bump 82, for example, as described hereinabove in respect of FIGS. 4a-b for the fifth $t_5$, sixth $t_6$ and seventh $t_7$ points in time, wherein at the fifth point in time $t_5$ the row position $110^{(2)}$ of the second distinct light spot image $24^{(2)}$ this occurs just after having risen from a relatively depressed location.

Figure 8:
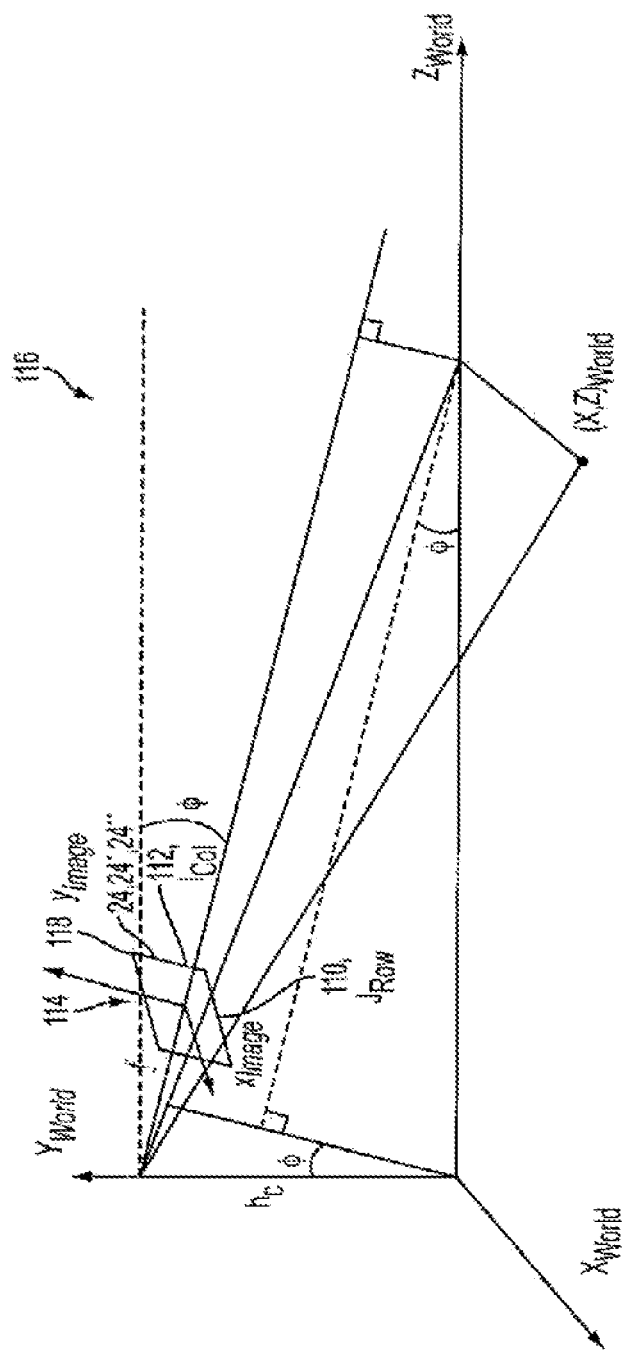
FIG. 8 illustrates the geometry of a single camera of an imaging system of a vehicular path sensing system.

Referring to FIG. 8, the horizontal $X_{Image}$ and vertical $Y_{Image}$ coordinates of a distinct light spot image $24^{(q)}$ in image space 114 (in units of pixels), —and associated column $I_{COL}$, $112^{(q)}$ and row $J_{ROW}$, $110^{(q)}$ coordinates thereof—can be related to corresponding cross-range $X_{World}$, down-range $Z_{World}$ and elevation $Y_{World}$ coordinates of the corresponding distinct light spot $30^{(q)}$ in real space 116 by a flat-earth model, wherein the down-range coordinate $Z_{World}$ is measured from the plane of the focal plane arrays (FPA) of the first 38.1 and second 38.2 cameras, positive forward, and the cross-range coordinate $X_{World}$ is measured from the center of the image system baseline 40, positive rightwards. The transformation from real space 116 to image space 114 is given by:

$$X_{Image} = \frac{f_X \cdot X_{World}}{Z_{World} \cdot \cos(\varphi) + (h_C - Y_{World}) \cdot \sin(\varphi)}, \quad (1)$$

having a corresponding column coordinate $I_{COL}$, $112^{(q)}$ of:

$$I_{COL} = X_{Image} + \frac{N_{COLS}}{2} + .5, \quad (2)$$

and $$Y_{Image} = \frac{f_Y \cdot (Z_{World} \cdot \sin(\varphi) - (h_C - Y_{World}) \cdot \cos(\varphi))}{Z_{World} \cdot \cos(\varphi) + (h_C - Y_{World}) \cdot \sin(\varphi)}, \quad (3)$$

having a corresponding row coordinate $J_{ROW}$, 110 of:

$$J_{ROW} = -Y_{Image} + \frac{N_{ROWS}}{2} + .5,$$

wherein $f_X$ and $f_Y$ are measures of the focal length of the camera lens 38' (e.g. in units of pixels) that provide for separate calibration along each separate dimension of the image, $h_C$ is the height of the camera 38 (i.e. the center of the imaging sensor thereof) above the flat earth, i.e. above a flat roadway surface 32', $\varphi$ is the pitch angle of the camera 38 relative to horizontal (positive downwards from horizontal, for example, in one embodiment, the camera 38 is pitched downwards by about 6 degrees, i.e. $\varphi=6$, when the vehicle is level), and the elevation $Y_{World}$ is the distance above the flat roadway surface 32', so that $Y_{World} > 0$ for a point above the roadway surface 32', and $Y_{World} < 0$ for a point below the roadway surface 32'.

The corresponding inverse transformation from image space 114 to real space 116 is given by:

$$X_{World} = \frac{(h_C - Y) \cdot X_{Image}}{f_X \cdot \sin(\varphi) - Y_{Image} \cdot \cos(\varphi)}, \text{ and} \quad (5)$$

$$Z_{World} = \frac{(h_C - Y_{World}) \cdot (f_Y \cdot \cos(\varphi) + Y_{Image} \cdot \sin(\varphi))}{f_Y \cdot \sin(\varphi) - Y_{Image} \cdot \cos(\varphi)}, \text{ or} \quad (6)$$

$$Y_{World} = h_C - \frac{Z_{World} \cdot (f_Y \cdot \sin(\varphi) - Y_{Image} \cdot \cos(\varphi))}{f_Y \cdot \cos(\varphi) + Y_{Image} \cdot \sin(\varphi)}. \quad (7)$$

using, from equations (2) and (4):

$$X_{Image} = I_{COL} - \frac{N_{COLS}}{2} - .5; \text{ and} \quad (8)$$

$$Y_{Image} = \frac{N_{ROWS}}{2} + .5 - J_{ROW}. \quad (9)$$

The coordinate system of real space 116 is centered with respect to the camera(s) 38, 38.1, 38.2, and oriented so that Z is parallel to the centerline 44 of the vehicle 12 and increases away from the camera(s) 38, 38.1, 38.2, X increases rightwards, and Y increases upwards. Per equations (2) and (4), the origin 118 of image space 114 is located in the upper-left corner, wherein the row $J_{ROW}$, 110 and column $I_{COL}$, 112 coordinates at the center of image space 114, i.e. at $I_{COL} = N_{COLS}/2$ and $J_{ROW} = N_{ROWS}/2$, correspond to corresponding image coordinate values of $X_{IMAGE} = 0$ and $Y_{IMAGE} = 0$, wherein the column coordinate $I_{COL}$ increases with increasing values of the value of corresponding image coordinate $X_{IMAGE}$, and the row coordinate $J_{ROW}$ decreases with increasing values of the value of corresponding image coordinate $Y_{IMAGE}$. Accordingly, from equation (3), for a given value of elevation $Y_{World}$, for increasing values of down-range $Z_{World}$, the corresponding image coordinate $Y_{IMAGE}$ increases and the corresponding row $J_{ROW}$, 110 decreases, whereas for a given value of down-range $Z_{World}$, for increasing values of elevation $Y_{World}$, the image coordinate $Y_{IMAGE}$ increases, and the corresponding row $J_{ROW}$, 110 decreases.

Figure 9:
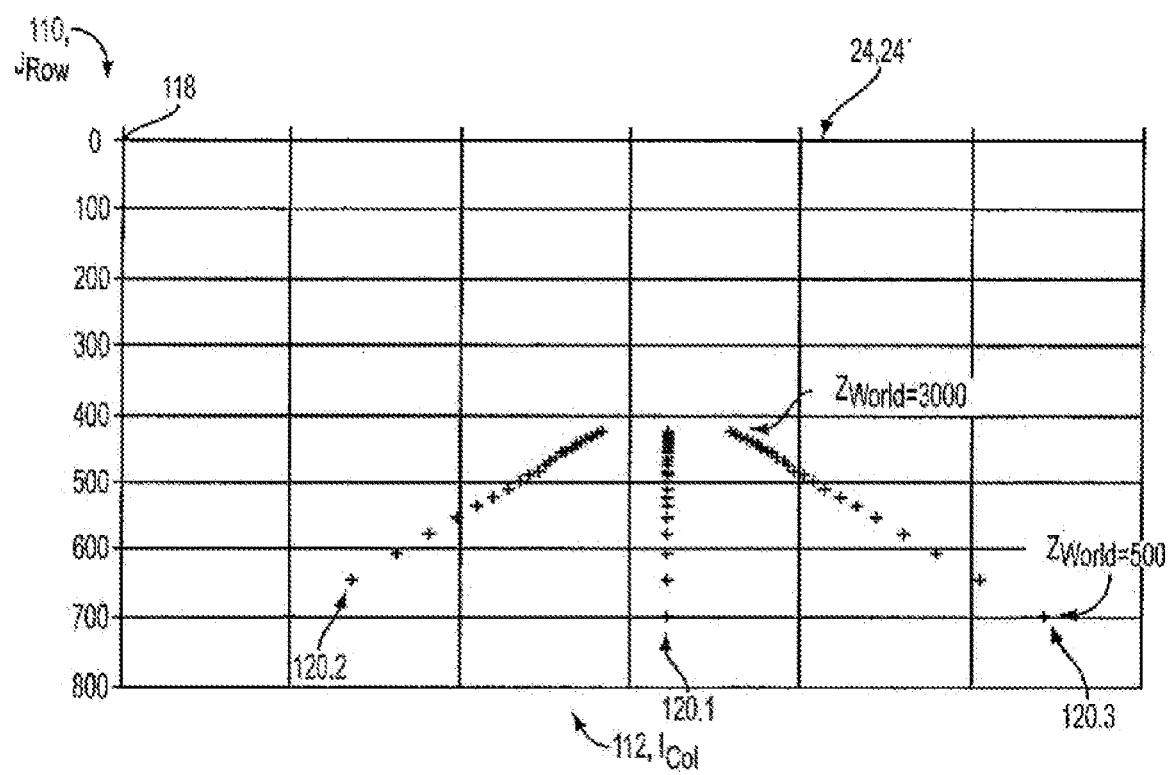
FIG. 9 illustrates three loci of points in image space for corresponding cross-range values in real space, each for a range of down-range values in real space and a fixed value of elevation along a level roadway surface.
Figure 10:
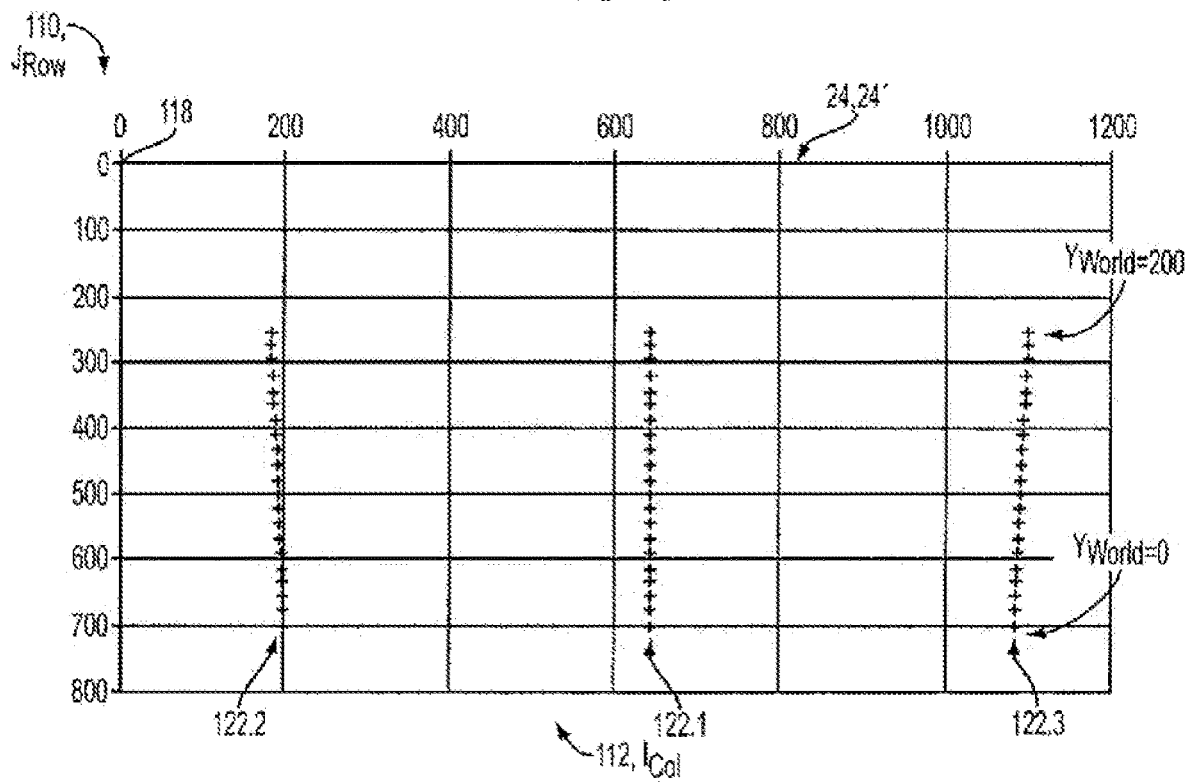
FIG. 10 illustrates three loci of points in image space for corresponding cross-range values in real space, each for a range of elevation values in real space and a fixed down-range value.

For example, using equations (1)-(4), for values of $f_X = f_Y = 1130$ pixels, $h_c = 150$ cm, $\varphi = 5.9$ degrees, $N_{COLS} = 1280$ and $N_{ROWS} = 964$, referring to FIG. 9, for values of elevation) $Y_{World} = 0$ in real space 116, i.e. points on an associated level roadway surface 32', a first 120.1, second 120.2 and third 120.3 loci of points in image space 114 respectively correspond, in real space 116, to respective values of cross-range of $X_{World} = 0$, $X_{World} = -200$ cm and $X_{World} = 200$ cm, each for a range of values of down-range $Z_{World}$ from 500 cm to 3000 cm, illustrating the effect of perspective in the associated image 24. Similarly, referring to FIG. 10, for values of down-range $Z_{World} = 500$ cm in real space 116, i.e. points relatively close to the vehicle 12, a first 122.1, second 122.2 and third 122.3 loci of points in image space respectively correspond, in real space 116, to respective values of cross-range of $X_{World} = 0$, $X_{World} = -200$ cm and $X_{World} = 200$ cm, each for a range of values of elevation $Y_{World}$ from 0 cm to 200 cm.

Accordingly, for a given height $h_C$ of the camera 38, 38.1, 38.2 above the flat roadway surface 32', the row position $J_{ROW}$ of the distinct light spot image(s) $24^{(q)}$ is directly responsive to the associated relative longitudinal location Z of the corresponding distinct light spot 30. Relative to that of a flat roadway surface 32', the location of a distinct light spot 30 encountering a dip 84" in the roadway surface 32' is relatively farther and relatively lower so that the corresponding row $J_{ROW}$ location of the associated distinct light spot image $24^{(q)}$ is relatively lower in the image 24. Similarly, relative to that of a flat roadway surface 32', the location of a distinct light spot 30 encountering a bump 82" in the roadway surface 32' is relatively closer and relatively higher so that the corresponding row $J_{ROW}$ location of the associated distinct light spot image $24^{(q)}$ is relatively higher in the image 24.

In accordance with a first aspect of sensing, the elevation Y of the surface 32 of the path 14, or an object 20 thereupon, is determined in real space 116 coordinates by transforming the sensed column $I_{COL}$, $112^{(q)}$ and row $J_{ROW}$, $110^{(q)}$ coordinates of each distinct light spot image $24^{(q)}$ to corresponding cross-range $X_{World}$, down-range $Z_{World}$, and elevation v World coordinates in real space 116, either absolutely, or relative to the nominal locations in real space 116 of corresponding nominal distinct light spots $30'^{(q)}$ based upon (the image-space locations of the column $I_{COL}$, $112^{(q)}$ and row $J_{ROW}$, $110^{(q)}$ coordinates relative to the corresponding associated column $I_{COL}'$, $112'^{(q)}$ and row $J_{ROW}'$, $110'^{(q)}$ calibration coordinates of the corresponding nominal distinct light spot image(s) $24'^{(q)}$ imaged during a calibration procedure.

For example, for a given beam of light 52 projected parallel to the roll axis 44/centerline 44 of the vehicle 12, the cross-range position $X_{World}$ of the distinct light spot $30^{(q)}$ is given by the corresponding cross-range position $X_S$ of the corresponding light source 50. For a given down-range position $Z_C^{(q)}$ of the associated distinct light spot $30^{(q)}$—either nominal or measured, as described more fully hereinbelow—equation (7) may be used to directly solve for the corresponding elevation Y as follows:

$$Y^{(q)} = h_C - \frac{Z^{(q)} \cdot (f_Y \cdot \sin(\varphi) - Y_{Image} \cdot \cos(\varphi))}{f_Y \cdot \cos(\varphi) + Y_{Image} \cdot \sin(\varphi)}. \quad (10)$$

In accordance with one embodiment, equation (10) is evaluated using the nominal longitudinal location $Z_0^{(q)}$ to approximate the value of the down-range position $Z_C^{(q)}$ of the associated distinct light spot $30^{(q)}$. Alternatively, a measurement of the actual down-range position $Z_C^{(q)}$ from a stereo vision system 36 incorporated in the imaging system 34 may be used in equation (10) so as to provide for better estimate of elevation Y.

Accordingly, the fidelity of the sensed elevation Y depends upon three aspects, as follows: 1) the manner in which a given distinct light spot $30^{(q)}$ follows the surface 32 of the path 14, or an object 20 thereupon, 2) the visibility of the distinct light spot $30^{(q)}$ by the associated imaging system 34, and 3) the degree to which the actual location of the distinct light spot $30^{(q)}$ can be ascertained from the corresponding distinct light spot image $24^{(q)}$ captured by the imaging system 34.

Figure 11:
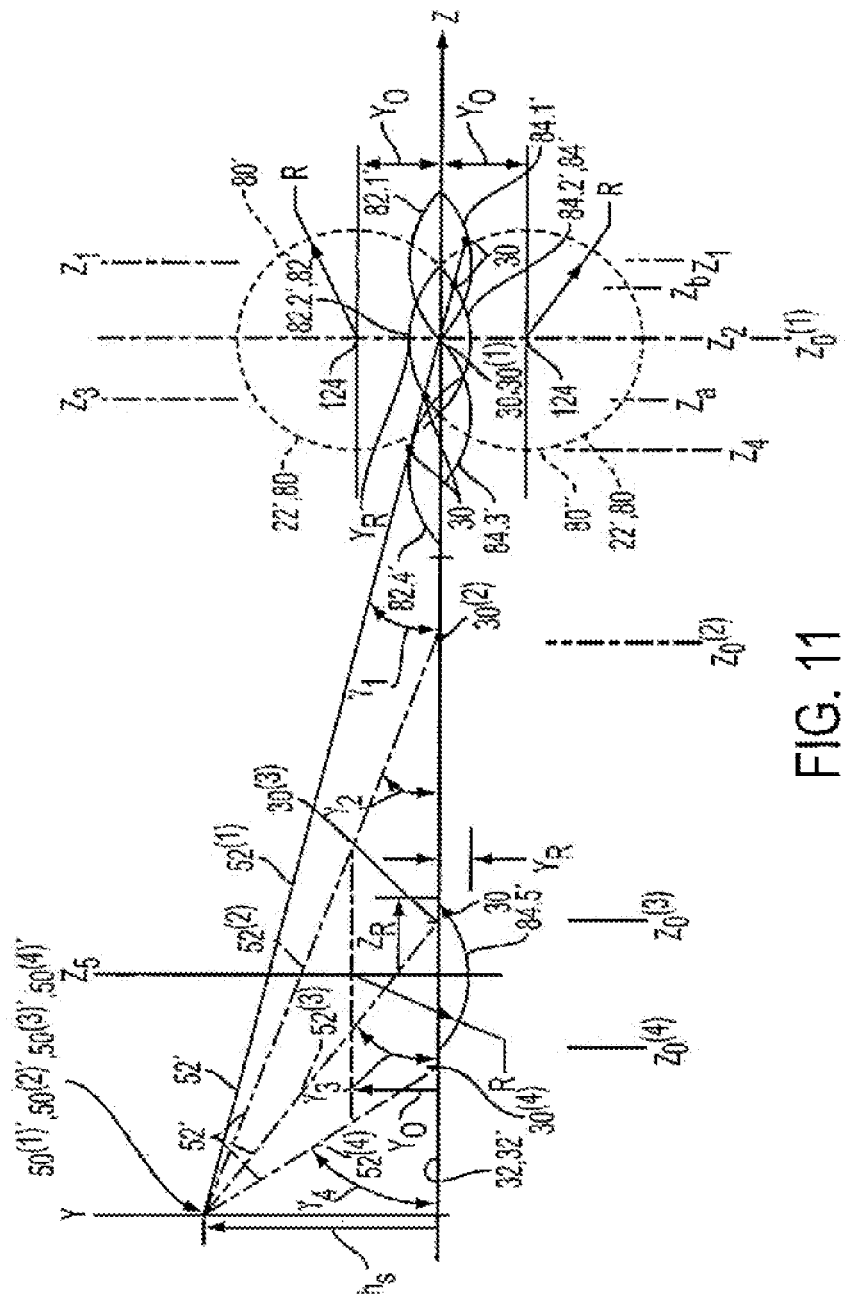
FIG. 11 illustrates geometries of a dip and a bump in a roadway surface in relation to a plurality of beams of light projected thereupon, at various separations from the source of the beams of light, as used to develop the plots of FIGS. 12-17.

Returning in greater detail to the first two aspects, referring to FIG. 11, there is illustrated a flat roadway surface 32' in relation to a corresponding set of four laser light sources $50^{(1)'}$, $50^{(2)'}$, $50^{(3)'}$, $50^{(4)'}$ each located at a height $h_S$ above the roadway surface 32', but projecting corresponding respective beams of light $52^{(1)}$, $52^{(2)}$, $52^{(3)}$, $52^{(4)}$ at corresponding different projection elevation angles $\gamma_1, \gamma_2, \gamma_3, \gamma_4$ downwards relative to horizontal. Similar to that illustrated in FIGS. 4a-b, perturbations to the otherwise flat roadway surface 32' are illustrated with circular bump 82' and circular dip 84' disturbances, each with a respective corresponding similarly-sized circular profile 80', 80", the center 124 of which are each offset by an offset distance $Y_0$, either below the flat roadway surface 32' for a circular bump 82', or above the flat roadway surface 32' for a circular dip 84', as illustrated in FIG. 11, so as to provide for modeling more-typical disturbances of a roadway surface 32' that can be substantially followed by the tires 126 of the vehicle 12, i.e. for which the radius R of the circular profiles 80', 80" is at least a great at the radius of the tire 126. Similar to that illustrated in FIGS. 4a-b, the centers 124 of the circular bump 82' and circular dip 84' are illustrated at various relative longitudinal locations $Z_1$, $Z_2$, $Z_3$, $Z_4$, $Z_5$, for example, at corresponding successively increasing points in time $t_1$, $t_2$, $t_3$, $t_4$, $t_5$, for a vehicle 12 traveling in the positive Z direction relative to a single stationary circular bump 82' or circular dip 84', similar to the scenarios described in respect of FIGS. 4a-b but with the relative longitudinal locations $Z_1$, $Z_2$, $Z_3$, $Z_4$, $Z_5$ measured relative to the common location of the laser light sources $50^{(1)'}$, $50^{(2)'}$, $50^{(3)'}$, $50^{(4)'}$.

Accordingly, as the vehicle 12 travels in the positive Z direction, the circular bump 82' or circular dip 84' is first illuminated by the first beam of light $52^{(1)}$ from the first laser light source $50^{(1)'}$, then by the second beam of light $52^{(2)}$ from the second laser light source $50^{(2)'}$, then by the third beam of light $52^{(3)}$ from the third laser light source $50^{(3)}$, and finally by fourth beam of light $52^{(4)}$ from the fourth laser light source $50^{(4)}$. At any given point in time, for a particular beam of light 52 intersecting a particular circular bump 82' or circular dip 84', the resulting distinct light spot 30 is located at the intersection of the beam of light 52 with the associated circular profile 80', 80". For example, at the second point in time $t_2$, for which the relative longitudinal location $Z_2$ of the circular bump 82' or circular dip 84' is the same as the nominal longitudinal location $Z_0^{(1)}$ of the first distinct light spot $30^{(1)}$ when on a flat roadway surface 32', the first beam of light $52^{(1)}$ intersects the corresponding circular bump 82.2 at a first longitudinal location $Z=Z_a$, and intersects the corresponding circular dip 84.2 at a second longitudinal location $Z=Z_b$, wherein the first longitudinal location $Z_a$ is closer to the vehicle 12 than the second longitudinal location $Z_b$.

For the path 14 in accordance with FIG. 11, the beam of light 52 is modeled as a line 52':

$$Y = m \cdot Z + h_S, \quad (11)$$

the slope m of which is given by:

$$m = -\frac{h_S}{Z_0}, \quad (12)$$

recalling that $h_S$ is the fixed common height of the laser light sources $50^{(1)'}$, $50^{(2)'}$, $50^{(3)'}$, $50^{(4)'}$ above the roadway surface 32', and $Z_0$ is the fixed location of the distinct light spot 30 when projected onto a flat roadway surface 32', relative to the vehicle 12.

The circular profiles 80', 80" of the circular bump 82' or circular dip 84' centered at $Y=Y_0$ and $Z=Z_S$ are modeled as:

$$(Y-Y_0)^2 + (Z-Z_S)^2 = R^2, \quad (13)$$

wherein $Y_0 > 0$ for the circular dip 84, $Y_0 < 0$ for the circular bump 82, and $Z_S$ is the longitudinal distance from the common location of the laser light sources $50^{(1)'}$, $50^{(2)'}$, $50^{(3)'}$, $50^{(4)'}$ to the center of the circular profile 80', 80", which accordingly provides a measure of the location of the vehicle 12 relative to the circular bump 82' or circular dip 84".

The distinct light spot 30 is located at the intersection of the line 52' and the circular profiles 80', 80", found by the substituting equation (12) into equation (12)) into equation (13) as follows:

$$\left(-h_S \cdot \left(\frac{Z}{Z_0}\right) + (h_S - Y_0)\right)^2 + (Z - Z_S)^2 = R^2. \quad (14)$$

Reformulating equation (14) as a second order polynomial with respect to $$\frac{Z}{Z_0}$$

gives:

$$(Z_0^2 + h_S^2)\left(\frac{Z}{Z_0}\right)^2 - \quad (15)$$
$$2(h_S(h_S - Y_0) + Z_0 \cdot Z_S)\left(\frac{Z}{Z_0}\right) + (Z_S^2 + (h_S - Y_0)^2 - R^2) = 0,$$

or $$a\left(\frac{Z}{Z_0}\right)^2 + b\left(\frac{Z}{Z_0}\right) + c = 0, \quad (16)$$

which has the following solutions:

$$\left(\frac{Z}{Z_0}\right) = -\frac{b}{2a} \pm \sqrt{b^2 - 4ac}. \quad (17)$$

The resulting Z coordinate of each corresponding distinct light spot 30 is then given by:

$$Z = Z_0 \cdot \left(\frac{Z}{Z_0}\right). \quad (18)$$

From equation (13), the corresponding Y coordinates of the distinct light spots 30 on a circular bump 82' (+) and circular dip 84" (−) are then given by:

$$Y = Y_0 \pm \sqrt{R^2 - (Z - Z_S)^2}. \quad (19)$$

The Y and Z locations of the distinct light spot 30 can be normalized with respect to the corresponding maximum elevation $Y_R$ of the circular bump 82' or circular dip 84", and the half-chord length $Z_R$ that are respectively given as:

$$Y_R = R - Y_0, \text{ and} \quad (20)$$

$$Z_R = \sqrt{R^2 - Y_0^2}. \quad (21)$$

Figure 12:
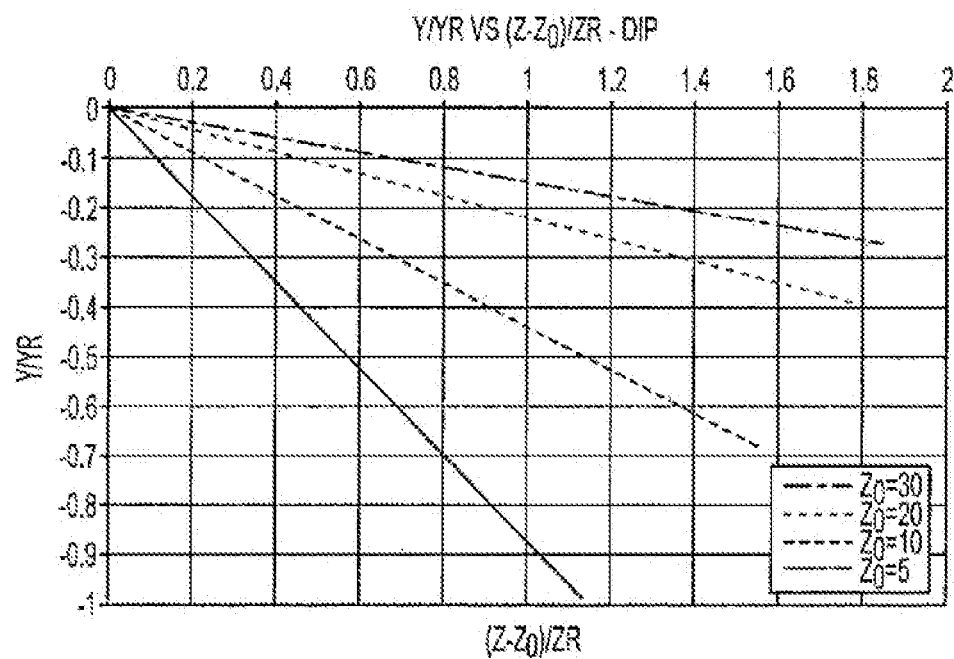
FIG. 12 illustrates a family of plots of normalized elevation of a light spot projected onto a dip in a roadway surface by a corresponding beam of light, for the various corresponding light beam projection geometries illustrated in FIG. 11.
Figure 13:
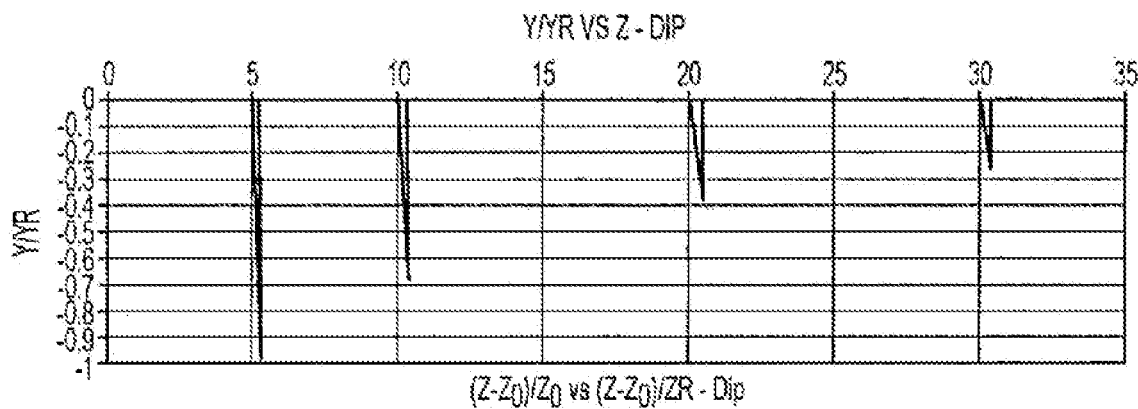
FIG. 13 illustrates a plot of normalized elevations of light spots projected onto a dip in a roadway surface for a range of distances of the dip from the sources of the corresponding beams of light for the light beam projection geometries as illustrated in FIG. 11.
Figure 14:
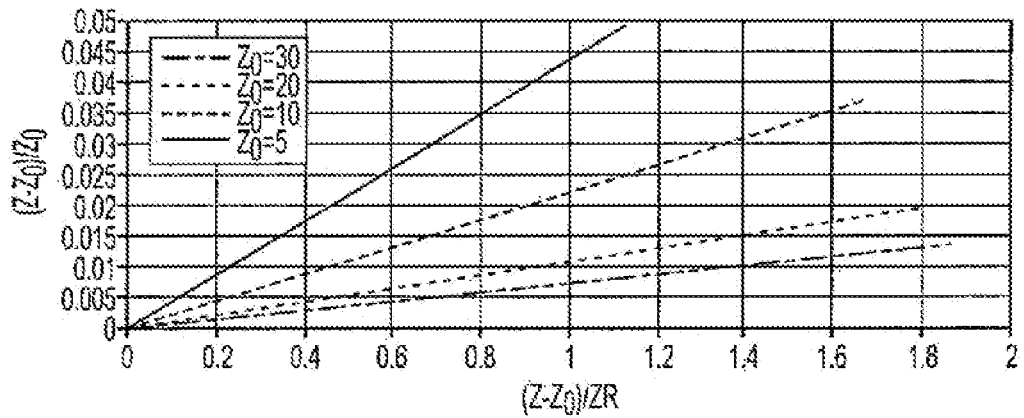
FIG. 14 illustrates the relative difference between actual and nominal longitudinal distance of the light spots from the corresponding light sources as a function of normalized distance from the light sources, corresponding to FIGS. 12 and 13 for the various corresponding light beam projection geometries illustrated in FIG. 11.
Figure 15:
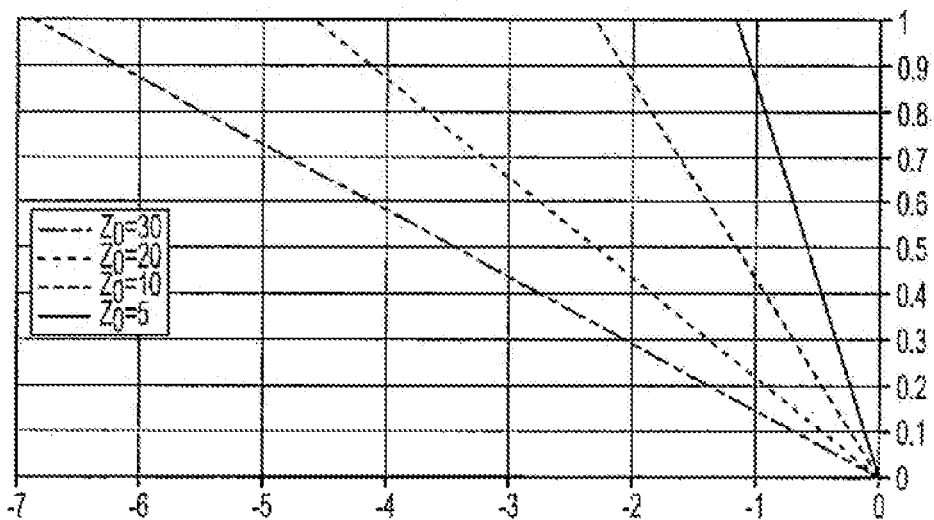
FIG. 15 illustrates a family of plots of normalized elevation of a light spot projected onto a bump on a roadway surface by a corresponding beam of light, for the various corresponding light beam projection geometries illustrated in FIG. 11.
Figure 16:
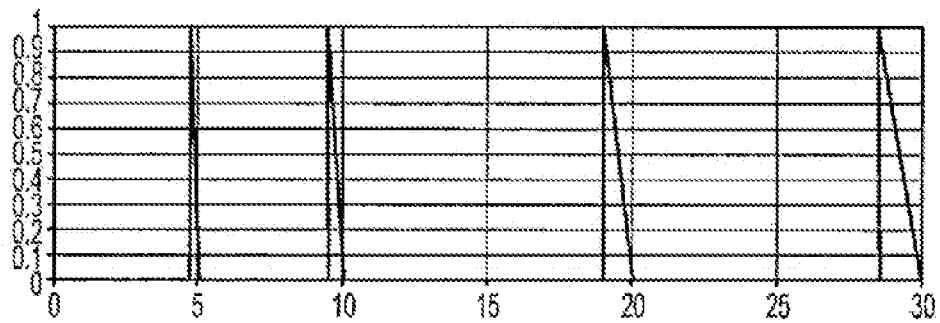
FIG. 16 illustrates a plot of normalized elevations of light spots projected onto a bump on a roadway surface for a range of distances of the dip from the sources of the corresponding beams of light for the light beam projection geometries as illustrated in FIG. 11.
Figure 17:
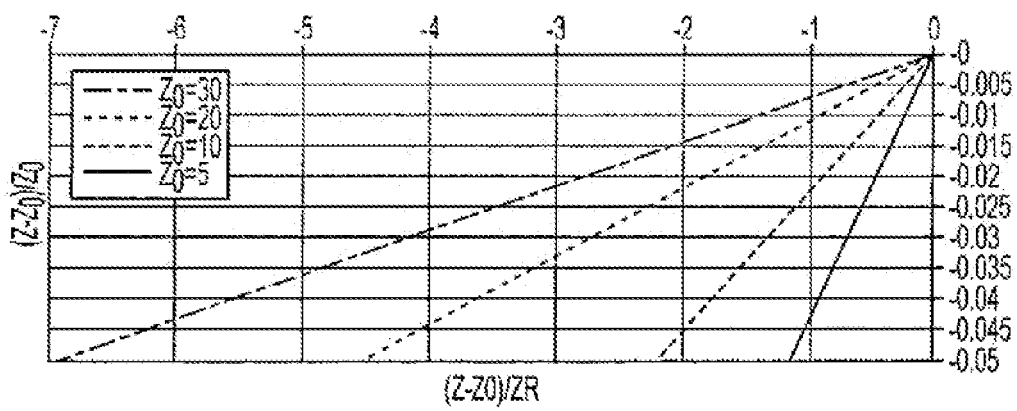
FIG. 17 illustrates the relative difference between actual and nominal longitudinal distance of the light spots from the corresponding light sources as a function of normalized distance from the light sources, corresponding to FIGS. 15 and 16 for the various corresponding light beam projection geometries illustrated in FIG. 11.

With reference to the geometry of FIG. 11, referring to FIGS. 12-14 for a circular dip 84', and FIGS. 15-17 for a circular bump 82', the location of a distinct light spot 30 on a circular dip 84' and circular bump 82', respectively, was simulated for four different beams of light $52^{(1)}$, $52^{(2)}$, $52^{(3)}$, $52^{(4)}$ from corresponding laser light sources $50^{(1)'}$, $50^{(2)'}$, $50^{(3)'}$, $50^{(4)'}$ each at a height $h_S$ of 1 meter above the roadway surface 32', at corresponding nominal longitudinal locations $Z_0^{(1)}$, $Z_0^{(2)}$, $Z_0^{(3)}$, $Z_0^{(4)}$ of respective 5, 10, 20 and 20 meters from the laser light sources $50^{(1)'}$, $50^{(2)'}$, $50^{(3)'}$, $50^{(4)'}$, wherein the radius R of the corresponding circular profiles 80', 80" was 0.5 meters, and the corresponding offset distances $Y_O$ were 0.45 meters for the circular dip 84", and −0.45 meters for the circular bump 82'.

More particularly, for a circular dip 84", FIG. 12 is a plot of normalized elevation $Y/Y_R$ of the distinct light spot 30 as a function of normalized relative longitudinal distance $(Z-Z_0)/Z_R$ relative to the corresponding nominal longitudinal location $Z_0^{(1)}$, $Z_0^{(2)}$, $Z_0^{(3)}$, $Z_0^{(4)}$ of the corresponding distinct light spot 30, for each of the different beams of light $52^{(1)}$, $52^{(2)}$, $52^{(3)}$, $52^{(4)}$, wherein as described hereinabove for FIGS. 4a-b, the maximum detectable elevation Y is less than the maximum elevation $Y_R$ of the circular dip 84' as a result of shadowing by the leading edge 86 thereof, but increases with increasing projection elevation angle $\gamma_1$, $\gamma_2$, $\gamma_3$, $\gamma_4$ of the associated beams of light $52^{(1)}$, $52^{(2)}$, $52^{(3)}$, $52^{(4)}$ as the circular dip 84" becomes closer to the vehicle 12. This is further illustrated in FIG. 13 which is a plot of the normalized elevation $Y/Y_R$ of the distinct light spot 30 as a function of absolute longitudinal distance Z from the laser light sources $50^{(1)'}$, $50^{(2)'}$, $50^{(3)'}$, $50^{(4)'}$. Accordingly, the degree to which the maximum detectable depth of the distinct light spot 30 follows the actual maximum elevation $Y_R$ of the circular dip 84" improves with decreasing longitudinal distance $Z_S$ of the circular dip 84" relative to the vehicle 12.

A stereo vision system 36 would provide for measuring the actual longitudinal distance Z of the distinct light spot 30. Alternatively, for example, if the imaging system 34 incorporates a monocular vision system, i.e. using only a single camera 38, then the longitudinal distance Z of the distinct light spot 30 would need to be estimated, for example, from or as the nominal longitudinal location $Z_0^{(1)}$, $Z_0^{(2)}$, $Z_0^{(3)}$, $Z_0^{(4)}$ associated with the corresponding beam of light $52^{(1)}$, $52^{(2)}$, $52^{(3)}$, $52^{(4)}$. (Referring to FIG. 14, the relative error of the using the nominal longitudinal location $Z_0^{(1)}$, $Z_0^{(2)}$, $Z_0^{(3)}$, $Z_0^{(4)}$ instead of the actual longitudinal distance Z of the distinct light spot 30, which is plotted as a function of the normalized relative longitudinal distance $(Z-Z_0)/Z_R$, is relatively lower for relatively farther distinct light spots 30 than for relatively closer distinct light spots 30.

Similarly, for a circular bump 82', FIG. 15 is a plot of normalized elevation $Y/Y_R$ of the distinct light spot 30 as a function of normalized relative longitudinal distance $(Z-Z_0)/Z_R$ relative to the corresponding nominal longitudinal location $Z_0^{(1)}$, $Z_0^{(2)}$, $Z_0^{(3)}$, $Z_0^{(4)}$ of the corresponding distinct light spot 30, for each of the different beams of light $52^{(1)}$, $52^{(2)}$, $52^{(3)}$, $52^{(4)}$. FIG. 16 illustrates a corresponding plot of the normalized elevation $Y/Y_R$ of the distinct light spot 30 as a function of absolute longitudinal distance Z from the laser light sources $50^{(1)'}$, $50^{(2)'}$, $50^{(3)'}$, $50^{(4)'}$, which illustrates a relatively sharp drop-off in detectable elevation resulting from the above-described shadowing by the relatively forward portion 90 of circular bump 82'. Referring to FIG. 17, the relative error of using the nominal longitudinal location $Z_0^{(1)}$, $Z_0^{(2)}$, $Z_0^{(3)}$, $Z_0^{(4)}$ instead of the actual longitudinal distance Z of the distinct light spot 30, which is plotted as a function of the normalized relative longitudinal distance $(Z-Z_0)/Z_R$, is again relatively lower for relatively farther distinct light spots 30 than for relatively closer distinct light spots 30.

Referring again to FIGS. 13 and 16, the plurality of beams of light $52^{(1)}$, $52^{(2)}$, $52^{(3)}$, $52^{(4)}$ within a substantially common plane aligned with the longitudinal axis 44 of the vehicle 12 provide for repeatedly monitoring the same disturbance to, or portion of, the path 14, or object 20 thereupon, with each beam of light $52^{(1)}$, $52^{(2)}$, $52^{(3)}$, $52^{(4)}$ over time at different times, so as to provide for improving an estimate of the associated elevation profile 22' over time. For example, either for a vehicle 12 traveling at a constant rate of speed, or if the speed of the vehicle 12 is accounted for, the abscissa axis of each of FIGS. 13 and 16 is also responsive to, or relatable to, time, so that knowing the nominal longitudinal location $Z_0^{(1)}$, $Z_0^{(2)}$, $Z_0^{(3)}$, $Z_0^{(4)}$ of the corresponding distinct light spots 30, the resulting time series can be transformed from a time domain to a distinct-light-spot-relative spatial domain, for example, as illustrated in FIGS. 12 and 15, so as to provide for better analyzing the associated profile 22' of the path 14, or object 20 thereupon.

Figure 18A:
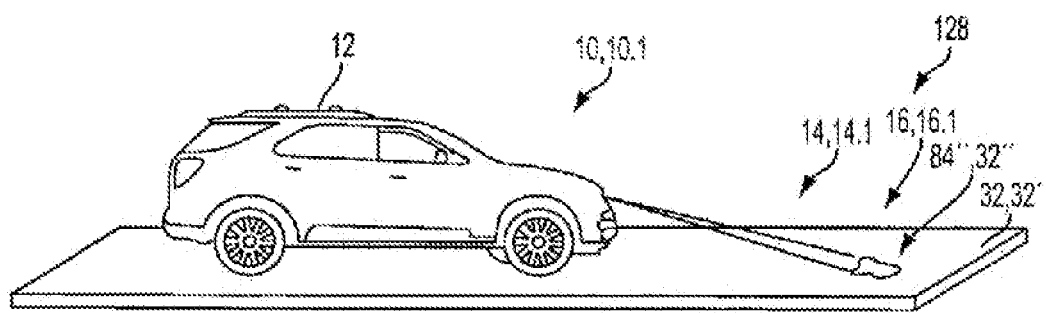
FIG. 18a illustrates a perspective view of a right side of a vehicle incorporating a forward-looking vehicular path sensing system in operation along a vehicular path with a negative path feature.
Figure 18B:
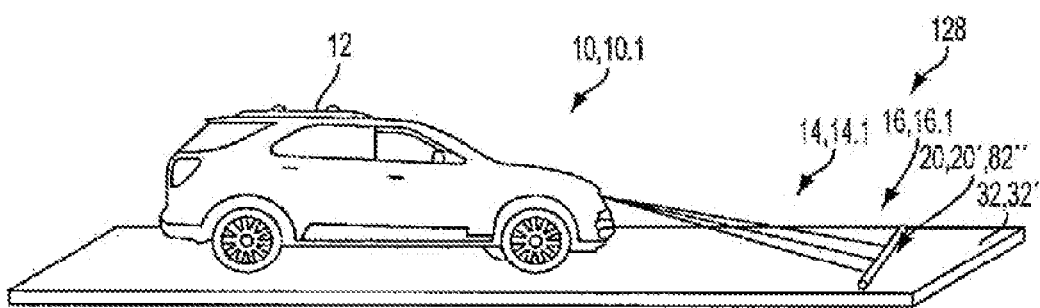
FIG. 18b illustrates a perspective view of the right side of a vehicle incorporating a forward-looking vehicular path sensing system as in FIG. 18a, in operation along a vehicular path with a positive path feature.

Referring to FIGS. 18a and 18b, in accordance with a first aspect, when implemented as a forward-looking vehicular path sensing system 10.1, the associated light projection system 18, 18.1 provides for projecting a structured light pattern 16, 16.1 forward of the vehicle 12 so as to provide for sensing the forward path 14.1 in advance of travel thereupon by the vehicle 12. For example, the associated light projection system 18, 18.1 could be located either above the windshield of the vehicle 12, at the front of the vehicle 12 above, below or within the louvered front grille, or within the headlight enclosures. For example, FIG. 18a illustrates the projection of a structured light pattern 16, 16.1 onto a depression 32" in a roadway surface 32', and FIG. 18b illustrates the projection of a structured light pattern 16, 16.1 onto a texture-less pipe 20' on the roadway surface 32', whereby the displacement of the distinct light spot image(s) $24^{(q)}$ in the resulting image is responsive to the height profile 22' of the depression 32" or texture-less pipe 20'. The imposition of the structured light pattern 16, 16.1 upon the visual scene 128 provides for a detection thereof even under otherwise suboptimal viewing conditions such as relatively low ambient illumination, night operation generally and particularly with defective or ineffective headlights, at relatively high speeds, or when viewing through a dirty or otherwise obscured windshield (for example, as might result from defective windshield wipers); or for viewing surfaces that otherwise lack texture or physical structure. For example, stereo ranging operates by measuring disparities i.e. column shifts between correlated structures as they appear in the left and right images generated by corresponding left 38.1 and right 38.2 cameras of the associated stereo vision system 36. Absent the structured light pattern 16, 16.1 imposed upon the visual scene 128, under the above suboptimal viewing conditions, or for texture-less objects or surfaces, the resulting images can become blurred or defocused to some extent, which can interfere with the associated stereo-imaging process and possibly result in associated ambiguity in the resulting stereo image. However, the structured light pattern 16, 16.1 separately viewed by the left 38.1 and right 38.2 cameras provides for a direct determination of the associated down-range coordinate $Z_{World}$ of each associated distinct light spot $30^{(q)}$ by directly measuring the associated disparity DX from the corresponding left 24.1 and right 24.2 images thereof, wherein disparity DX is the absolute difference in associated cross-range coordinates $X_{Image}$, or corresponding column coordinates $I_{COL}$, of corresponding distinct light spot image(s) $24^{(q)}$ of the same distinct light spot $30^{(q)}$ in each of the left 24.1 and right 24.2 images, for each of the plurality of distinct light spots $30^{(q)}$, without otherwise requiring the generation of a complete range map image from the left 24.1 and right 24.2 images. Given the real space 116 down-range coordinate $Z_{World}$ of a particular distinct light spot 30, the corresponding associated real space 116 elevation coordinate $Y_{World}$ may then be determined from the corresponding image space 114 vertical coordinate $Y_{Image}$, using equation (7), or from the or corresponding row coordinate $J_{ROW}$, 110 using equations (4) and (7), so as to provide for determining the elevation profile 22' of the path 14 over which the vehicle 12 might travel at future points in time.

Figure 19:
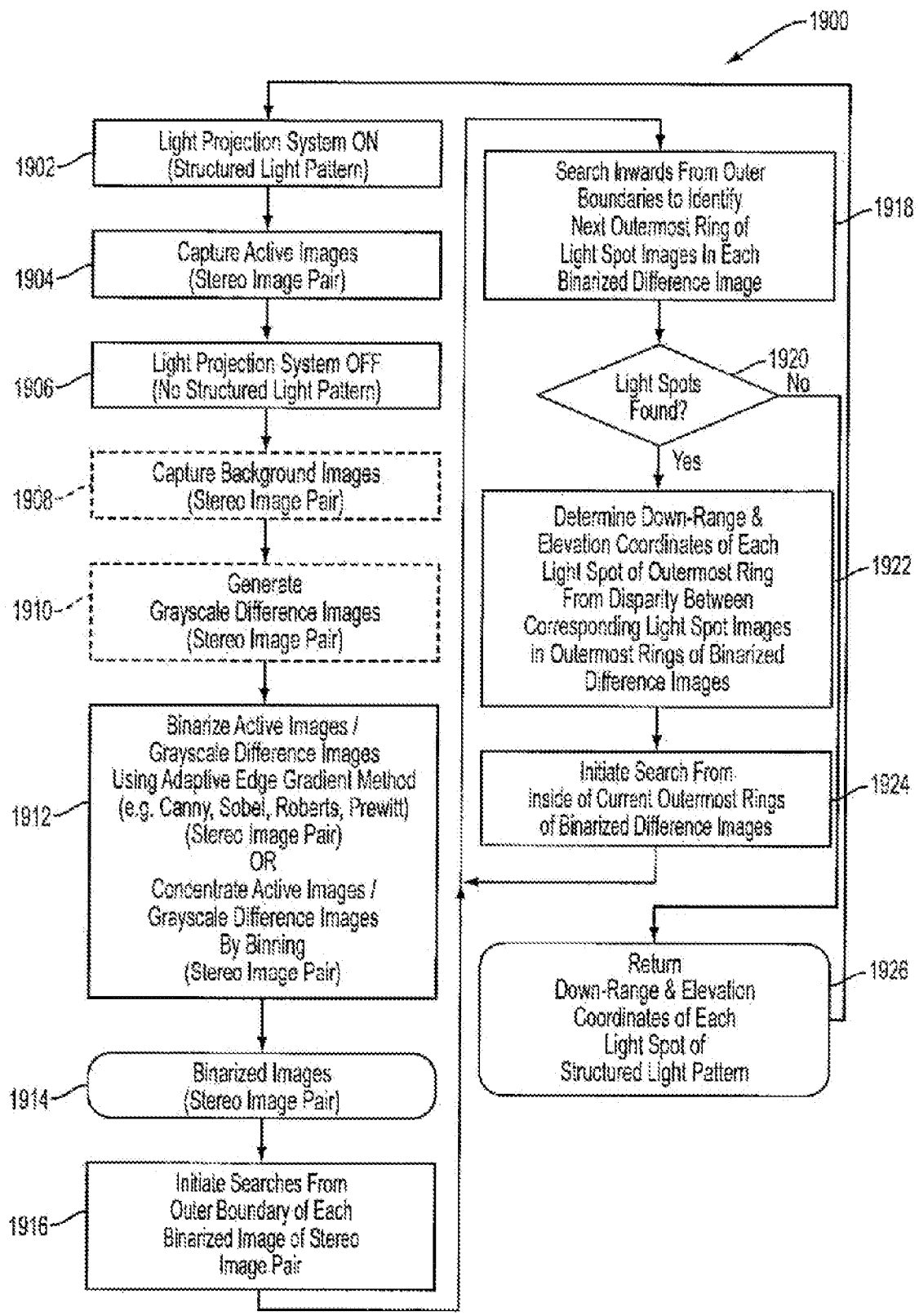
FIG. 19 illustrates a flow chart of a first process for measuring downrange and elevation coordinates of a plurality of distinct light spots projected from a vehicular path sensing system incorporating an associated stereo vision system.
Figure 20A:
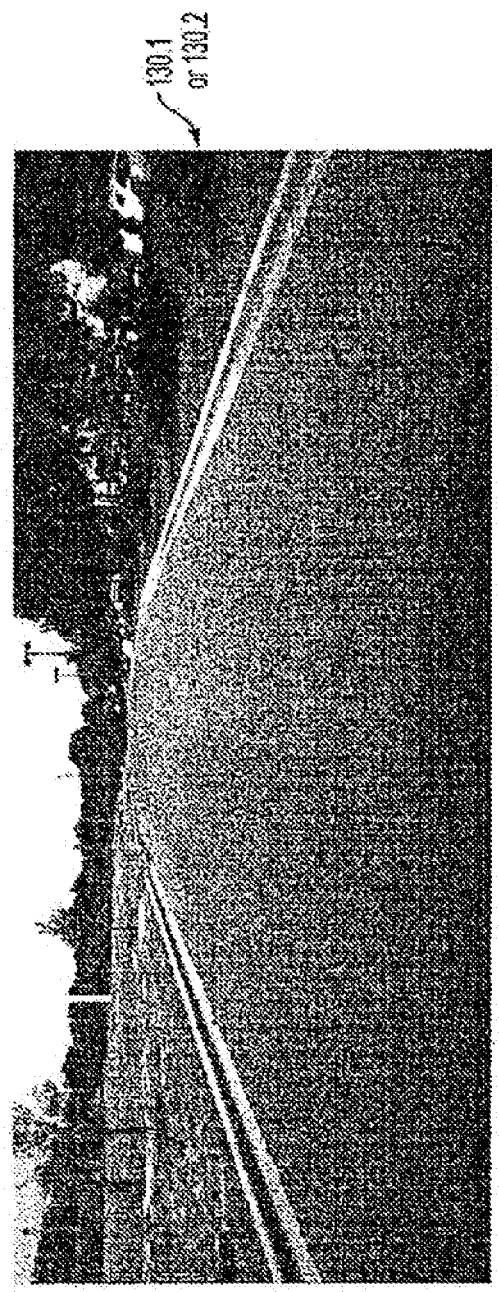
FIG. 20a illustrates an image of a path of a vehicle along a drivable roadway surface as seen by an associated imaging subsystem of a vehicular path sensing system.
Figure 20B:
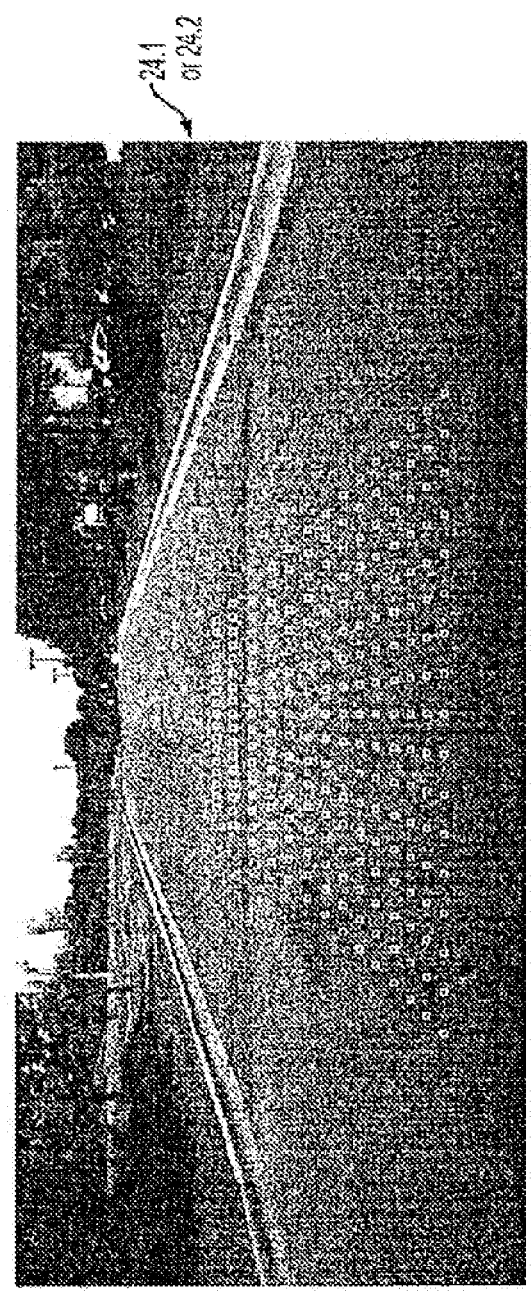
FIG. 20b illustrates an image of the drivable roadway surface path of the vehicle corresponding to FIG. 20a, but including a structured light pattern projected onto the drivable roadway surface by an associated light projection system of the vehicular path sensing system.

In accordance with a first set of embodiments, FIG. 19 illustrates a first process 1900 for determining the real space 116 down-range coordinate $Z_{World}$ of each of a plurality of distinct light spots 30 of an associated structured light pattern 16, 16.1 directly from associated left 24.1 and right 24.2 images of a visual scene 128, captured with an associated stereo vision system 36, which commences with step (1902) by turning the light projection system 18, 18.1 ON, after which, in step (1904), a first stereo image pair, i.e. left 24.1 and right 24.2 images, is captured by the left 38.1 and right 38.2 cameras of the stereo vision system 36, for example, as illustrated in FIG. 20*b* for one of the left 38.1 and right 38.2 cameras, with the structured light pattern 16, 16.1 superimposed on the visual scene 128 of the corresponding background images 130.1, 130.2. Then, the light projection system 18, 18.1 turned OFF in step (1906). If the contrast between the distinct light spot image(s) $24^{(q)}$ and the associated background portion of the image 24 is less than a threshold, then, in step (1908), a second stereo image pair, i.e. left 130.1 and right 130.2 background images, is captured by each of the left 38.1 and right 38.2 cameras without the structured light pattern 16, 16.1, for example, as illustrated in FIG. 20*a* for one of the left 38.1 and right 38.2 cameras, after which, in step (1910), the left 130.1 and right 130.2 background images captured in step (1908) are subtracted from the left 24.1 and right 24.2 images captured in step (1904) so as to generate a corresponding set of left 132.1 and right 132.2 grayscale difference images, for example, as illustrated in FIG. 20*c* for one of the grayscale difference images. Alternatively, if the contrast is sufficiently great, for example, if the ratio of peak pixel level within a distinct light spot image(s) $24^{(q)}$ to the pixel level of a background pixel is greater than a threshold, e.g. 3-to-1 for example, during nighttime operation, —then FIG. 20*c* instead can be considered to illustrate one of the left 24.1 and right 24.2 images that was captured with the light projection system 18, 18.1 ON. If the contrast is sufficiently great so as to provide for using the left 24.1 and right 24.2 images directly without need for associated left 132.1 and right 132.2 grayscale difference images, then this provides for processing at twice the frame rate because active left 24.1 and right 24.2 images may be acquired continuously rather than being interspersed with the acquisition of left 130.1 and right 130.2 background images.

For example, in one embodiment, each laser light source 50' comprises a 650 nanometer Class IIIa laser diode 50" capable of operating at 12 milliwatts maximum power, which is considered to be eye-safe if viewed momentarily. Each laser diode 50" cooperates with a corresponding infrared filter that provides for substantially removing corresponding wavelengths that are invisible to the human eye that could otherwise cause damage thereto without warning. Alternatively, one or more of the laser light sources 50' may operate at a frequency that is invisible to humans, but which is otherwise detectable by the associated imaging system 34 using suitably optically-transmissive material for the automotive windshield if the associated one or more cameras 38 are configured to view the visual scene 128 therethough. Generally, the laser diode 50" of the light projection system 18, 18.1, 18.2 could be any such device qualified for automotive applications. For example, a Class IIIb laser diode 50" operating at 500 nanometers and capable of 200 milliwatts of maximum power would provide for a relatively extended detection distances of approximately 12 meters day or night. Typically, the associated beams of light 52 will not be visible, even when operating at visible wavelengths. However, the laser diodes 50" may be operated at wavelengths that are imperceptible to human vision, but within the sensitivity of the photoelectric material of the camera 38. For example, in one embodiment, the laser light sources 50', e.g. individual laser diodes 50", were assembled into an array with fixed downrange (DR) and cross range (CR) spacing relative to a flat roadway surface 32' while the vehicle 12 was stationary (at nominal static pitch and roll angles).

For example, FIG. 21*a* illustrates a distinct light spot 30 from an associated beam of light 52 generated by the above-described 650 nanometer Class IIIa laser diode 50" capable of operating at 12 milliwatts maximum power, projected onto a concrete roadway surface 32' during daylight conditions, whereas FIG. 21*b* illustrates the same distinct light spot 30 at night, at 7 meters downrange from the associated camera 38. For example, in one embodiment, under daylight conditions, the distinct light spot 30 is about 8 millimeters in diameter, whereas the relatively larger distinct light spot 30 in FIG. 21*b* at night approximated 2.2 times greater area than in FIG. 21*a* during daylight conditions is a result of a corresponding relatively longer exposure time, for example, 0.12 seconds at night, but only 0.01 seconds during the day. It should be understood that the particular size of the distinct light spot 30 can be adapted to the particular resolution requirement of the associated vehicular path sensing system 10. The relatively longer nighttime exposure time can be beneficial in providing for operation at relatively longer longitudinal distances than would otherwise be possible during the day, and in providing for the corresponding associated distinct light spot image(s) $24^{(q)}$ to become smeared into an associated light stripe that provides relatively more information about the underlying path 14 than a circular spot of light. In one set of embodiments, the structured light pattern 16, 16.1, 16.2 does not necessarily need to be visible under direct sunlight conditions, but instead is intended to operate during ambient lighting conditions that might otherwise non-optimal for a vision-only object or path sensing system.

Returning to the process 1900 of FIG. 19, in step (1912), each of the left 132.1 and right 132.2 grayscale difference images or, if only active left 24.1 and right 24.2 images are recorded, then each of the left 24.1 and right 24.2 images— are each binarized, for example, so that each pixel of the binarized image has one of two values, for example, 0 or 1. For example, in one embodiment, intensity values above a threshold value are converted to a binary 1 value, and intensity values less than or equal to a threshold value are converted to a binary 0 value, so as to facilitate subsequent image processing. In accordance with another set of embodiments, given the spreading of the distinct light spot 30 as illustrated in FIGS. 21*a* and 21*b*, the left 132.1 and right 132.2 grayscale difference images or, if only active left 24.1 and right 24.2 images are recorded, then each of the left 24.1 and right 24.2 images—are each processed using an adaptive edge gradient method, for example, using either a Canny filter, a Sobel filter, a Roberts filter, or a Prewitt filter, that provide for generating a binarized image while also sharpening the edges of the associated distinct light spots 30. In accordance with one set of embodiments, the location of each associated distinct light spot image $24^{(q)}$ in image space 114 is given by the centroid of the associated resulting edge points that result from the adaptive edge gradient method. For example, the centroid location may be calculated from either all or a sampling of the edge points. As will be described more fully hereinbelow with reference to FIGS. 48-50, in accordance with another set of embodiments, alternatively, each of the left 132.1 and right 132.2 grayscale difference images or, if only active left 24.1 and right 24.2 images are recorded, then each of the left 24.1 and right 24.2 images may be concentrated by binning, the result of which directly provides the locations of each associated distinct light spot image $24^{(q)}$ in image space 114. The result of step (1912) is indicated in step (1914) as a set of left 134.1 and right 134.2 binarized images that are then subsequently processed to determine the corresponding relative locations of each distinct light spot 30 in the left 134.1 and right 134.2 binarized images, relative to one another, so as to provide for determining therefrom the disparity DX and associated down-range coordinate $Z_{World}$ associated with each distinct light spot 30.

More particularly, referring to FIGS. 22a and 22b, in step (1916), a search for distinct light spots 30 is commenced for each of the left 134.1 and right 134.2 binarized images, for example, either beginning with the corresponding respective outermost boundaries 136.1, 136.2 of the respective left 134.1 and right 134.2 binarized images, or beginning with corresponding respective effective outer boundaries 138.1, 138.2 that define predetermined regions-of-interest known to contain the corresponding associated respective images 24.1, 24.2 of the structured light pattern 16, 16.1. FIGS. 22a and 22b illustrate the distinct light spot image(s) $24^{(q)}$ of the left 134.1 and right 134.2 binarized images organized in a plurality of nested rings 140, $140^i$, $140^{ii}$, $140^{iii}$, $140^{iV}$, $140^v$, $140^{vi}$, $140^{vii}$—suffixed by either "0.1" or "0.2" to designate the corresponding left 134.1 or right 134.2 binarized image each of which is successively identified in step (1918) and then processed in steps (1920)-(1924), wherein each nested rings 140, $140^i$, $140^{ii}$, $140^{iii}$, $140^{iv}$, $140^v$, $140^{vi}$, $140^{vii}$ has a corresponding similarly-designated outer boundary $138^i$, $138^{ii}$, $138^{iii}$, $138^{iv}$, $138^v$, $138^{vi}$, $138^{vii}$ that are successively identified in step (1918) as described more fully hereinbelow.

Figure 23A:
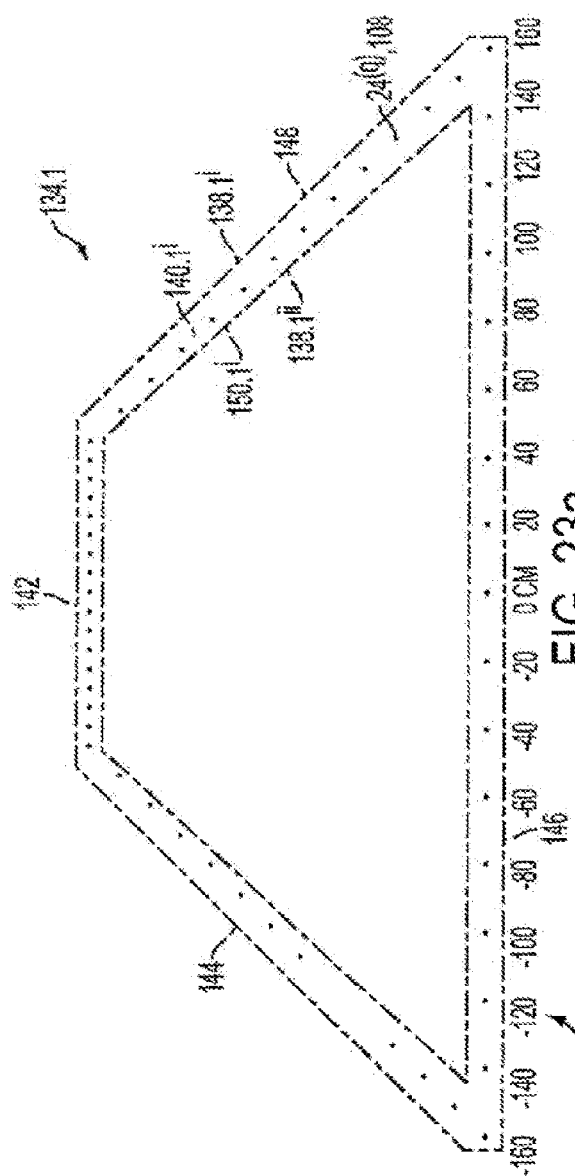
FIGS. 23a and 23b illustrate an outermost, first pair of nested rings from FIGS. 22a and 22b.
Figure 23B:
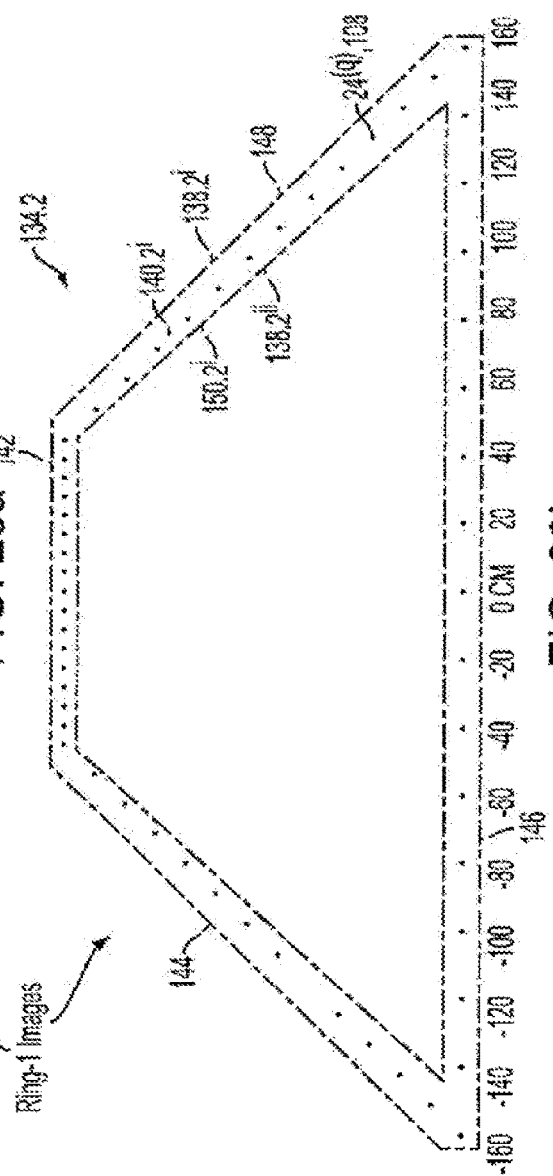

More particularly, in step (1918), each left 134.1 and right 134.2 binarized image is separately searched inwards from the current outer boundary $138.1^{i-vii}$, $138.2^{i-vii}$, —for example, by searching downwards from a top-most boundary 142, searching rightwards from a left-most boundary 144, searching upwards from lower-most boundary 146, and searching leftwards from a right-most boundary 148, —until locating a distinct light spot image $24^{(q)}$. Given an a priori knowledge of the associated structured light pattern 16, 16.1, the process is continued until a sufficient number of distinct light spot images $24^{(q)}$ are located within each left 134.1 and right 134.2 binarized image so as to establish a one-to-one correspondence with the distinct light spots 30 in a corresponding nested ring 140, $140^{i-vii}$ of the predetermined structured light pattern 16, 16.1, subject to a possible bounds on the searches so as to provide for ignoring distinct light spot images $24^{(q)}$ that might be missing due to the nature of the illuminated surface 32. For example, FIGS. 23a and 23b illustrate a first pair of nested rings 140, $140.1^i$, $140.2^i$ as a result of an initial occurrence of step (1918), wherein the search commenced at the first outer boundaries $138.1^i$, $138.2^i$ of the left 134.1 and right 134.2 binarized images and ended at a corresponding first inner boundary $150.1^i$, $150.2^i$, the latter of which is then used as the corresponding second outer boundaries $138.1^{ii}$, $138.2^{ii}$ during the next occurrence of step (1918).

Then, in step (1920), if, from step (1918), at least one distinct light spot 30 is found, then if, as a result of step (1912), each distinct light spot image $24^{(q)}$ has been transformed to a single active-value pixel 108 surrounded by inactive-value pixels 108, either as a direct result of the associated adaptive edge gradient method, or as a result of subsequent processing, then there will be a one-to-one relationship between active-value pixels 108 and corresponding distinct light spot $30^{(q)}$, so that the locations of the active-value pixels 108 directly provide for determining the disparity DX associated with each distinct light spot $30^{(q)}$. For example, if each distinct light spot image $24^{(q)}$ in the left 134.1 and right 134.2 binarized images comprises more than one pixel 108, then the location of the distinct light spot image $24^{(q)}$ could be determined, for example, by either a matched-spatial-filtering process, or by convolution with a two-dimensional pulse function representative of a distinct light spot image $24^{(q)}$—either in the domain of the left 134.1 and right 134.2 binarized images or in the domain of the left 132.1 and right 132.2 grayscale difference images prior to binarization in step (1912).

The row $J_{Row}$, $110^{(q)}$ and column $I_{COL}$, $112^{(q)}$ coordinates of each detected distinct light spot image $24^{(q)}$ from each of the first nested rings 140, $140.1^i$, $140.2^i$ are then stored in one or more arrays corresponding to the Cartesian array of distinct light spots $30^{(q)}$ of the structured light pattern 16, 16.1 for use in step (1922), wherein the corresponding disparity DX of each distinct light spot $30^{(q)}$ is given by the difference in column coordinates $I_{COL}$, $112.1^{(q)}$, $112.2^{(q)}$ associated with the first nested rings 140, $140.1^i$, $140.2^i$ of the left 134.1 and right 134.2 binarized images, from which the associated down-range coordinate $Z_{World}$ of the associated distinct light spot $30^{(q)}$ is given by:

$$Z_{World}^{(q)} = \frac{C_Z}{|DX^{(q)}|} \tag{22}$$

wherein $C_Z$ is calibration parameter determined during an associated calibration process, and the disparity DX is the difference between the column $I_{COL}$, $112^{(q)}$ coordinates associated with the left 134.1 and right 134.2 binarized images of the same distinct light spot $30^{(q)}$, for example, as determined from step (1918).

Figure 24A:
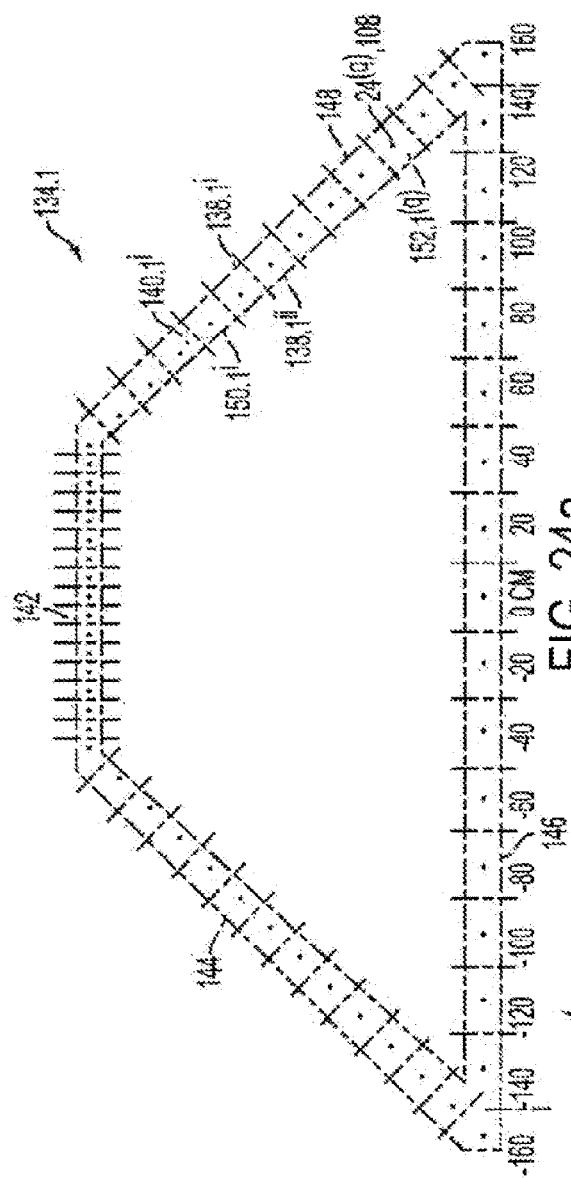
FIGS. 24a and 24b illustrate the first pair of nested rings illustrated in FIGS. 23a and 23b, subdivided so as to provide for determining the disparities associated with each distinct light spot by cross-correlation of corresponding portions of each nested ring of the pair.
Figure 24B:
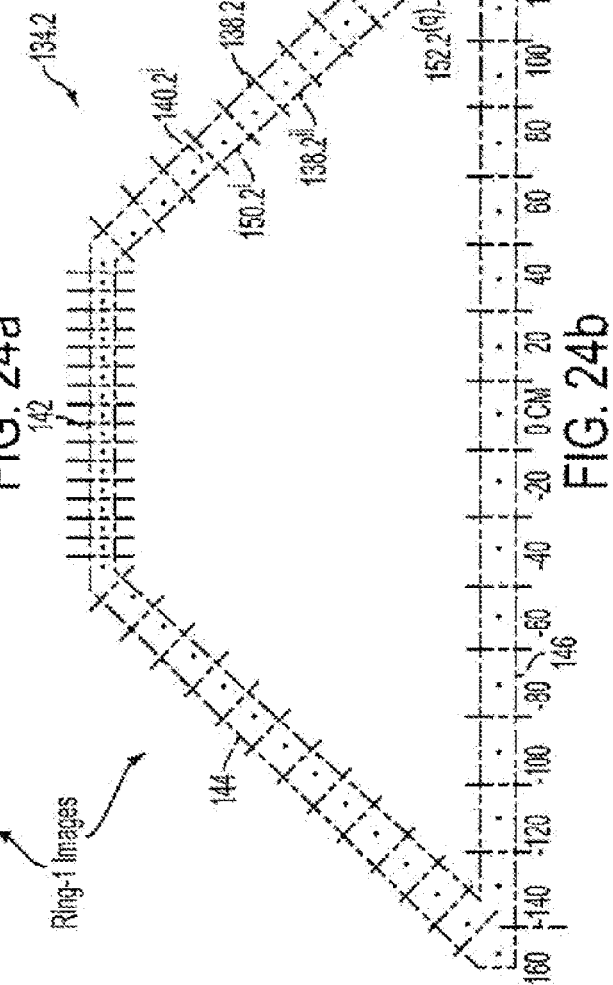

Referring to FIGS. 24a and 24b, as an alternative to separately determining the row $J_{ROW}$, $110^{(q)}$ and column $I_{COL}$, $112^{(q)}$ coordinates of each detected distinct light spot image $24^{(q)}$ in each left 134.1 and right 134.2 binarized image, and then calculating the disparity DX therefrom, the disparity DX may be determined directly by cross-correlating corresponding portions $152.1^{(q)}$, $152.2^{(q)}$ of each corresponding nested ring 140, $140.1^{i-vii}$, $140.2^{i-vii}$, each corresponding to a common distinct light spot $30^{(q)}$, wherein the corresponding portions $152.1^{(q)}$, $152.2^{(q)}$ are determined during the search process of step (1918), and the disparity DX is determined as the relative correlation shift value associated with the peak of the associated cross-correlation function.

Figure 26A:
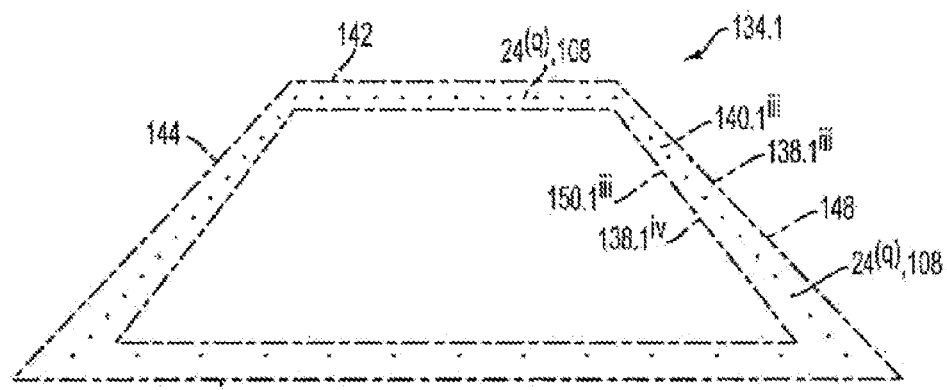
FIGS. 26a and 26b illustrate a third pair of nested rings from FIGS. 22a and 22b that are adjacently-nested within the second pair of nested rings illustrated in FIGS. 25a and 25b.
Figure 26B:
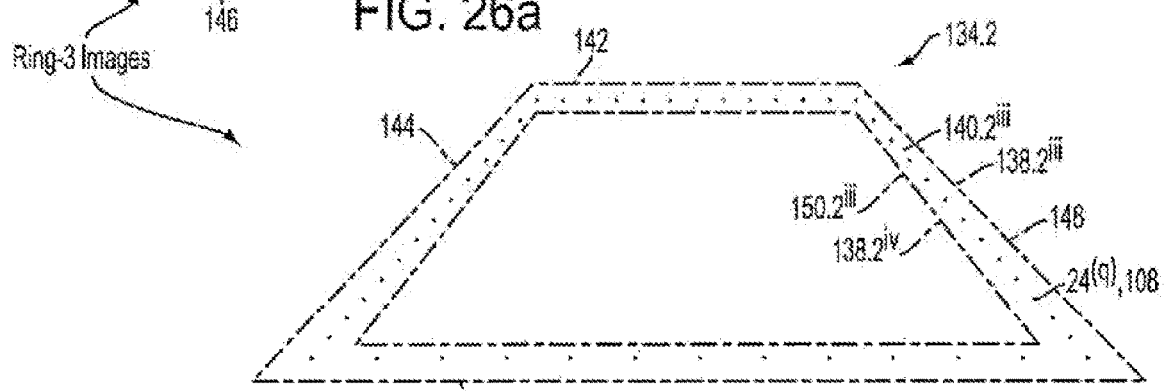
Figure 27A:
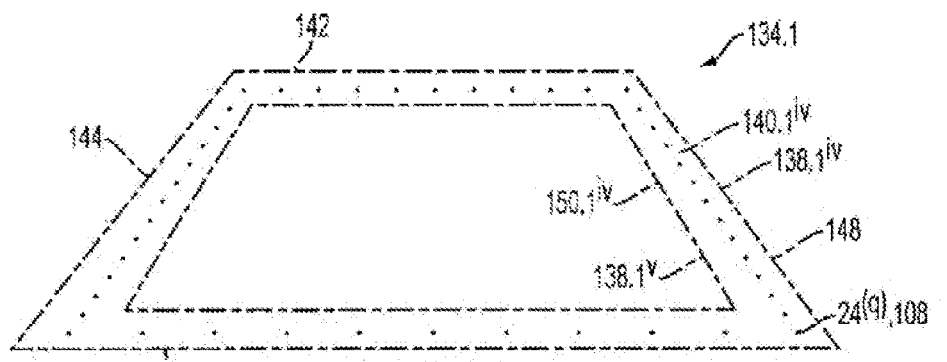
FIGS. 27a and 27b illustrate a fourth pair of nested rings from FIGS. 22a and 22b that are adjacently-nested within the third pair of nested rings illustrated in FIGS. 26a and 26b.
Figure 27B:
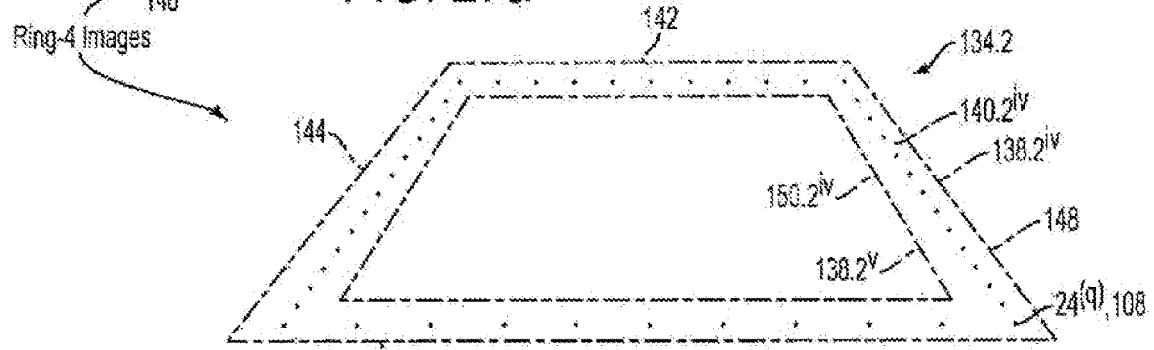

Following step (1922), in step (1924), the first inner boundaries $150.1^i$, $150.2^i$ found from step (1918) are used as the outer boundaries $138.1^{ii}$, $138.2^{ii}$ for the next occurrence of step (1918), after which the process (1900) continues with step (1918), so as to provide for processing the second pair of nested rings 140, 140.1$^{ii}$, 140.2$^{ii}$, for example, from FIGS. 22a and 22b, for example, as illustrated in isolation in FIGS. 25a and 25b. Steps (1918) through (1924) of process 1900 are repeated, for example, as illustrated in FIGS. 26a and 26b for the third pair of nested rings 140, 140.1$^{iii}$, 140.2$^{iii}$, in FIGS. 27a and 27b for the fourth pair of nested rings 140, 140.1$^{iv}$, 140.2$^{iv}$, in FIGS. 28a and 28b for the fifth pair of nested rings 140, 140.1$^{v}$, 140.2$^{v}$, in FIGS. 29a and 29b for the sixth pair of nested rings 140, 140.1$^{vi}$, 140.2$^{vi}$ and in FIGS. 30a and 30b for the seventh pair of nested rings 140, 140.1$^{vii}$, 140.2$^{vii}$ of the remaining central image—after which there are no further distinct light spots 30$^{(q)}$ that remain to be processed, so that from step (1920), the process 1900 then completes with step (1926) by returning the down-range coordinates $Z_{World}^{(q)}$ of each of the associated corresponding distinct light spots 30$^{(q)}$ of the structured light pattern 16, 16.1.

Figure 31A:
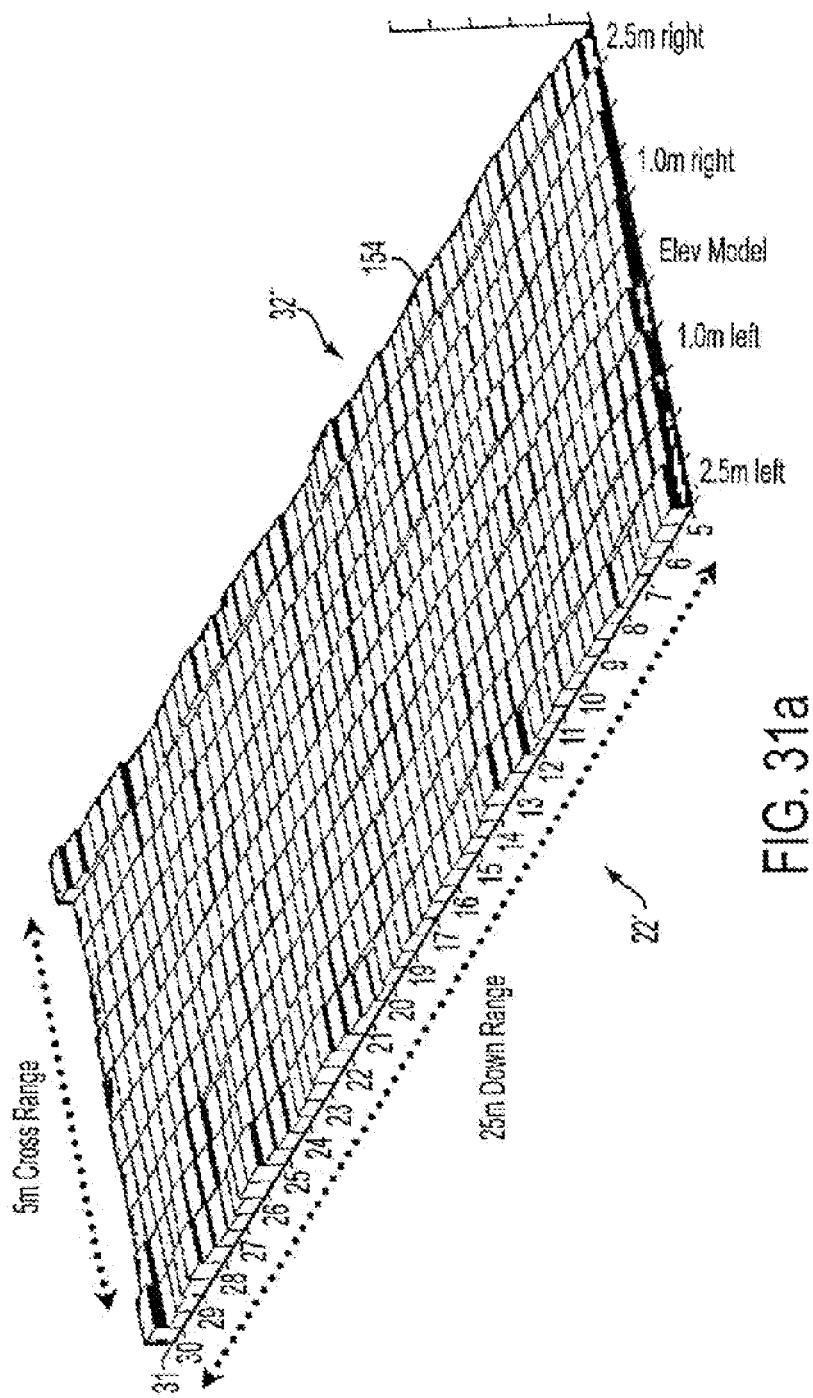
FIG. 31a illustrates an oblique view of a profile of a roadway surface as sensed by a vehicular path sensing system.
Figure 31B:
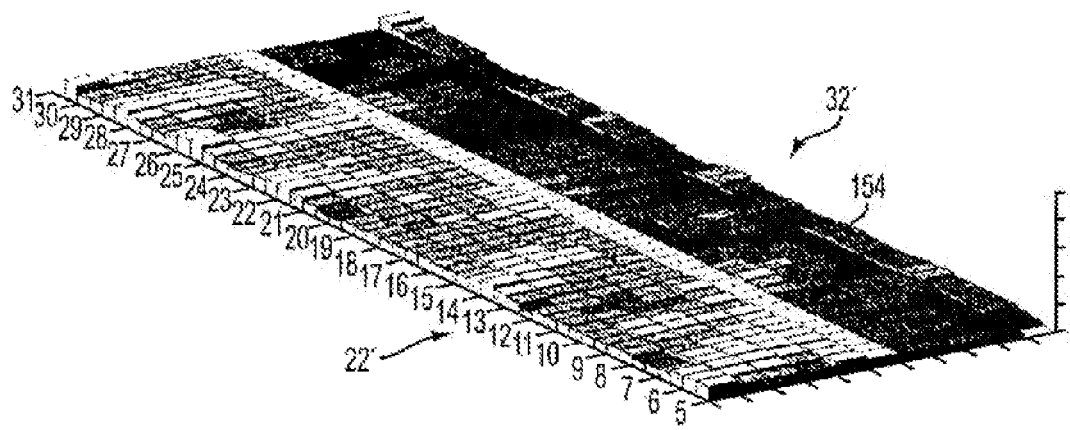
FIG. 31b illustrates a half-tone monochromatic image of the roadway surface profile illustrated in FIG. 31a for which the image density of the associated roadway surface tile elements is responsive to associated path elevation.

Given the set of down-range coordinates $Z_{World}^{(q)}$ from step (1926) for each of the associated distinct light spots 30$^{(q)}$, the corresponding elevation coordinates $Y_{World}^{(q)}$ may then be determined from the corresponding image space 114 vertical coordinate $Y_{Image}$, using equation (7), or from the or corresponding row coordinate $J_{ROW}$, 110 using equations (4) and (7), so as to provide for determining the elevation profile 22' of the path 14. At a given point in time, the plurality of distinct light spots 30$^{(q)}$ over a range of down-range coordinates $Z_{World}^{(q)}$ provide for a static measure of the associated elevation profile 22' of the path 14. As the vehicle 12 moves forward, to the extent that relatively closer distinct light spots 30$^{(q)}$ follow the same path 14 of relatively farther distinct light spots 30$^{(q)}$, then the same portions of the path 14 detected by a relatively farther distinct light spot 30$^{(q)}$ at a relatively earlier point in time will become detected by a relatively closer distinct light spot 30$^{(q)}$ at a relatively later point in time, with greater accuracy as described hereinabove. Accordingly, referring to FIGS. 31a and 31b, the forward-looking vehicular path sensing system 10.1 provides for mapping the elevation profile 22' of the roadway surface 32', wherein FIG. 31a illustrates the roadway surface 32' mapped as a plurality of tiles 154, each having a distinct elevation Y, the value of which is illustrated with half-tone shading in FIG. 31b, wherein the boundaries of the tiles 154 are either defined directly by the structured light pattern 16, or by an interpolation therefrom.

Figure 32:
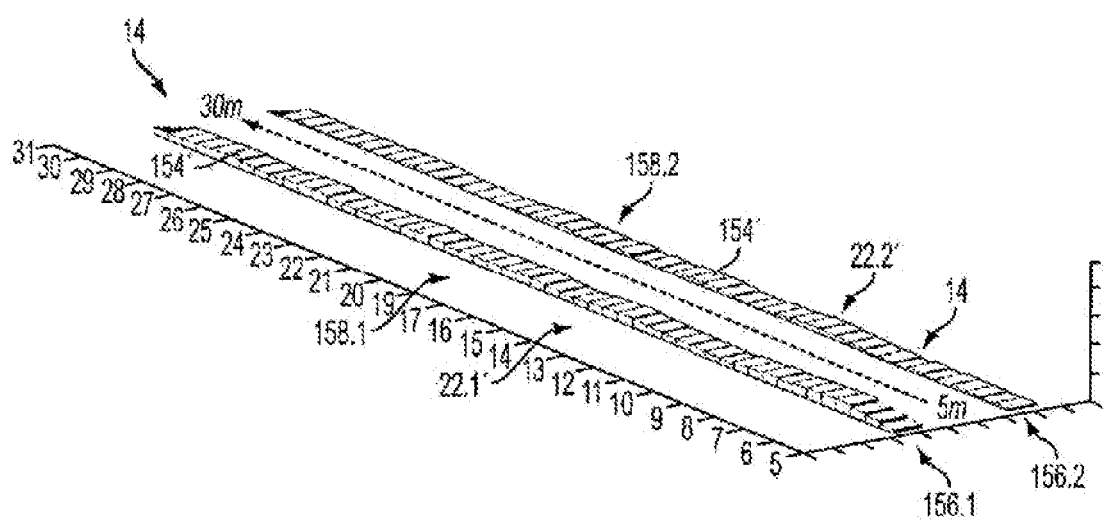
FIG. 32 illustrates an oblique view of portions of the profile of a roadway surface illustrated in FIGS. 31a and 31b, along the associated expected corresponding trajectories of the left and right vehicular tire tracks.
Figure 33:
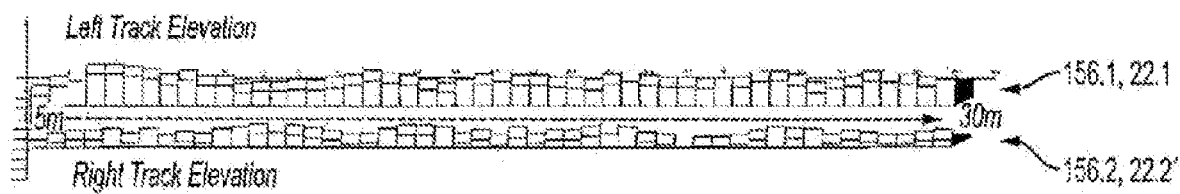
FIG. 33 illustrates the elevation profiles of the left and right tire tracks from FIG. 32.
Figure 34:
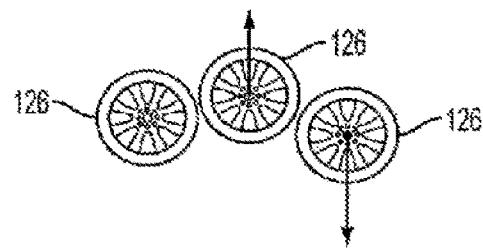
FIG. 34 illustrates a model of tire motion along a corresponding tire track.
Figure 35:
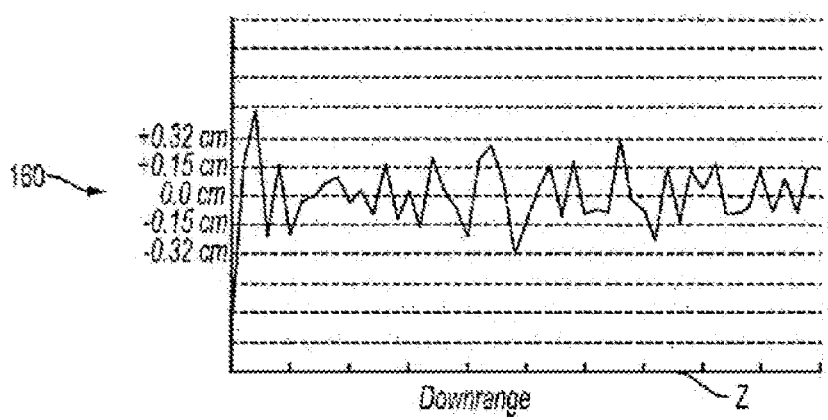
FIG. 35 illustrates a plot of tire displacement as a function of path distance for one of the tire tracks illustrated in FIGS. 32 and 33.

Referring to FIG. 32, given the relatively fixed location of the light projection 18, 18.1 and imaging 34 systems relative to the left 156.1 and right 156.2 tire tracks of the vehicle 12, given the associated steering angle of the vehicle 12, corresponding first 158.1 and second 158.2 subsets of tiles 154' may be identified that correspond to the projected path 14 of the tires 126, so as to provide for determining a corresponding elevation profile 22' of a portion of the roadway surface 32' over which the tires 126 are expected to travel. For example, FIG. 32 illustrates the prospective left 156.1 and right 156.2 tire tracks for a vehicle 12 driving along a straight path 14. Referring to FIG. 33, the left 156.1 and right 156.2 tire tracks are stacked adjacent to one another to better illustrate the associated elevation profiles 22', which can be used to predict the motion and dynamics of the suspension system of the vehicle 12 when the tires 126 of the vehicle are driven over the left 156.1 and right 156.2 tire tracks, for example, as illustrated in FIGS. 34 and 35, respectively illustrating a tire in motion over time and a corresponding plot of associated wheel displacement 160 as a function of down-range travel distance Z of the vehicle 12.

The different distinct light spots 30$^{(q)}$ at different down-range coordinates $Z_{World}$ sweeping along the left 156.1 and right 156.2 tire tracks along an associated active predictive sensing region as the vehicle 12 moves forward each provide for a generating corresponding associated elevation profile 22' time series, with different distinct light spots 30$^{(q)}$ providing for generating different time series of the same roadway surface 32' elevation profile 22' at corresponding different times in advance of the interaction thereof with the tires 126 of the vehicle 12. Accordingly, a time series of the predicted elevation profile 22' at the tires 126 can be developed from a dynamic combination of the measured elevation profile 22' time series from each of the distinct light spots 30$^{(q)}$ in advance of the interaction of the tires 126 with the portions of the roadway surface 32' being measured by the associated distinct light spots 30$^{(q)}$, which can then be used to control an associated suspension system of the vehicle 12, for example, so as to provide for controlling the associated ride and handling thereof, for example, as illustrated in FIG. 36.

Figure 36:
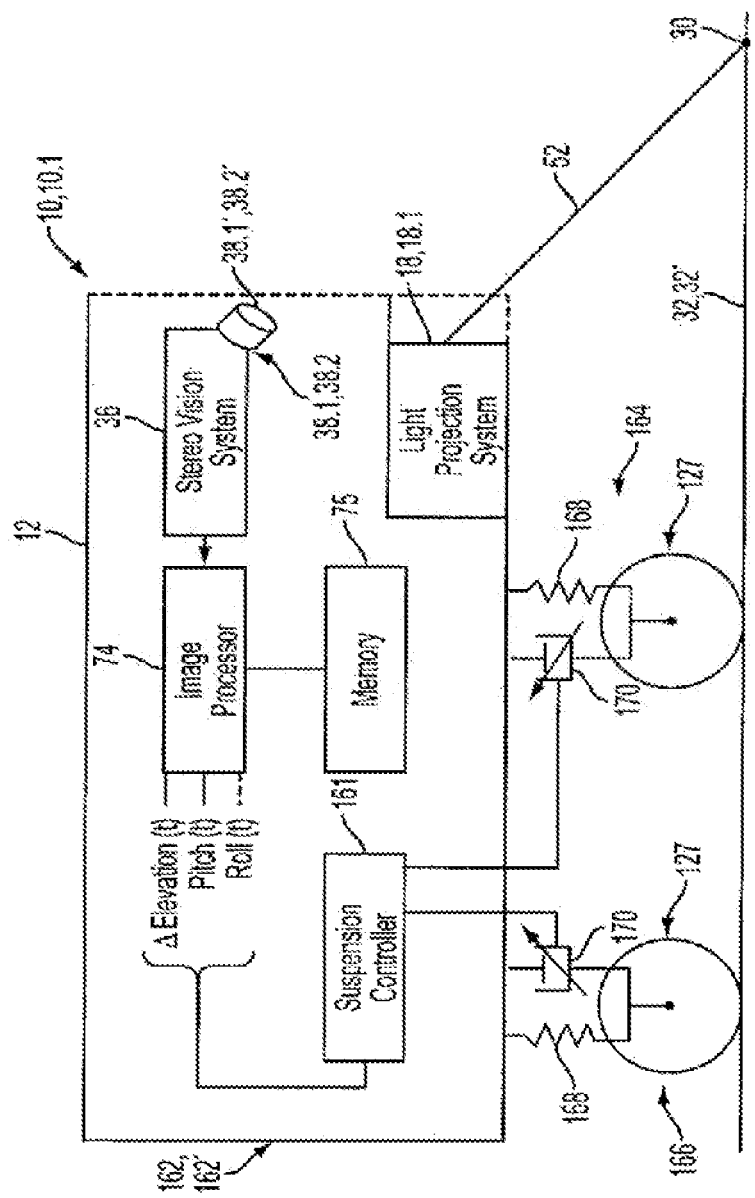
FIG. 36 illustrates a block diagram of a vehicular path sensing system incorporated in a vehicle in cooperation with an associated electronic suspension control system.

Referring to FIG. 36, the forward-looking vehicular path sensing system 10.1 is incorporated in a vehicle 12 so as to provide one or more measures of the elevation profile 22' of the roadway surface 32' along the left 156.1 and right 156.2 tire tracks in advance of the interaction thereof with the tires 126 of the vehicle 12 to a suspension controller 161 of an associated electronic suspension control system 162, for example, a variable-damping electronic suspension control system 162', that provides for separately controlling the damping rate of associated controllable suspension dampers of the vehicle, for example, magneto-rheologically controlled suspension dampers. For example, in FIG. 36 illustrates one of two front-quarter suspension systems 164 and one of two rear-quarter suspension systems 166, each incorporating a tire/wheel assembly 127, a suspension spring 168 and a controllable damper 170. The associated forward-looking vehicular path sensing system 10.1 is configured as described hereinabove, and operates accordingly, or in accordance with alternative embodiments described hereinbelow, so as to generate one or more associated elevation profiles 22' of the roadway surface 32' for each of the left 156.1 and right 156.2 tire tracks. For purposes of suspension control, it has been found useful to provide time series of the change in elevation coordinate Y World, i.e. a differential elevation coordinate $\Delta Y_{World}$, as follows:

$$\Delta Y_{World}(t_i) = Y_{World}(t_i) - Y_{World}(t_{i-1}) \quad (23)$$

which is influenced relatively less by vehicle pitch angle θ than is the elevation coordinate $Y_{World}$.

Figure 37A:
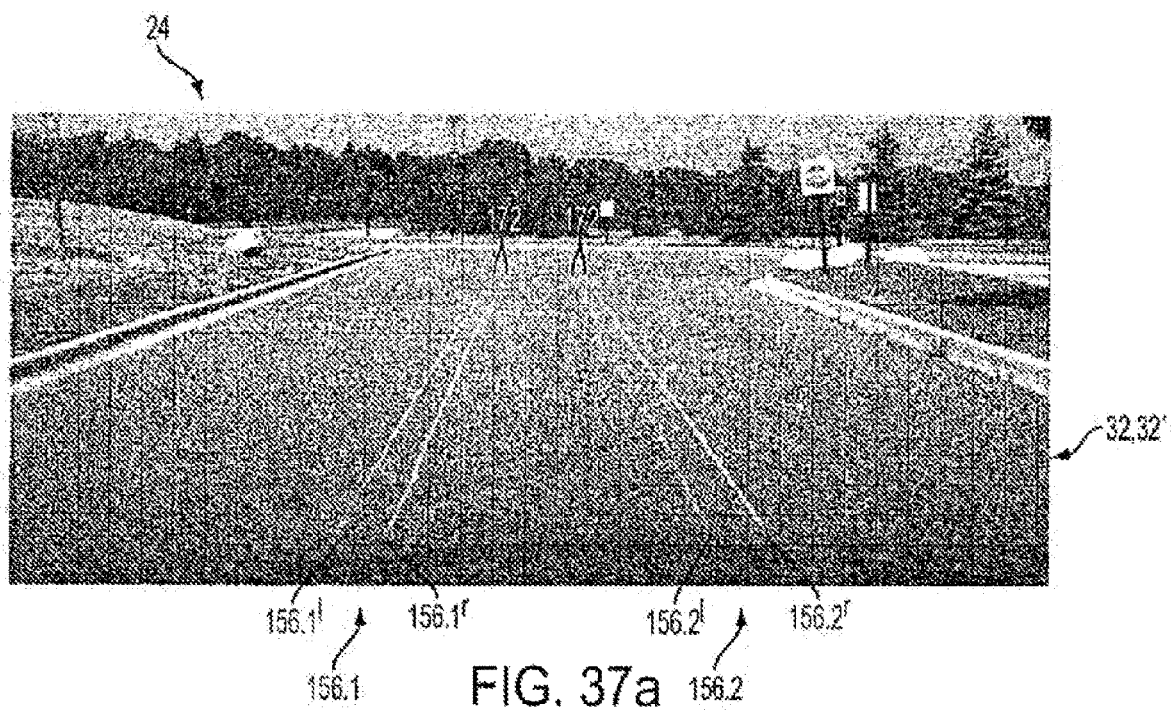
FIG. 37a illustrates a half-tone image of projected straight-line paths of the tires of a vehicle along a roadway.
Figure 37B:
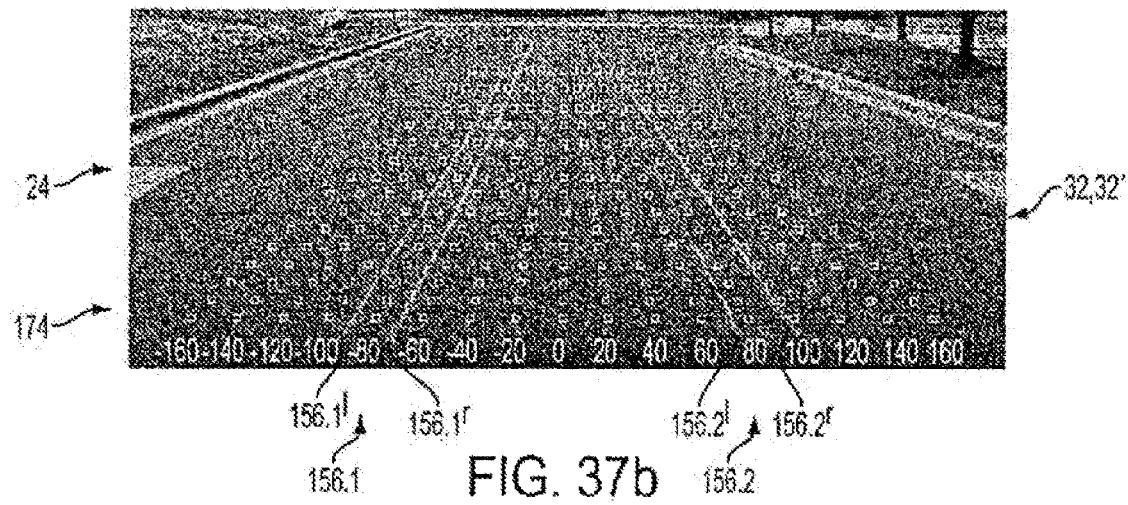
FIG. 37b illustrates a half-tone image of a Cartesian grid of a reference pattern projected onto the roadway and projected straight-line tire paths illustrated in FIG. 37a so as to provide for locating the tire tracks relative to the image from the associated imaging system.
Figure 37C:
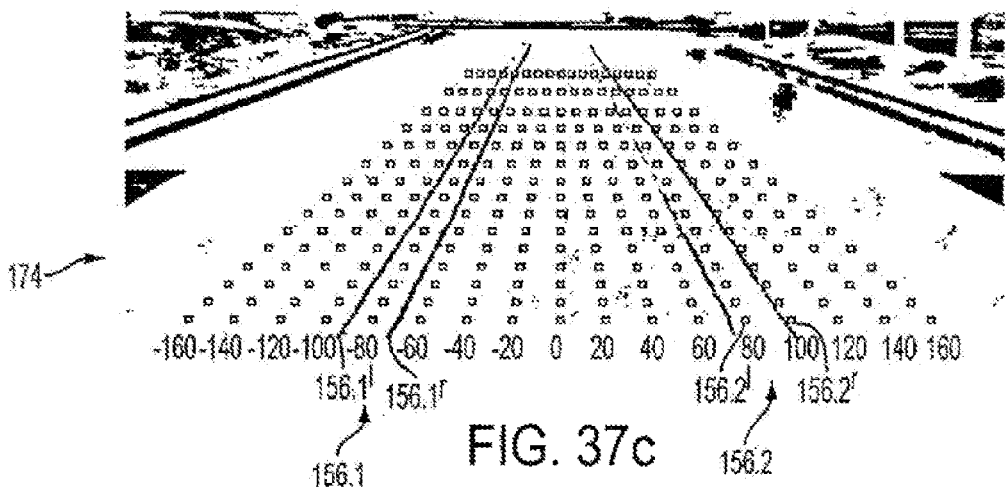

Referring to FIGS. 37a-c, the synchronization of the left 156.1 and right 156.2 tire tracks in real space 116—for the vehicle 12 moving along a straight path 14—with the corresponding loci of coordinates thereof in image space 114 may be calibrated by placing lines 172 in real space 116 along the left 156.1$^l$, 156.2$^l$ and right 156.1$^r$, 156.2$^r$ boundaries of the left 156.1 and right 156.2 tire tracks on the roadway surface 32'. For example, FIG. 37a illustrates a half-tone image 24 of a roadway surface 32' with four lines 172 of white tape along the left 156.1$^l$, 156.2$^l$ and right 156.1$^r$, 156.2$^r$ boundaries, FIG. 37b illustrates a portion of the half-tone image 24 of FIG. 37a with a reference grid 174 representative of image space 114 superimposed thereon, and FIG. 37c is a black and white version of FIG. 37b to emphasize the associated reference grid 174.

Figure 38:
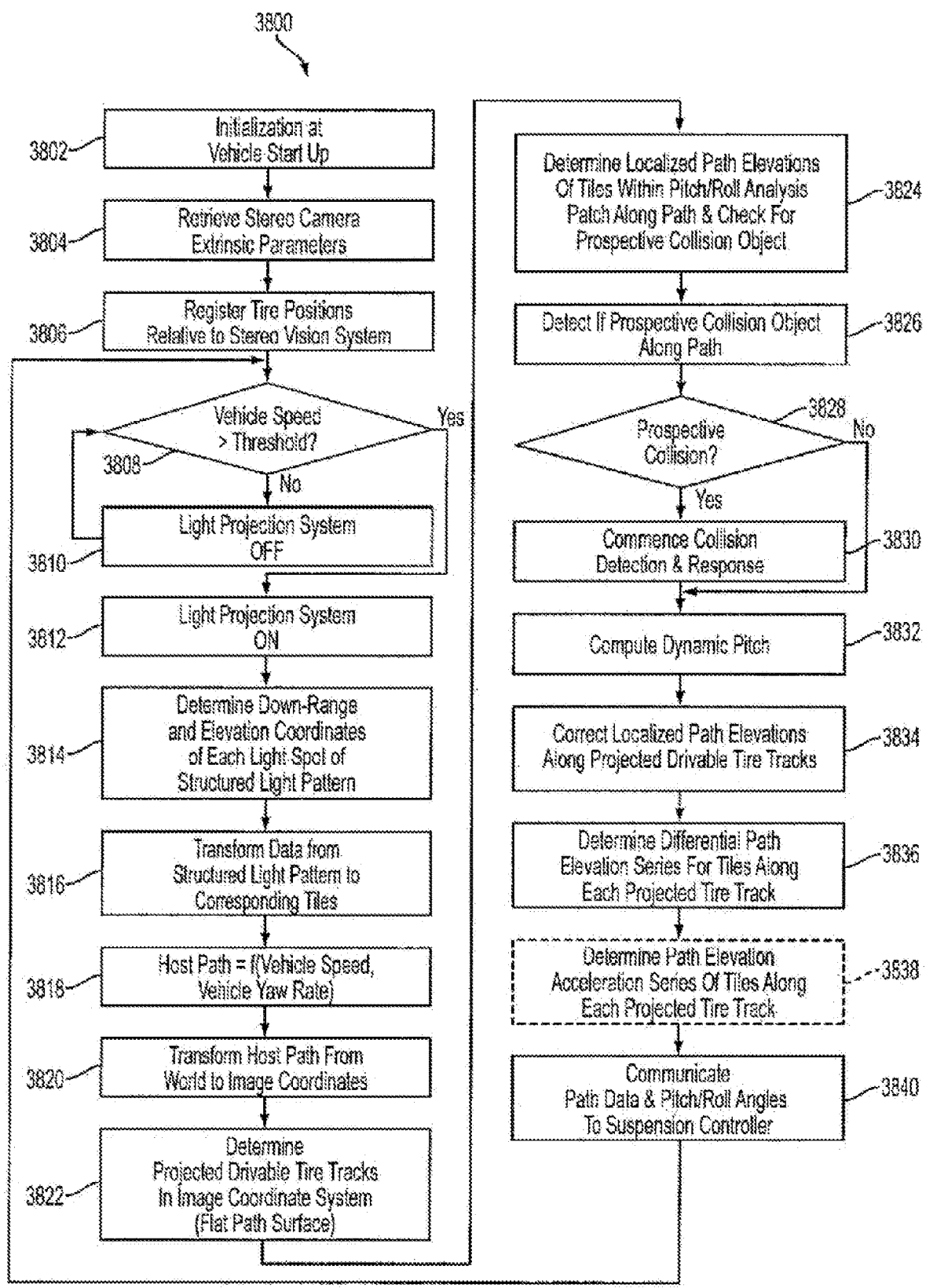
FIG. 38 illustrates a flow chart of roadway surface preview process of a vehicular path sensing system.

Referring to FIG. 38, an associated roadway surface preview process 3800 commences with an initialization in step (3802) when the vehicle 12 is started, which includes the computation of various look-up tables, —for example, containing associated camera calibration parameters used for stereo matching, —that are stored in memory 75. Then, in step (3804), various extrinsic parameters associated with the stereo vision system 36 are retrieved, for example, the associated mounting height $h_c$, static camera pitch angle $\varphi^{Static}$, and lateral offsets from the longitudinal axis 44 of the vehicle 12, of the first 38.1 and second 38.2 cameras. Then, in step (3806), the lateral positions of the tires 126 of the vehicle 12 are registered in the associated image space 114 of the stereo vision system 36. Then, in step (3808), if the speed of the vehicle 12 does not exceed a threshold, then, in step (3810), the associated light projection system 18, 18.1, 18.2 is turned OFF, so as to prevent a viewing of the associated beam(s) of light 52 by people or animals, which could otherwise be potentially injurious if viewed for a sufficiently long period of time as might be possible under static or quasi-static conditions.

Otherwise, from step (3808), if the speed of the vehicle 12 does not exceed a threshold, then, in step (3812), the associated light projection system 18, 18.1, 18.2 is turned ON so as to project associated beam(s) of light 52 onto the roadway surface 32' along the path 14 of the vehicle 12 so as to provide for generating the associated structured light pattern 16, and, in step (3814), the down-range $Z_{World}^{(q)}$ and elevation $Y_{World}^{(q)}$ coordinates are determined for each distinct light spot 30$^{(q)}$—for which the corresponding associated cross-range coordinates $X_{World}^{(q)}$ are either predefined or also similarly determined for example, in accordance with the above-described process 1900 illustrated in FIG. 19, or in accordance with an alternative process, a plurality of which are described hereinbelow. Then, in step (3816), the resulting real-world coordinates of the set of distinct light spots 30$^{(q)}$ of the structured light pattern 16 are transformed to corresponding associated tiles 154, 154'. For example, in one embodiment, the distinct light spots 30$^{(q)}$ define the corners of the tiles 154. In another embodiment, a predefined set of tiles 154, 154' is mathematically fitted to or interpolated from the real-world coordinates of the distinct light spots 30$^{(q)}$. In yet another embodiment, the tiles 154, 154' are centered about the corresponding associated distinct light spots 30$^{(q)}$.

Then, in step (3818), the projected trajectory of the vehicle 12 is determined using a clothoid model as a function of the speed V and yaw rate ω of the vehicle 12, as will be described more fully hereinbelow for a curved path. However, for the special case of the vehicle 12 traveling along a substantially straight-line path, the tracks of the front and rear tires will be located along a range of down-range coordinates $Z_{World}$ in real space 116 at cross-range coordinate $X_{World}$ values of $+/-W_F/2$ and $+/-W_R/2$ for the front 126' and rear 126" tires, respectively, wherein $W_F$ and $W_R$ are the respective track separations between the front 126' and rear 126" tires, respectively.

Then, in step (3820), the projected trajectory of the vehicle 12 is transformed from real space 116 to image space 114, i.e. from world to image coordinates, and in step (3822), the projected drivable tire tracks 156.1, 156.2 are determined in image space 114, assuming a flat roadway surface 32'. For example, in accordance with one set of embodiments, in step (3820), the projected trajectory of the centerline of the vehicle 12 is transformed from real space 116 to image space 114, and then in step (3822), the projected drivable tire tracks 156.1, 156.2 are determined therefrom in image space 114, for example, by accounting for the separation of the tire tracks 156.1, 156.2 in image space 114.

In accordance with another set of embodiments, steps (3820) and (3822) are replaced by a single composite step wherein the projected drivable tire tracks 156.1, 156.2 are first determined in real space 116 and then transformed to image space 114 assuming a flat roadway surface 32'. For example, in the case of a vehicle 12 driving along a straight-line path, the projected drivable tire tracks 156.1, 156.2 of the left 126.1 and right 126.2 tires may be readily first determined directly in real space 116, followed by transformation of each tire track 156.1, 156.2 from real space 116 to image space 114:

Accordingly, for a projected location of the front tires 126' at a down-range coordinate value of $Z_{World}$, the location of the corresponding image points 114 of the left 126.1' and right 126.2' front tires on a flat roadway surface 32' are respectively given from equations (1)-(4) as follows:

For the left front tire 126.1':

$$X_{Image}^{F'} = -\frac{f_X \cdot \frac{W_F}{2}}{Z_{World} \cdot \cos(\varphi) + h_C \cdot \sin(\varphi)}, \text{ and} \quad (1.1)$$

$$I_{COL}^{F'} = X_{Image}^{F'} + \frac{N_{COLS}}{2} + .5; \quad (2.1)$$

For the right front tire 126.2':

$$X_{Image}^{F''} = +\frac{f_X \cdot \frac{W_F}{2}}{Z_{World} \cdot \cos(\varphi) + h_C \cdot \sin(\varphi)}, \text{ and} \quad (1.2)$$

$$I_{COL}^{F''} = X_{Image}^{F''} + \frac{N_{COLS}}{2} + .5; \quad (2.2)$$

For both the left 126.1' and right 126.2' front tires:

$$Y_{Image}^{F} = \frac{f_Y \cdot (Z_{World} \cdot \sin(\varphi) - h_C \cdot \cos(\varphi))}{Z_{World} \cdot \cos(\varphi) + h_C \cdot \sin(\varphi)}, \text{ and} \quad (3.1)$$

$$J_{ROW}^{F} = -Y_{Image}^{F} + \frac{N_{ROWS}}{2} + .5, \quad (4.1)$$

With the projected location of the front tires 126' at a down-range coordinate value of $Z_{World}$, and for a vehicle wheelbase L, the projected location of the rear tires 126" will be at a down-range coordinate $Z_{World}-L$, so that the location of the corresponding image points 114' of the left 126.1" and right 126.2" rear tires on a flat roadway surface 32' are respectively given from equations (1)-(4) as follows:

For the left rear tire 126.1":

$$X_{Image}^{R'} = -\frac{f_X \cdot \frac{W_R}{2}}{(Z_{World} - L) \cdot \cos(\varphi) + h_C \cdot \sin(\varphi)}, \text{ and} \quad (1.3)$$

$$I_{COL}^{R'} = X_{Image}^{R'} + \frac{N_{COLS}}{2} + .5; \quad (2.3)$$

For the right rear tire 126.2":

$$X_{Image}^{R''} = +\frac{f_X \cdot \frac{W_R}{2}}{(Z_{World} - L) \cdot \cos(\varphi) + h_C \cdot \sin(\varphi)}, \text{ and} \quad (1.4)$$

$$I_{COL}^{R''} = X_{Image}^{R''} + \frac{N_{COLS}}{2} + .5; \qquad (2.4)$$

For both the left 126.1" and right 126.2" rear tires:

$$Y_{Image}^{R} = \frac{f_Y \cdot ((Z_{World} - L) \cdot \sin(\varphi) - h_C \cdot \cos(\varphi))}{(Z_{World} - L) \cdot \cos(\varphi) + h_C \cdot \sin(\varphi)}, \text{ and} \qquad (3.2)$$

$$J_{ROW}^{R} = -Y_{Image}^{R} + \frac{N_{ROWS}}{2} + .5. \qquad (4.2)$$

Figure 39:
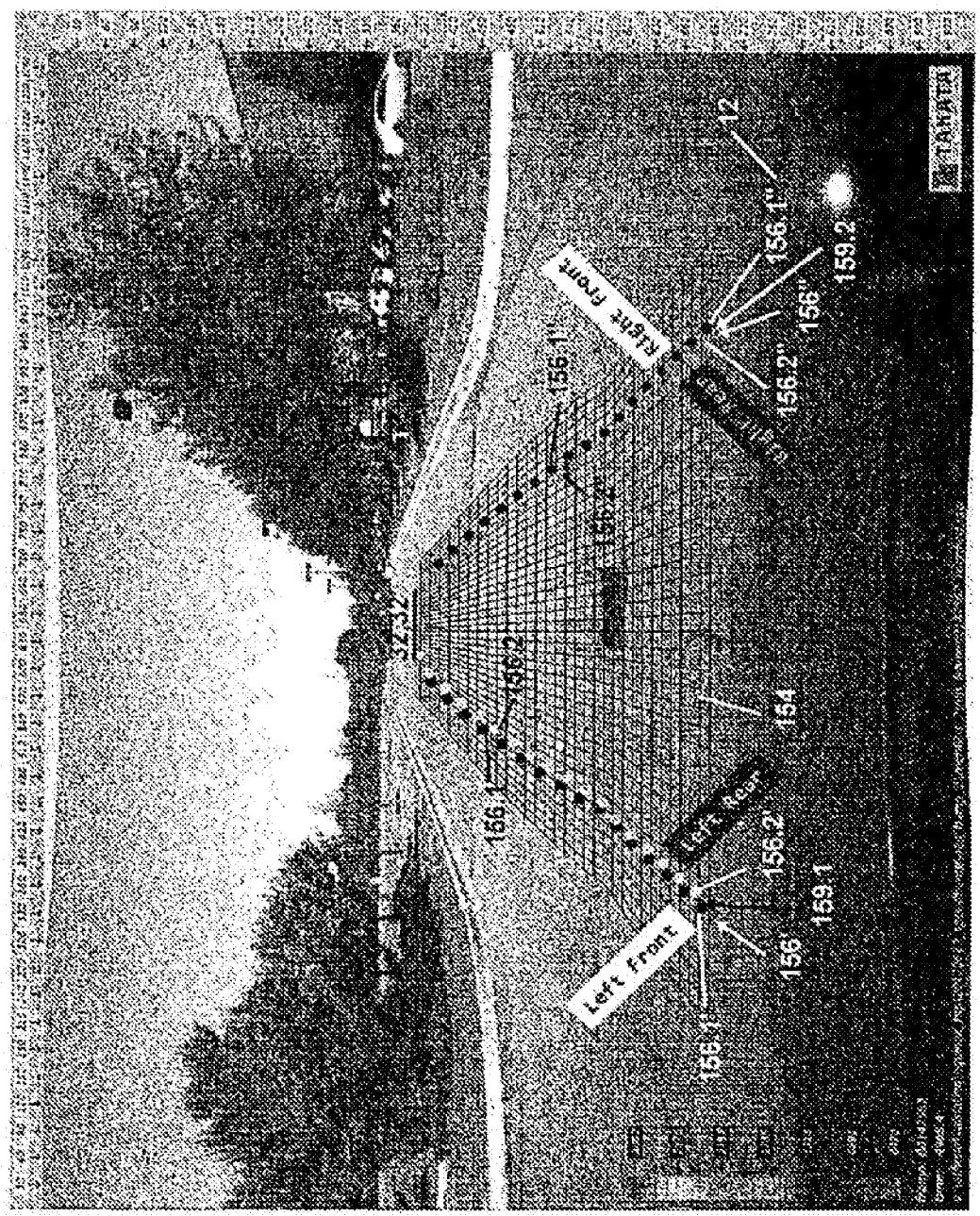
FIG. 39 illustrates a set of projected tire tracks generated by an associated vehicular path sensing system, for each of four tires of a vehicle, overlaid upon an image of an associated visual scene from one of two stereo cameras of the vehicular path sensing system.

In one set of embodiments, given the locations of the tire tracks 156.1, 156.2 in image space 114, the individual distinct light spot image(s) 24$^{(q)}$ are transformed into corresponding tiles 154 of elevation coordinate $Y_{World}$ data in real space 116 within a continuous region of image space 114 which includes the corresponding tire tracks 156.1, 156.2 and which laterally extends therebeyond by a sufficient amount so as to include portions of the roadway surface 32' upon which the tires 126.1', 126.2', 126.1", 126.2" could likely roll. For example, referring to FIG. 39, there is illustrated a plurality of points in image space 114 corresponding to the left front tire track 156.1, 156.1', the right front tire track 156.2, 156.2', the left rear tire track 156.1, 156.1", and the right rear tire track 156.2, 156.2", and an array of a plurality of associated tiles 154 over a region that laterally spans the left 156.1 and right 156.2 tire tracks in cross-range, and that longitudinally extends from the closest visible region of the roadway surface 32' (i.e. just beyond the hood of the vehicle 12) at least to a projected region of the roadway surface 32' that is projected to become this closest visible region within a given period of time at the current velocity $V_z$ of the vehicle 12, for example, within 15 to 20 milliseconds. For example, in one embodiment, the tiles 154 are generally rectangular in shape in real space 116, about half the width of the tires 126, or about 10 centimeters wide in cross-range, and about 20 centimeters deep in down-range, for example, about one-eighth of the nominal rolling circumference of the tire 126. The tiles 154 are located in alignment with the left 156.1 and right 156.2 tire tracks, at least at relatively near-range locations relative to the vehicle 12. For example, in one set of embodiments, for the vehicle 12 traveling along a straight-line trajectory, a first set of longitudinally-extending lateral tile boundaries 159.1 is located along the left tire track 156.1, and a second set of longitudinally-extending lateral tile boundaries 159.2 is located along the right tire track 156.2, with the associated tiles 154 being about half the width of the tires 126, so that the left tire track 156.1 would then span two columns of tiles 154 spanning the first set of longitudinally-extending lateral tile boundaries 159.1, and the right tire track 156.2 would then span two columns of tiles 154 spanning the second set of longitudinally-extending lateral tile boundaries 159.2.

Accordingly, beginning with a down-range coordinate $Z_{World}$ corresponding to nearest visible portion of the roadway surface 32', for example, about 500 centimeters, the locations of the first 159.1 and second 159.2 sets of longitudinally-extending lateral tile boundaries are located in image space 114 using the corresponding projected column locations of the left 156.1 and right 156.2 tire tracks from equations (2.1) and (2.2), and the associated corresponding row location from equation (4.1). Then the remaining corresponding boundaries of the tiles 154 are defined in image space 114 so as to provide for associating each tile 154 with a corresponding one or more distinct light spot image(s) 24$^{(q)}$. Then, for each tile 154, the elevation coordinate $Y_{World}$ of each associated pixel, or of a subset of associated pixels, is determined as follows, using the corresponding down-range coordinate $Z_{World}(I_{COL}, J_{ROW})$ of the associated distinct light spots 30$^{(q)}$:

$$Y_{Image}(J_{ROW}) = \frac{N_{ROWS}}{2} + .5 - J_{ROW}; \text{ and} \qquad (9.1)$$

$$Y_{World}(I_{COL}, J_{ROW}) = h_C - \frac{Z_{World}(I_{COL}, J_{ROW}) \cdot (f_Y \cdot \sin(\varphi) - Y_{Image}(J_{ROW}) \cdot \cos(\varphi))}{f_Y \cdot \cos(\varphi) + Y_{Image}(J_{ROW}) \cdot \sin(\varphi)}. \qquad (7.1)$$

The corresponding elevation coordinate $Y_{World}$ of the associated tile 154 is then given as either the median or average of the elevation coordinates $Y_{World}$ of the set of pixels associated with that tile 154.

Figure 40:
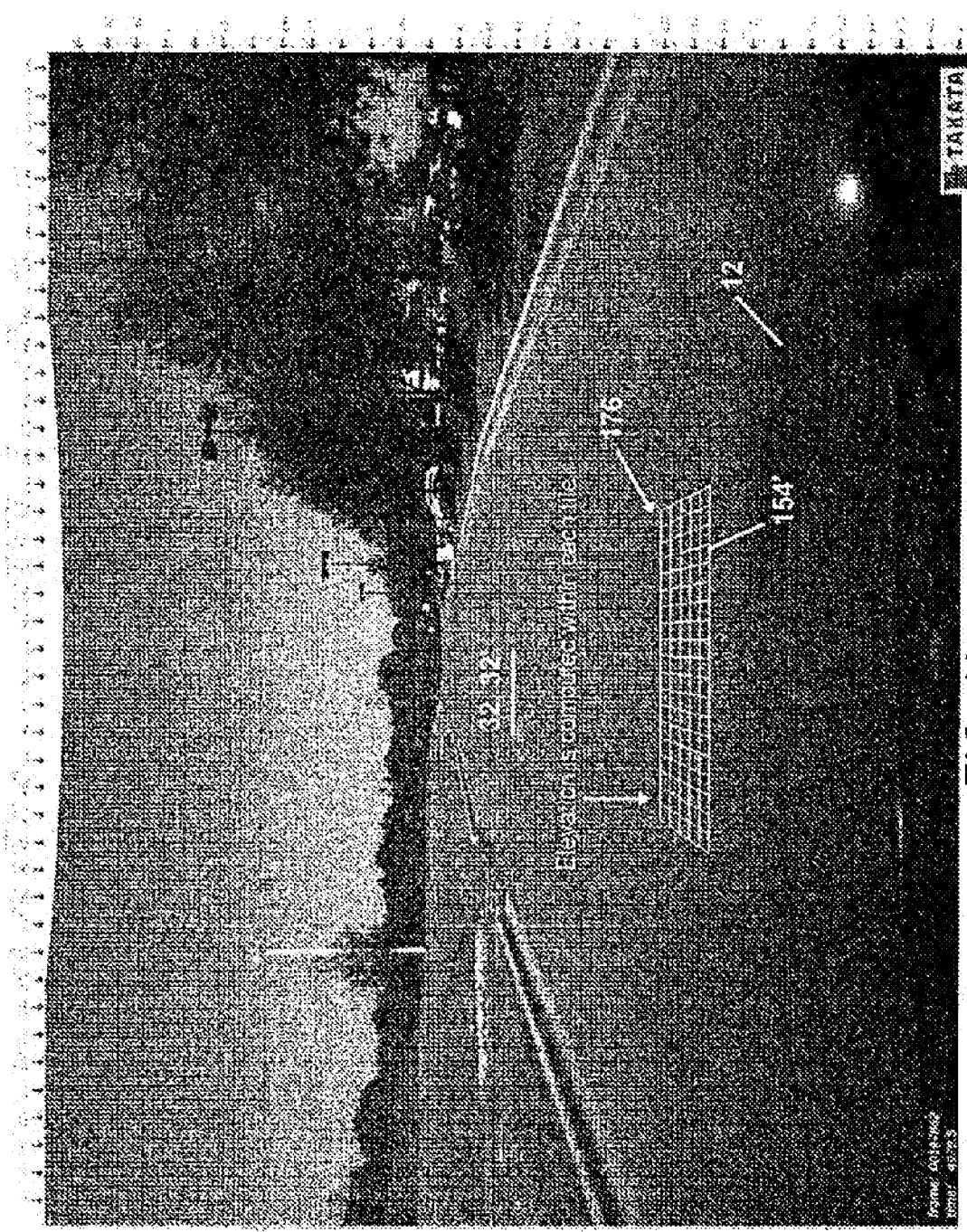
FIG. 40 illustrates a subset of tiles spanning a contiguous region of down-range and cross-range distances used for determining vehicle attitude, overlaid upon an image of an associated visual scene from one of two stereo cameras of a vehicular path sensing system.

Referring to FIG. 40, a relatively near-range subset 176 of tiles 154, referred to herein as a pitch/roll analysis patch 176, laterally centered with respect to the left 156.1 and right 156.2 tire tracks, provides for determining, in step (3824), the pitch and roll of the vehicle from an analysis of the elevation coordinates $Y_{World}$ of the associated tiles 154, as described more fully hereinbelow.

Also in step (3824), first the tiles 154 in the pitch/roll analysis patch 176, and then the remaining tiles 154, are analyzed to determine whether or not a prospective collision object is within the path 14 of the vehicle 12. For example, if the elevation coordinate $Y_{World}$ of any tiles 154 between the left 156.1 and right 156.2 tire tracks exceeds a first threshold corresponding to the undercarriage clearance of the vehicle 12, or if any tiles 154 along the left 156.1 and right 156.2 tire tracks either exceeds a second threshold, or is less than a third threshold—wherein the second threshold corresponds to the maximum tolerable elevation coordinate $Y_{World}$ of an object or disturbance above the roadway surface 32' over which the tires 126 of the vehicle 12 might travel, and the third threshold corresponds to the lowest tolerable depth of a dip or pothole in the roadway surface 32' over which the tires 126 of the vehicle 12 might travel then, in step (3826), the prospective collision object is detected, for example, in accordance with the teachings of U.S. patent application Ser. No. 11/658,758 filed on 19 Feb. 2008, entitled Vulnerable Road User Protection System; or U.S. patent application Ser. No. 13/286,656 filed on 1 Nov. 2011, entitled Method of Identifying an Object in a Visual Scene; U.S. Provisional Application No. 61/584,354 filed on 9 Jan. 2012, entitled Stereo-Vision Object Detection System And Method, or U.S. application Ser. No. 13/465,059 (hereinafter, "application '059"), filed on 7 May 2012, entitled Range-cued Object Segmentation System and Method; or all of which are incorporated herein by reference. Furthermore, measurements of elevation coordinates $Y_{World}$ at locations outside the bounds of the left 156.1 and right 156.2 tire tracks, while not used for electronic suspension controls may also be tracked to detect prospective objects 20 on the roadway surface 32', or to detect features adjacent to the drivable roadway surface 32', for example, associated curbs, barriers, poles, or fall-offs from the roadway surface 32'. If, in step (3828) a prospective collision object is detected in step (3826), then, in step (3830), a collision detection process is commence followed by an appropriate response, for example, as described in the above-identified patent applications incorporated by reference herein. Then, either from step (3830), or otherwise from step (3828), in step (3832) the pitch angle θ of the vehicle 12—relative to horizontal—is computed from an analysis of the elevation coordinates $Y_{World}$ of the tiles 154 of the pitch/roll analysis patch 176, as is described more fully hereinbelow. Then, in step (3834), the elevation coordinates $Y_{World}$ of the tiles 154 along the left 156.1 and right 156.2 tire tracks are corrected by recalculating the associated elevation coordinates $Y_{World}$ of the associated pixels with equation (7.1), but for a camera pitch angle φ given by:

$$\varphi = \varphi^{Static} + \theta, \quad (24)$$

and then recalculating the elevation coordinates $Y_{World}$ of the associated tiles 154 along the left 156.1 and right 156.2 tire tracks, as described hereinabove.

For example, referring again to FIGS. 32 and 33, there is illustrated first 158.1 and second 158.2 subsets of tiles 154' along the respective corresponding left 156.1 and right 156.2 tire tracks of the vehicle 12, each tile 154' being 50 centimeters deep in down-range and 50 centimeters wide in cross-range, for example, either calculated directly from the associated pixels as described hereinabove, or calculated as a composite of the above-described relatively-smaller tiles 154, for example, by averaging groups of relatively-smaller tiles 154. For example, in another embodiment, each tile 154' of the first 158.1 and second 158.2 subsets of tiles 154' is the same 20 centimeter down-range depth as the individual pixel-derived tiles 154, but is formed from an average of the two 10 centimeter wide pixel-derived tiles 154 that are adjacent in cross-range to one another and together either abutting or closest to the particular left 156.1 and right 156.2 tire track at a given associated down-range location therealong. Accordingly, the first 158.1 and second 158.2 subsets of tiles 154' provide for determining corresponding elevation profiles 22', 22.1', 22.2' of the left 156.1 and right 156.2 tire tracks.

Alternatively, referring to FIG. 41, the elevation profile 22' along a given tire track 156.1, 156.2 may be adapted to account for the compliance of the tires 126, wherein the elevations $Y_{World}$ of tiles 154 along the tire track 156.1, 156.2 is weighted responsive to the relative cross-range location of those tiles 154 with respect to the center of the associated tire track 156.1, 156.2. For example, typically the relatively central tiles 154" have a greater influence on the elevation $Y_{World}$ of the tire/wheel assembly 127 than do the relatively distal tiles 154''', so that the elevations $Y_{World}$ of the former would be weighted relatively more that the elevations $Y_{World}$ of the latter in determining the effective elevation $Y_{World}$ of the tire/wheel assembly 127. The particular relative weightings would depend upon the type and size of the tires 126. For example, for the embodiment illustrated in FIG. 41, the tire track 156.1, 156.2 spans six tiles in cross range, with four relatively central tiles 154" having a weighting factor of 0.18, and two relatively distal tiles 154''' having a weighting factor of 0.14, the sum of the weighting factors being unity.

Referring again to FIG. 38, following step (3834), in step (3836), a differential elevation profile $\Delta Y_{World}$, is determined from the associated elevation coordinates elevation coordinates $Y_{World}$ of each corresponding elevation profile 22', 22.1', 22.2' as follows, wherein the index k—increasing away from the vehicle 12—refers to the particular tiles 154' of the associated first 158.1 and second 158.2 subsets of tiles 154' associated with the corresponding left 156.1 and right 156.2 tire tracks, and the index m refers to the particular associated left 156.1 or right 156.2 tire track, or left front tire track 156.1, 156.1', right front tire track 156.2, 156.2', left rear tire track 156.1, 156.1" or right rear tire track 156.2, 156.2", $$\Delta Y_{World}{}^m(k) = Y_{World}{}^m(k+1) - Y_{World}{}^m(k) \quad (23.1)$$

for k=1 to $N_{TILES}-1$, wherein $N_{TILES}$ is the number of tiles 154' in each of the first 158.1 and second 158.2 subsets of tiles 154'. The differential elevation profile $\Delta Y_{World}$ is relatively invariant with respect to the pitch angle θ of the vehicle 12, and can be used to control an associated suspension system of the vehicle 12, for example, so as to provide for controlling the associated ride and handling thereof, for example, an associated variable-damping electronic suspension control system 162 as illustrated in FIG. 36 that provides for separately controlling the damping rate of associated controllable suspension dampers of the vehicle, for example, magneto-rheologically controlled suspension dampers.

Following step (3836), in step (3838), the vertical acceleration $a_y$ of the roadway surface 32' along the left 156.1 and right 156.2 tire tracks may be calculated as another measure that may be used for electronic suspension control, either as an alternative to or in addition to the differential elevation profile $\Delta Y_{World}$, for example, as given by:

$$a_y = V_z^2 \cdot \frac{d^2 Y_{World}}{dZ_{World}^2} + \frac{dY_{World}}{dZ_{World}} \cdot a_z \quad (25)$$

wherein $V_z$ and $a_z$ are the longitudinal velocity and acceleration of the vehicle 12, respectively. Equation (25) can be approximated by:

$$a_y(k) = V_z(k)^2 \cdot \frac{\Delta Y_{World}(k+1) - \Delta Y_{World}(k)}{Z_{World}(k+1) - Z_{World}(k)} + \frac{\Delta Y_{World}(k)}{Z_{World}(k+1) - Z_{World}(k)} \cdot a_z(k) \quad (26)$$

which, for constant longitudinal velocity $V_z$, simplifies to:

$$a_y(k) = V_z^2 \cdot \frac{\Delta Y_{World}(k+1) - \Delta Y_{World}(k)}{Z_{World}(k+1) - Z_{World}(k)}. \quad (26.1)$$

wherein $Z_{World}(k)$ is the down-range coordinate of the $k^{th}$ tile 154', e.g. of the center thereof.

Equations (25)-(26.1) assume that the elevation $Y_{World}$ of the tire/wheel assembly 127 follows that of the elevation profile 22' along a given tire track 156.1, 156.2. Referring to FIGS. 42a and 42b, the estimate of the elevation $Y_{World}$ of the tire/wheel assembly 127 can be improved by accounting for the geometry of the tire 126 in relation to the associated elevation $Y_{World}$ of the surface 32 over which the tire 126 rolls. For example, FIGS. 42a and 42b illustrates the interaction of a tire 126 of radius R encountering a sharp-edged object 20 of height Y, wherein the tire 126 is moving towards the object 20 at a velocity v, with the tire 126 just beginning to contact the object 20 in FIG. 42a. The initial elevation $y_0$ of the center 177 of the tire/wheel assembly 127 relative to the top 20.2 of the object 20, and the initial path distance $x_0$ from the center 177 of the tire/wheel assembly 127 to the leading edge 20.1 of the object 20, are respectively given by:

$$y_0 = R - Y. \quad (27)$$

$$x_0 = \sqrt{R^2 - y_0^2} = \sqrt{R^2 - (R-Y)^2} = \sqrt{(2R-Y) \cdot Y}. \quad (28)$$

The path distance x from the center 177 of the tire/wheel assembly 127 to the leading edge 20.1 of the object 20 responsive to the forward motion of the tire 126 is then given by:

$$x = x_0 - v \cdot t. \quad (29)$$

Referring to FIG. 42b, the elevation y of the center 177 of the tire/wheel assembly 127 relative to the top 20.2 of the object 20 as the tire 126 rolls over the object 20 is then given by:

$$y = \sqrt{R^2 - x^2} = \sqrt{R^2 - (x_0 - v \cdot t)^2}. \quad (30)$$

from which, the vertical velocity of the center 177 of the tire/wheel assembly 127 is then given by:

$$\frac{dy}{dt} = \frac{v \cdot (v \cdot t - x_0)}{\sqrt{R^2 - (x_0 - v \cdot t)^2}}. \quad (31.1)$$

or:

$$\frac{dy}{dt} = \frac{v \cdot \left(v \cdot t - \sqrt{(2R-Y) \cdot Y}\right)}{\sqrt{R^2 - \left(\sqrt{(2R-Y) \cdot Y} - v \cdot t\right)^2}}. \quad (31.2)$$

The vertical acceleration of the center 177 of the tire/wheel assembly 127 could then be found by differentiating either equation (31.1) or (31.2). Accordingly, given an estimate of the elevation profile 22' which provides a value for the height Y in equations (27)-(31.1), equations (30)-(31.2) provide for an improved estimate of the kinematics of the tire/wheel assembly 127 relative to using the elevation profile 22' alone.

Following step (3838), in step (3840), the measured path data, i.e. the differential elevation profile $\Delta Y_{World}$ series and an associated series of corresponding down-range coordinates $Z_{World}$ each series containing corresponding values of each corresponding tile 154' for each of the left 156.1 and right 156.2 tire tracks, —and, if calculated, the corresponding vertical acceleration $a_y$ series, is/are communicated to the suspension controller 161, together with the estimated vehicle pitch angle θ and, if available, the estimate vehicle roll angle β, as determined in step (3832), so as to provide for controlling the associated electronic suspension control system 162 responsive to the anticipated elevation profiles 22', 22.1', 22.2' of the left 156.1 and right 156.2 tire tracks along the roadway surface 32' or path 14.

Furthermore, in one set of embodiments, in step (3840), either velocity V and/or acceleration $a_z$ of the vehicle 12, or a corresponding series of estimates of the time-to-encounter for each tile 154 in the differential elevation profile $\Delta Y_{World}$ series is also communicated to the suspension controller 161. Yet further, a quality measure may also be calculated and communicated to the suspension controller 161 that is representative of the quality of the differential elevation profile $\Delta Y_{World}$ series, i.e. representative of the trustworthiness of the associated measurements, which indicates how tightly the associated elevation $Y_{World}$ or differential elevation profile $\Delta Y_{World}$ measurements are clustered or correlated within each tile 154, 154' or region-of-interest. For example, in one embodiment, for a given tile 154, 154' or region-of-interest, the quality measure Q is calculated as:

$$Q = \frac{\sum_{i=1}^{N} |W_i - \text{median}(W)|}{N-1}. \quad (32)$$

wherein W is the quantity to which the quality measure Q applies, for example, elevation $Y_{World}$ or differential elevation profile, N is the number of elements of W within the particular tile 154, 154' or region-of-interest, and median (W) is the median value of the absolute deviation of W within the particular tile 154, 154' or region-of-interest (ROI). For example, the region-of-interest (ROI) may cover a collection of tile 154, 154'.

At a given point in time, the plurality of real-world points 116 over a range of down-range coordinates $Z_{World}$ provide for a static measure of the associated elevation profile 22' of the path 14. As the vehicle 12 moves forward, to the extent that relatively closer real-world points 116 follow the same path 14 of relatively farther real-world points 116', then the same portions of the path 14 detected by a relatively farther real-world point 116' at a relatively earlier point in time will become detected by a relatively closer real-world point 116' at a relatively later point in time, with greater accuracy as described hereinbelow.

Figure 43:
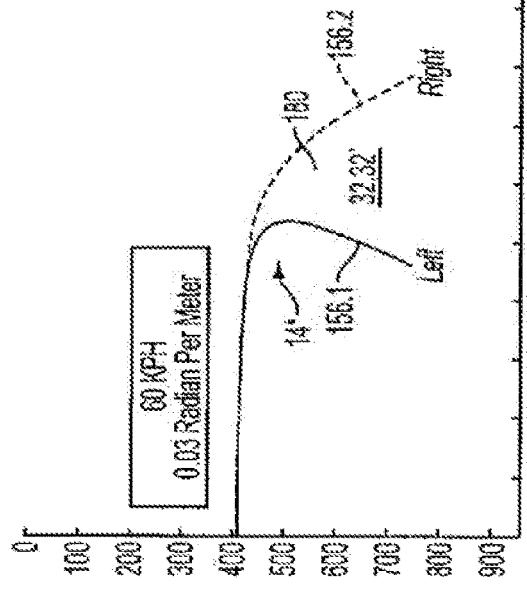
FIG. 43 illustrates a geometry of the curved path of a vehicle centerline in real space together with associated front and rear tire locations.

Referring to FIG. 43, in respect of steps (3818) through (3822) of the roadway surface preview process 3800 illustrated in FIG. 38, but for a curved roadway surface 32', a centerline 178 of a curved path 14* is illustrated in real space 116, together with corresponding locations of the tires 126.1', 126.2', 126.1", 126.2" of an associated vehicle 12 at a future point in time traveling therealong, wherein the front tires 126.1', 126.2' are at a yaw angle α relative to the vehicle 12 at the current location, and the rear tires 126.1", 126.2" are at a corresponding yaw angle α−Δα. The curvature R of the centerline 178 of the curved path 14* is estimated from measurements of vehicular longitudinal velocity V and yaw rate ω by:

$$R = \frac{V}{\omega} = \frac{1}{C_0} \quad (33)$$

which is assumed to be constant for this analysis. The curvature of the roadway surface 32' is generally estimated by a clothoid model, of which $C_0$ is the $0^{th}$ order parameter. For a given prospective down-range coordinate $Z_{World}^F$ the midpoint between the front tires 126.1', 126.2 at a future point in time along the centerline 178 of a curved path 14*, the corresponding cross-range coordinate $X_{World}^F$ of that midpoint is estimated as:

$$X_{World}^F = -R \cdot \left(1 - \sqrt{1 - \left(\frac{Z_{World}^F}{R}\right)^2}\right) \approx -\frac{C_0 \cdot Z_{World}^{F2}}{2}, \quad (34)$$

wherein the corresponding prospective yaw angle α is given by:

$$\alpha = \sin^{-1}(C_0 \cdot Z_{World}) \quad (35)$$

The corresponding coordinates along the left front tire track 156.1, 156.1' and right front tire track 156.2, 156.2' can then be estimated as:

$$\text{Track}_{LF}\left\{X_{World}^F - \frac{W_F \cdot \cos(\alpha)}{2}, Z_{World}^F - \frac{W_F \cdot \sin(\alpha)}{2}\right\} \quad (36)$$

$$\text{Track}_{RF}\left\{X_{World}^F + \frac{W_F \cdot \cos(\alpha)}{2}, Z_{World}^F + \frac{W_F \cdot \sin(\alpha)}{2}\right\} \quad (37)$$

wherein $W_F$ is the track width between the front tires 126.1', 126.2'.

For a vehicle wheelbase L, the corresponding locations of the down-range coordinate $Z_{World}^F$ of the midpoint between the rear tires 126.1", 126.2", and the corresponding associated cross-range coordinate $X_{World}^R$ of that midpoint, can be estimated by:

$$Z_{World}^R = Z_{World}^F - L \cdot \cos(\alpha) \tag{38}$$

$$X_{World}^R \approx -\frac{C_0 \cdot Z_{World}^{R2}}{2} \tag{39}$$

The corresponding coordinates along the left rear tire track 156.1, 156.1" and right rear tire track 156.2, 156.2" can then be estimated as:

$$Track_{LR}\left\{X_{World}^R - \frac{W_R \cdot \cos(\alpha)}{2}, Z_{World}^R - \frac{W_R \cdot \sin(\alpha)}{2}\right\} \tag{40}$$

$$Track_{RR}\left\{X_{World}^R + \frac{W_R \cdot \cos(\alpha)}{2}, Z_{World}^F + \frac{W_R \cdot \sin(\alpha)}{2}\right\} \tag{41}$$

wherein $W_R$ is the track width between the rear tires 126.1", 126.2".

Given any of the above predicted track locations, i.e. $Track_{LF}$, $Track_{RF}$, $Track_{LR}$, $Track_{LR}$—the cross-range $X_{World}$ and down-range $Z_{World}$ coordinates of which are generally respectively designated as $X_{World}^{Track}$ and $Z_{World}^{Track}$, respectively the corresponding image coordinates of the track locations are given by:

$$X_{Image}^{Track} = \frac{f_X \cdot X_{World}^{Track}}{Z_{World}^{Track} \cdot \cos(\varphi) + (h_C - 0) \cdot \sin(\varphi)} \tag{42}$$

$$I_{COL}^{Track} = X_{Image} + \frac{N_{COLS}}{2} + .5 \tag{43}$$

$$Y_{Image}^{Track} = \frac{f_Y \cdot (Z_{World}^{Track} \cdot \sin(\varphi) - (h_C - 0) \cdot \cos(\varphi))}{Z_{World}^{Track} \cdot \cos(\varphi) + (h_C - 0) \cdot \sin(\varphi)} \tag{44}$$

$$J_{ROW}^{Track} = -Y_{Image}^{Track} + \frac{N_{ROWS}}{2} + .5, \tag{45}$$

Then, from the down-range coordinate $Z_{World}$ values given by equation (22), the corresponding elevation coordinate $Y_{World}$ of the track locations is given by:

$$Z_{World}^{Track} = Z_{World}^{Track}(I_{COL}^{Track}, J_{ROW}^{Track}) \tag{46}$$

which, when substituted into equation (7.1), gives the corresponding elevation coordinate $Y_{World}^{Track}$ for each of k points for the associated tiles 154' along each of the left front tire track 156.1, 156.1', the right front tire track 156.2, 156.2', the left rear tire track 156.1, 156.1", and the right rear tire track 156.2, 156.2":

$$Y_{Image}^{Track} = h_C - \frac{Z_{World}^{Track} \cdot (f_Y \cdot \sin(\varphi) - Y_{Image}^{Track} \cdot \cos(\varphi))}{f_Y \cdot \cos(\varphi) + Y_{Image}^{Track} \cdot \sin(\varphi)}. \tag{47}$$

Figure 44:
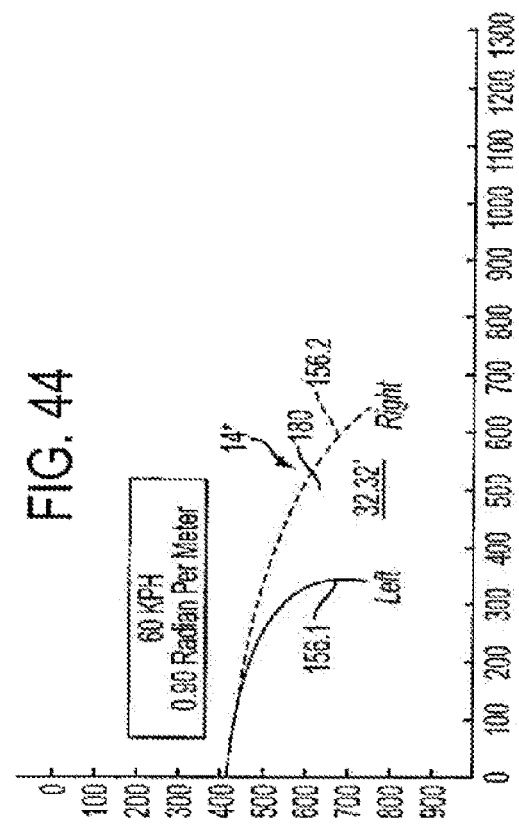
FIG. 44 illustrates projected left and right tire tracks in image space, for a curvature of about 0.03 radians per meter.
Figure 45:
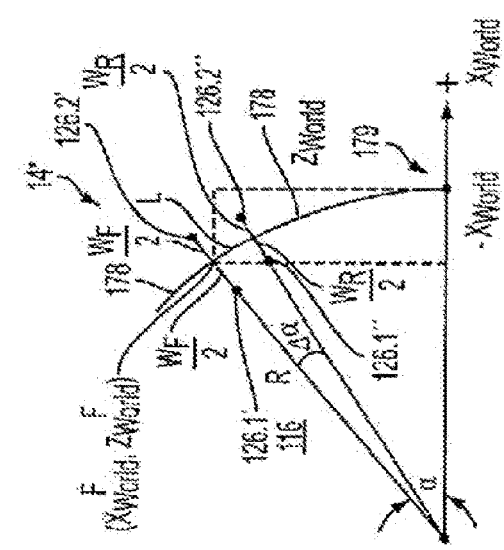
FIG. 45 illustrates projected left and right tire tracks in image space, for a curvature of about 0.35 radians per meter.
Figure 46:
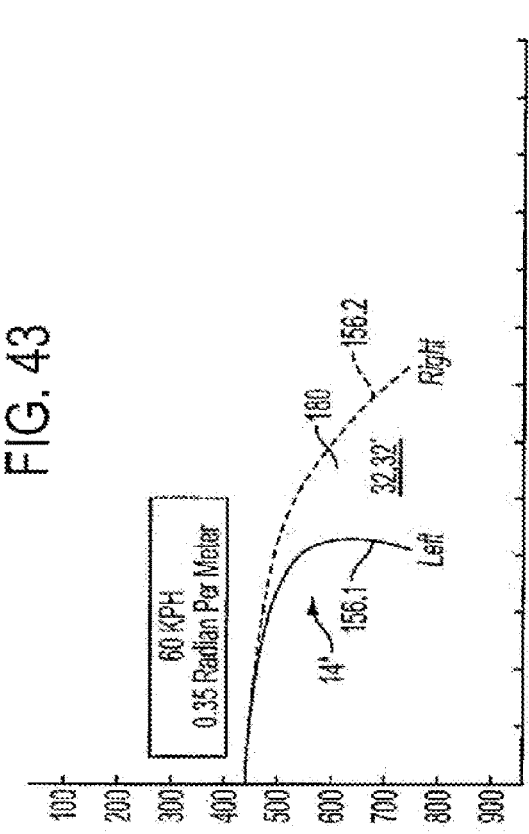
FIG. 46 illustrates projected left and right tire tracks in image space, for a curvature of about 0.90 radians per meter.

Referring to FIGS. 44-46, given a prediction of the actual shape of the left 156.1 and right 156.2 tire tracks on the roadway surface 32', the forward-looking vehicular path sensing system 10.1 can provide for a corresponding measurement of the elevation profile 22' of the roadway surface 32' along corresponding left 156.1 and right 156.2 tire tracks of arbitrary shape. FIGS. 44-46 respectively illustrate left 156.1 and right 156.2 tire tracks having corresponding curvatures of 0.03 radians per meter, 0.035 radians per meter, and 0.09 radians per meter, respectively.

The centerline 178 of the curved path 14\* within a curved lane 180 of a roadway surface 32' may be estimated as the center of the corresponding lane 180, the latter of which is otherwise characterized in accordance with any of the following U.S. patents commonly assigned with the instant application: U.S. Pat. No. 7,522,091 B2 that issued on 21 Apr. 2009, U.S. Pat. No. 7,626,533 B2 that issued on 1 Dec. 2009, or U.S. Pat. No. 7,034,742 B2 that issued on 25 Apr. 2006.

Alternatively, the associated boundaries of a curved lane 180 of a roadway surface 32' may be estimated using an image-based lane detection system that provides for finding the trajectory of the vehicle 12 using lane marker identification together with piece-wise linear modeling to predict the future path 14 of the vehicle 12.

Figure 47A:
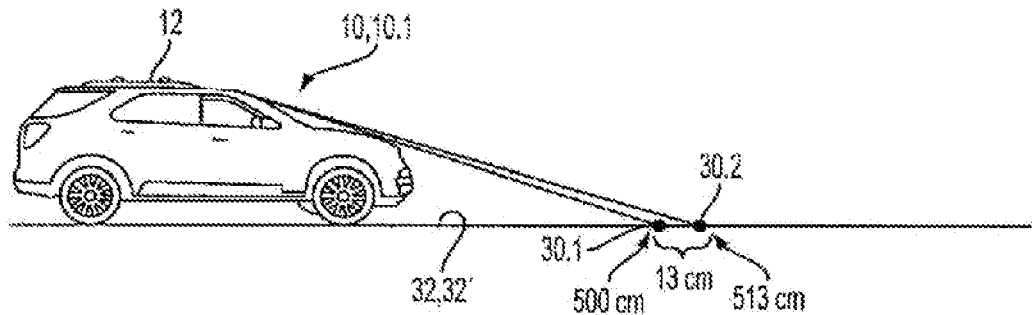
FIG. 47a illustrates a vehicle in a level pitch attitude, projecting two beams of light from a forward-looking vehicular path sensing system, showing the locations of the associated resulting distinct light spots on the roadway surface.
Figure 47B:
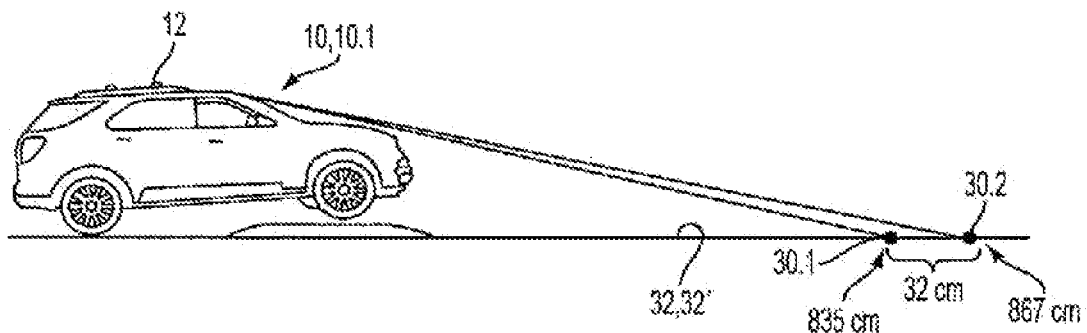
FIG. 47b illustrates the same vehicle illustrated in FIG. 45a, but pitched upwards at an angle of 6 degrees.
Figure 47C:
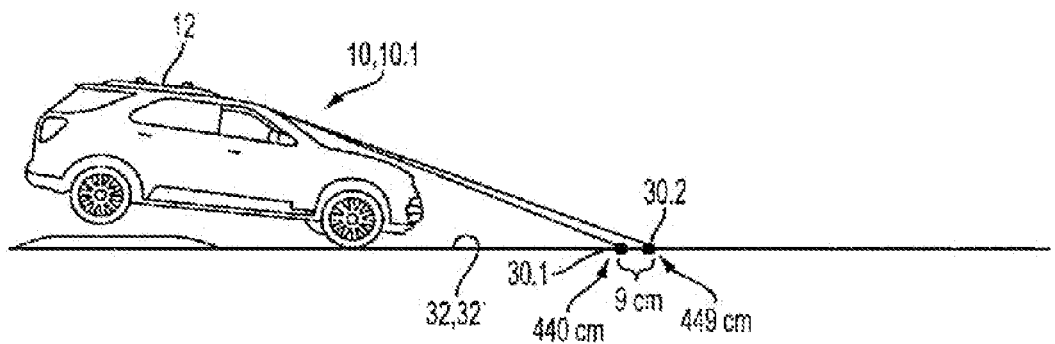
FIG. 47c illustrates the same vehicle illustrated in FIGS. 45a and 45b, but pitched downwards at an angle of 6 degrees.

Referring to FIGS. 47*a-c*, the down-range coordinate $Z_{World}$ of a particular distinct light spot 30 from a corresponding beam of light 52 varies with vehicle pitch angle θ, as does the separation between different distinct light spots 30 from different corresponding beams of light 52. For example, FIG. 47*a* illustrates a vehicle 12 on a flat roadway surface 32' at a vehicle pitch angle θ=0 degrees, projecting two beams of light 52.1, 52.2 thereupon from an associated forward-looking vehicular path sensing system 10.1, wherein the resulting associated resulting corresponding two distinct light spots 30.1, 30.2 are located at corresponding down-range coordinates $Z_{World}$, of 500 centimeters and 513 centimeters respectively, so as to be separated by 13 centimeters.

By comparison, with the vehicle pitch upwards by 6 degrees, i.e. at vehicle pitch angle θ=+6 degrees, as illustrated in FIG. 47*b*, for the same two beams of light 52.1, 52.2 and flat roadway surface 32' as in FIG. 47*a*, the resulting corresponding two distinct light spots 30.1, 30.2 are located at corresponding down-range coordinates $Z_{World}$, of 835 centimeters and 867 centimeters respectively, so as to be separated by 32 centimeters. Similarly, with the vehicle pitch downwards by 6 degrees, i.e. at vehicle pitch angle θ=−6 degrees, as illustrated in FIG. 45*c*, for the same two beams of light 52.1, 52.2 and flat roadway surface 32' as in FIGS. 47*a* and 47*b*, the resulting corresponding two distinct light spots 30.1, 30.2 are located at corresponding down-range coordinates $Z_{World}$, of 440 centimeters and 449 centimeters respectively, so as to be separated by 9 centimeters. Accordingly, as the vehicle 12 pitches upwards, the values of the down-range coordinates $Z_{World}$ of the distinct light spots 30 increase, as does the separation between different relatively-longitudinally separated distinct light spots 30, and as the vehicle 12 pitches downwards, the values of the down-range coordinates $Z_{World}$ of the distinct light spots 30 decrease, as does the separation between different longitudinally separatedd distinct relatively light spots 30, which provides for inferring the vehicle pitch angle θ from the separation in down-range coordinates $Z_{World}$ of different relatively-longitudinally separated distinct light spots 30, or from the some or all of the totality of separations of all the different relatively-longitudinally separated distinct light spots 30. For example, referring again to FIG. 36, in one set of embodiments, this vehicle pitch angle θ is an additional input to the electronic suspension control system 162 for controlling the vehicle suspension system 164, 166. The effect of vehicle pitch angle θ can be distinguished from local elevational effects of the distinct light spots 30 because changes of vehicle pitch angle θ affect all of the distinct light spots 30 in a predictable way, the effect of which can be accounted for prior to analyzing for local elevational effects.

Figure 48:
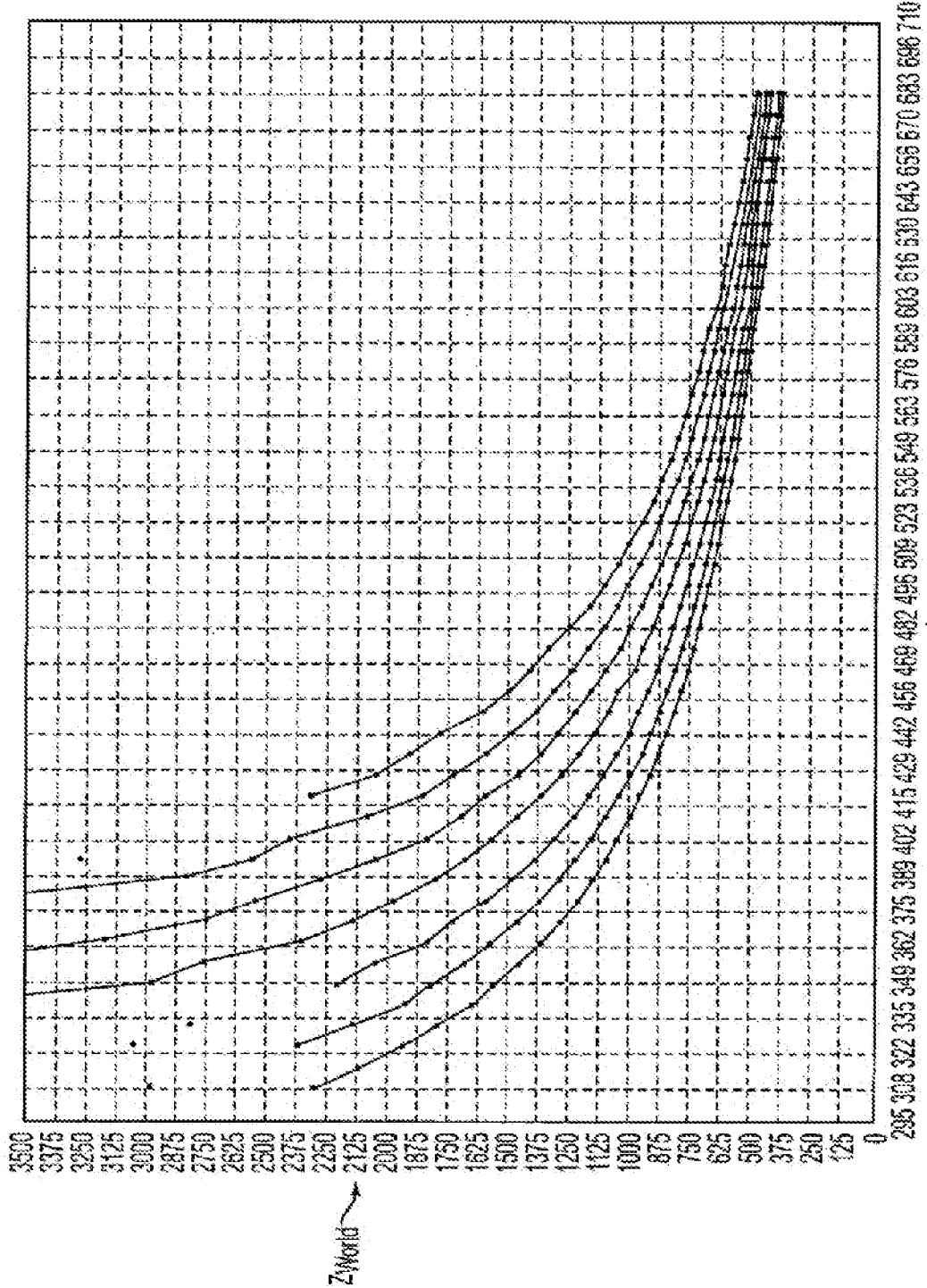
FIG. 48 illustrates a plot of down range coordinate in real space as a function of image row coordinate in image space for families of vehicle pitch angle.

Referring to FIG. 48, for a flat roadway surface 32" the location of the of the distinct light spot image(s) $24^{(q)}$ in the image 24 is relatively invariant with respect to vehicle pitch angle θ because both the light projection system 18, 18.1 and the imaging system 34 of the forward-looking vehicular path sensing system 10.1 are fixed relative to one another in the vehicle 12. More particularly, FIG. 48 illustrates plots of down-range coordinates $Z_{World}$ (in centimeters) in real space 116 as function of row coordinate $J_{ROW}$, 110 in image space 114 for each of a plurality of relatively-longitudinally separated distinct light spots 30 generated by a corresponding plurality of beams of light 52 of a forward-looking vehicular path sensing system 10.1 when projected onto a flat roadway surface 32', for a families of vehicle pitch angle θ of level and six different increasingly downward pitch angles of 0 to 6 degrees in 1 degree increments, wherein it can be seen that the row coordinate $J_{ROW}$, 110 associated with each distinct light spot 30 is substantially invariant with respect to vehicle pitch angle θ, and that for any pair of distinct light spots 30, the slope therebetween of any of the plots of FIG. 48 decreases with decreasing vehicle pitch angle θ (i.e. increasing magnitude of downward vehicle pitch angle θ), corresponding to a decreasing difference between associated down-range coordinate $Z_{World}$ values, consistent with the illustration of FIG. 47c in relation to FIG. 47a.

For a given pair of down-range separated points in image space 114 having corresponding down-range coordinate $Z_{World}$ values, the relationships illustrated in FIG. 48 may be transformed into a relationship either a table lookup or a function—of vehicle pitch angle θ as a function of the difference between the associated down-range coordinate $Z_{World}$ values. Accordingly, in accordance with one aspect, the down-range coordinate $Z_{World}$ values are determined for a pair of down-range separated locations corresponding to those used to develop the above-described table lookup or functional relationship, which then is used to determine the corresponding vehicle pitch angle θ, which may be done for a plurality of sets of distinct light spot images $24^{(q)}$, from which a corresponding averaged vehicle pitch angle θ may be determined.

Figure 49:
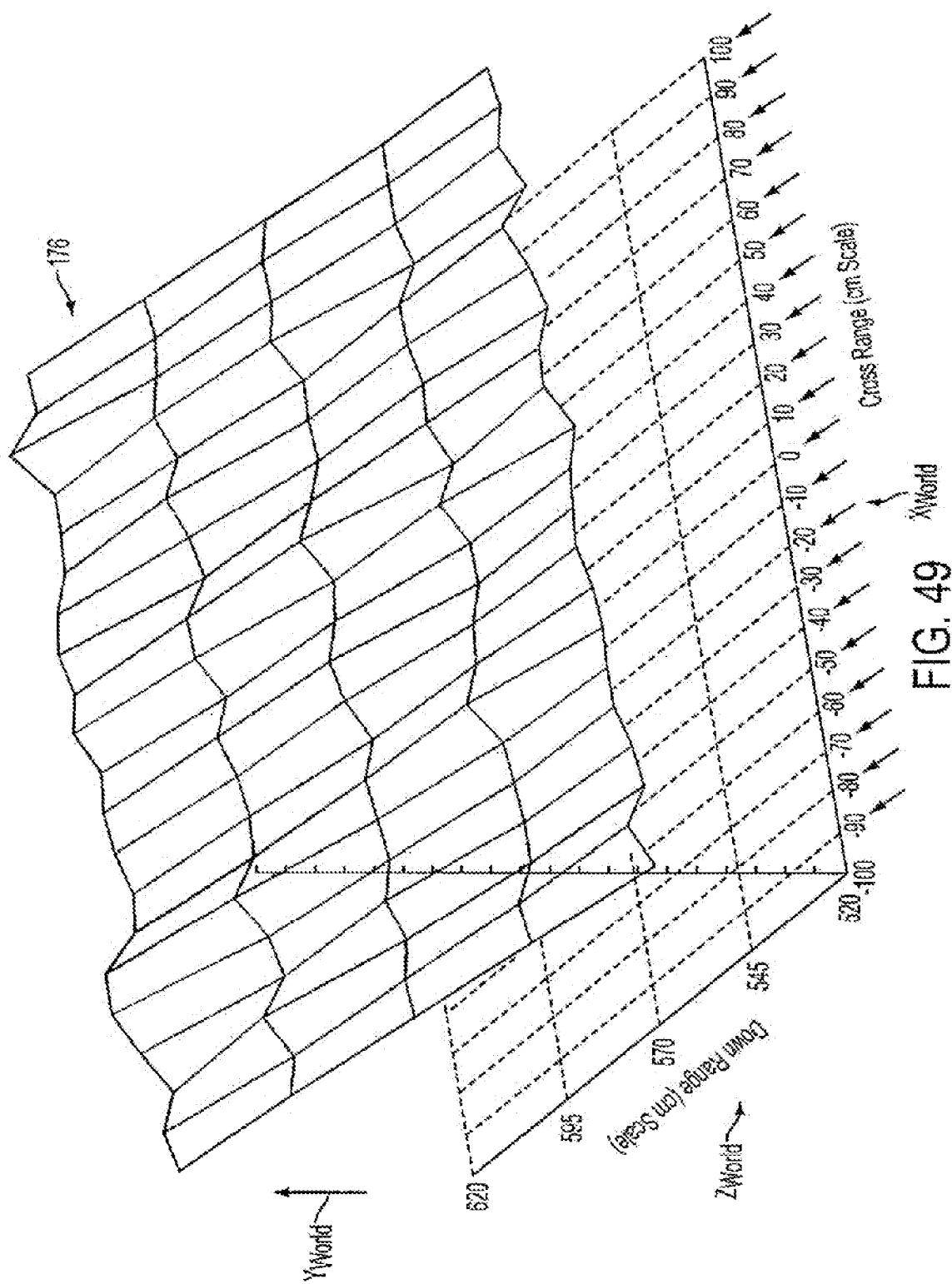
FIG. 49 illustrates an isometric view of an elevation profile of the set of set of tiles similar to those illustrated in FIG. 40.
Figure 53:
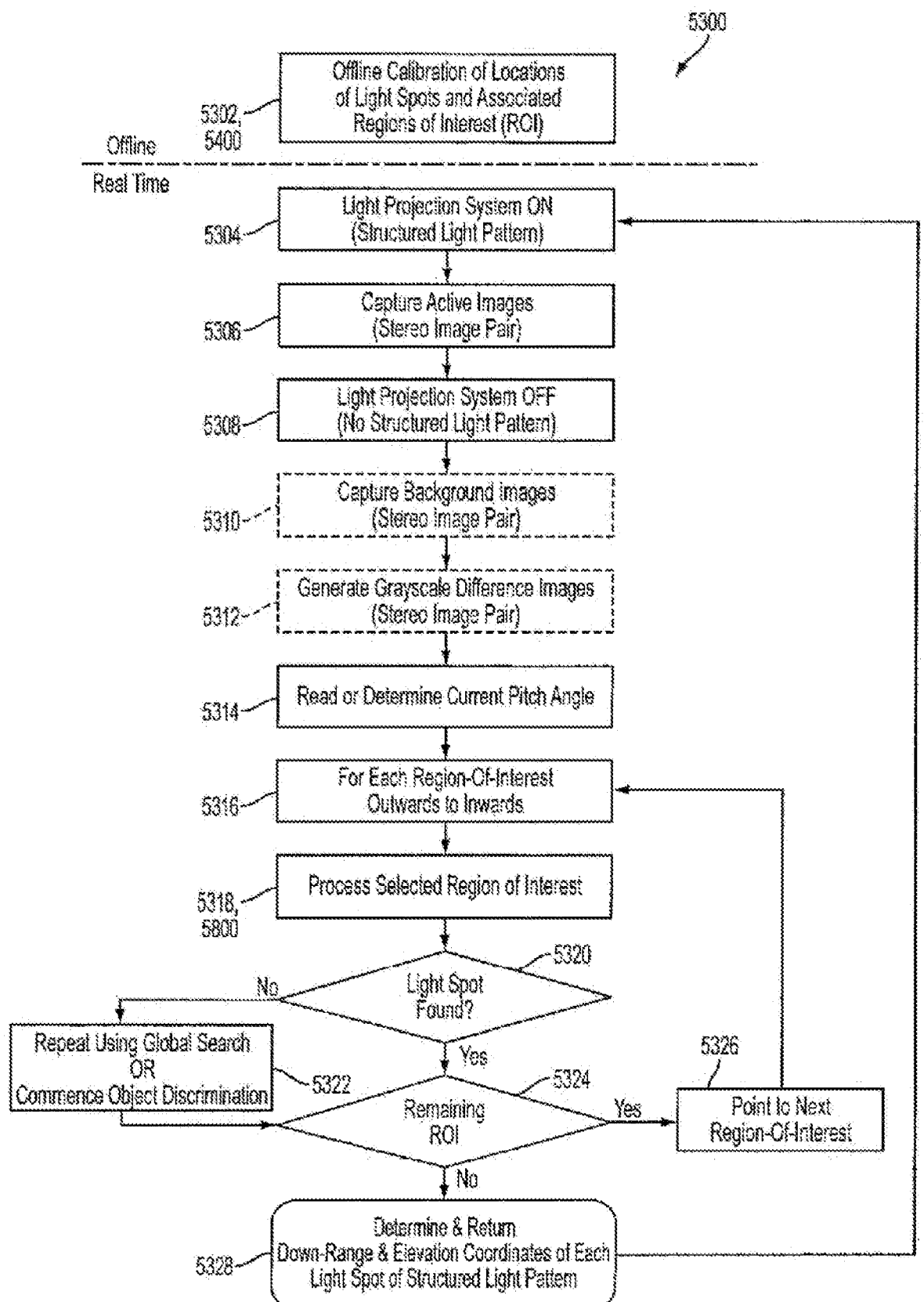
FIG. 53 illustrates a flow chart of a second process for measuring downrange coordinates of a plurality of distinct light spots projected from a vehicular path sensing system incorporating an associated stereo vision system.

Alternatively, referring to FIG. 49, the vehicle pitch θ and roll β angles may be determined by analysis of the above-described pitch/roll analysis patch 176. For example, in accordance with one embodiment, the vehicle pitch angle θ is given by summing the calculated pitch angles of the pitch/roll analysis patch 176 at each associated cross-range coordinate $X_{World}$ at the associated tile boundaries (indicated by arrows in FIG. 49), and dividing by the number of valid pitch angles in the sum, or:

$$\theta = \frac{\sum_{X_{World}=X_{World}^{Left}}^{X_{World}^{Right}} \tan^{-1}\left(\frac{\Delta Y_{World}(X_{World})}{\Delta Z_{World}(X_{World})}\right)}{N_{Valid}} \quad (48)$$

wherein:

$$\Delta Y_{World}(X_{World})=Y_{World}(X_{World},Z_{World}^{Max})-Y_{World}(X_{World},Z_{World}^{Min}), \text{ and} \quad (49.1)$$

$$\Delta Z_{World}(X_{World})=Z_{World}^{Max}-Z_{World}^{Min}, \quad (50.1)$$

or $$\Delta Y_{World}(X_{World})=Y_{World}(X_{World},Z_{World}^{Min})-Y_{World}(X_{World},Z_{World}^{Max}), \text{ and} \quad (49.2)$$

$$\Delta Z_{World}(X_{World})=Z_{World}^{Min}-Z_{World}^{Max}, \quad (50.2)$$

$N_{Valid}$ is the number of calculated pitch angles for which associated down-range coordinate $Z_{World}$ and elevation coordinate $Y_{World}$ values are available, $Z_{World}^{Min}$ is the minimum down-range coordinate $Z_{World}$ of the pitch/roll analysis patch 176, $Z_{World}^{Max}$ is the maximum down-range coordinate $Z_{World}$ of the pitch/roll analysis patch 176, $X_{World}^{Left}$ is the left-most cross-range coordinate $X_{World}$ of the pitch/roll analysis patch 176, and $X_{World}^{Right}$ is the right-most cross-range coordinate $X_{World}$ of the pitch/roll analysis patch 176.

As another example, in accordance with another embodiment, the vehicle roll angle β is given by summing the calculated roll angles of the pitch/roll analysis patch 176 at each associated down-range coordinate $Z_{World}$ at the associated tile boundaries, and dividing by the number of valid pitch angles in the sum, or:

$$\beta = \frac{\sum_{Z_{World}=Z_{World}^{Min}}^{Z_{World}^{Max}} \tan^{-1}\left(\frac{\Delta Y_{World}(Z_{World})}{\Delta X_{World}(Z_{World})}\right)}{N_{Valid}} \quad (51)$$

wherein:

$$\Delta Y_{World}(Z_{World})=Y_{World}(X_{World}^{Right},Z_{World})-Y_{World}(X_{World}^{Left},Z_{World}), \text{ and} \quad (52.1)$$

$$\Delta X_{World}(Z_{World})=X_{World}^{Right}-X_{World}^{Left}, \quad (53.1)$$

or $$\Delta Y_{World}(Z_{World})=Y_{World}(X_{World}^{Left},Z_{World})-Y_{World}(X_{World}^{Right},Z_{World}), \text{ and} \quad (52.2)$$

$$\Delta X_{World}(Z_{World})=X_{World}^{Left}-X_{World}^{Right}, \text{ and} \quad (53.2)$$

$N_{Valid}$ is the number of calculated pitch angles for which associated cross-range coordinate $X_{World}$ and elevation coordinate $Y_{World}$ values are available.

Returning to step (1912) of the process 1900 of FIG. 19, the locations of the each of distinct light spot image(s) $24^{(q)}$ in the left 132.1 and right 132.2 grayscale difference images—or, if only active left 24.1 and right 24.2 images are recorded, then each of the left 24.1 and right 24.2 images—may alternatively be determined by binning, which acts to concentrate the corresponding measured intensity of the associated non-zero-valued pixels 108 associated with each distinct light spot image $24^{(q)}$ to a single location in image space 114 having a value equal to the sum of all the values of the pixels 108 associated with the corresponding distinct light spot image $24^{(q)}$, that single location then being the location of corresponding distinct light spot image $24^{(q)}$ that is subsequently used to determine the associated disparity DX, and from that, the associated cross-range $X_{World}$, down-range $Z_{World}$ and elevation $Y_{World}$ coordinates of the corresponding distinct light spot $30^{(q)}$ in real space 116. For example, the binning process 1912 is illustrated in FIGS. 50-52 for a three-to-one transformation ratio, wherein every successive three-by-three array 182 of pixels 108 in the illustrated nine-by-nine array of pixels 108 of each original image 132.1, 132.2, 24.1, 24.2 illustrated in FIG. 50 is transformed into a corresponding first-level binned pixel 108' of a three-by-three array 184 of first-level binned pixels 108' illustrated in FIG. 51. Accordingly, the nine-by-nine array of pixels 108 of each original image 132.1, 132.2, 24.1, 24.2 illustrated in FIG. 50 is organized as three rows 186 and three columns 188 of three-by-three arrays 182, the rows 186 identified numerically in FIG. 50, and the columns 188 identified alphabetically in FIG. 50, with the corresponding first-level binned pixels 108' similarly identified in FIG. 51. Similarly, the three-by-three array 184 of first-level binned pixels 108' illustrated in FIG. 51 is subsequently similarly binned to generate a single second-level binned pixel 108" illustrated in FIG. 52.

Each first-level binned pixel 108' has a value 190' given by the sum of the values of the pixels 108 of the associated corresponding three-by-three array 182 of pixels 108, and has an associated corresponding row $J_{ROW}'$, 110' and column $I_{COL}'$, 112' coordinate of an associated centroid 192' location, and each second-level binned pixel 108" has a value 190" given by the sum of the values 190' of the first-level binned pixel 108' of the associated corresponding three-by-three array 184 of first-level binned pixels 108', and has an associated corresponding row $J_{ROW}'$, 110" and column $I_{COL}'$, 112" coordinate of an associated centroid 192" location. Generally for an N×N array of pixels $P(i_{COL}, j_{ROW})$ spanning rows $j_1$-$j_N$ and columns $i_1$-$i_N$, the resulting binned value $P'(i_{COL}, j_{ROW})$ thereof, and the corresponding associated centroid location $(I'_{COL}, J'_{ROW})$ thereof, is given by:

$$P'(I'_{COL}, J'_{ROW}) = \sum_{i_{COL}=i_1}^{i_N} \sum_{j_{ROW}=j_1}^{j_N} P(i_{COL}, j_{ROW}) \tag{54}$$

$$I'_{COL} = \frac{\sum_{i_{COL}=i_1}^{i_N} \sum_{j_{ROW}=j_1}^{j_N} I_{COL} \cdot P(i_{COL}, j_{ROW})}{\sum_{i_{COL}=i_1}^{i_N} \sum_{j_{ROW}=j_1}^{j_N} P(i_{COL}, j_{ROW})} \tag{55}$$

$$J'_{ROW} = \frac{\sum_{i_{COL}=i_1}^{i_N} \sum_{j_{ROW}=j_1}^{j_N} J_{ROW} \cdot P(i_{COL}, j_{ROW})}{\sum_{i_{COL}=i_1}^{i_N} \sum_{j_{ROW}=j_1}^{j_N} P(i_{COL}, j_{ROW})} \tag{56}$$

Accordingly, the process of equations (54)-(56) is repeated for nine abutting three-by-three arrays 182 of the original image 132.1, 132.2, 24.1, 24.2 illustrated in FIG. 50 so as to generate the resulting three-by-three array 184 of first-level binned pixels 108' illustrated in FIG. 51, and then the process of equations (54)-(56) is successively repeated for the three-by-three array 184 of first-level binned pixels 108 illustrated in FIG. 51 so as to generate the final result of the centroid location $(I'_{COL}, J'_{ROW})$ illustrated in FIG. 52, which is then subsequently used to compute the associated disparity DX for the corresponding associated distinct light spot $30^{(q)}$.

Figure 55:
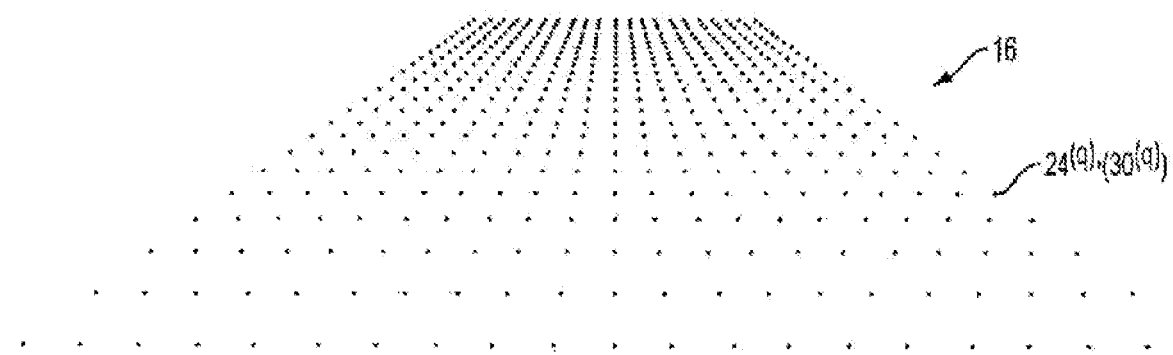
FIG. 55 illustrates a plurality of light spots in an associated structured light pattern projected onto a roadway surface, the detection of each of which is provided for by the second process illustrated in FIG. 53.
Figure 56:
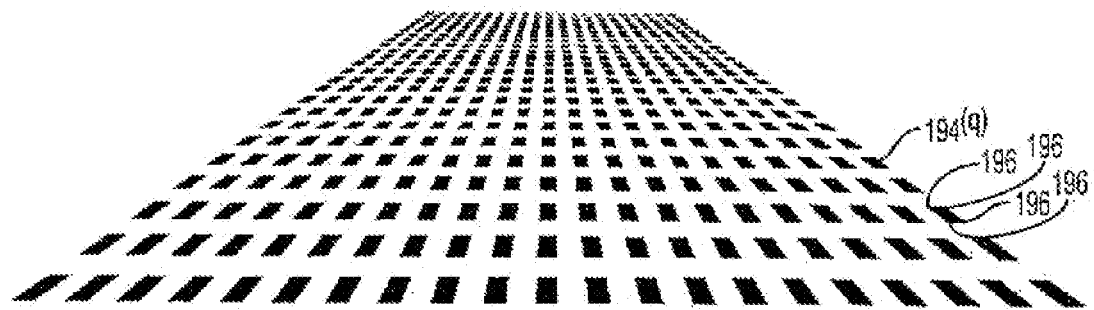
FIG. 56 illustrates a plurality of regions-of-interest associated with the structured light pattern illustrated in FIG. 55, that are used by the second process illustrated in FIG. 53 to provide for detecting the locations of each light spot of the structured light pattern.
Figure 57:
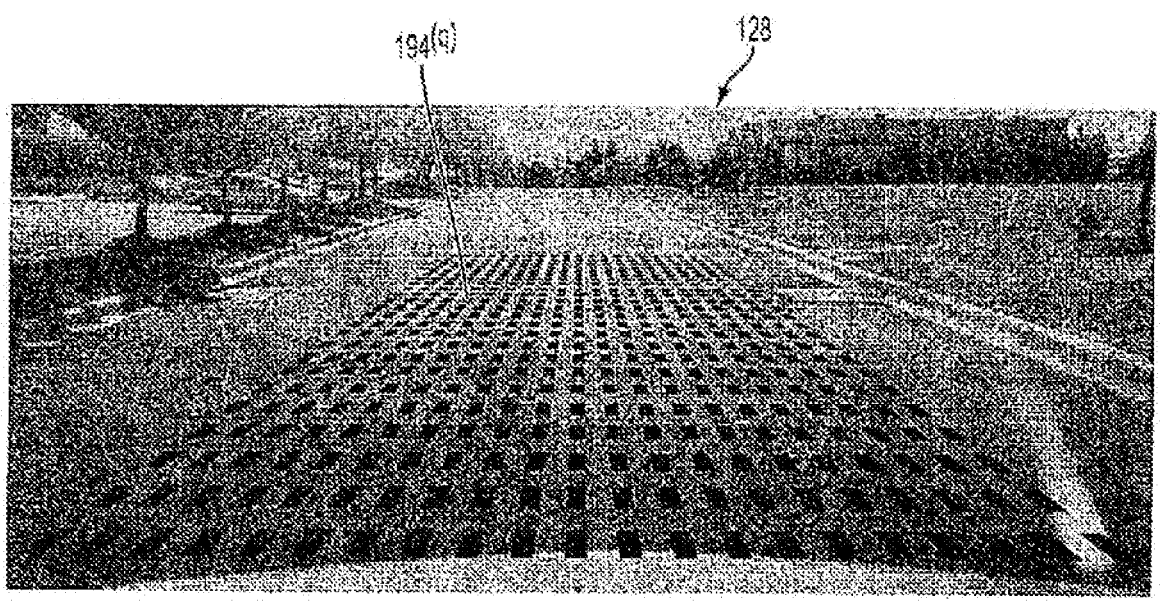
FIG. 57 illustrates a plurality of regions-of-interest illustrated in FIG. 56, projected onto a half-tone image of an associated roadway surface upon which the structured light pattern illustrated in FIG. 55, from one of the two stereo cameras.
Figure 54:
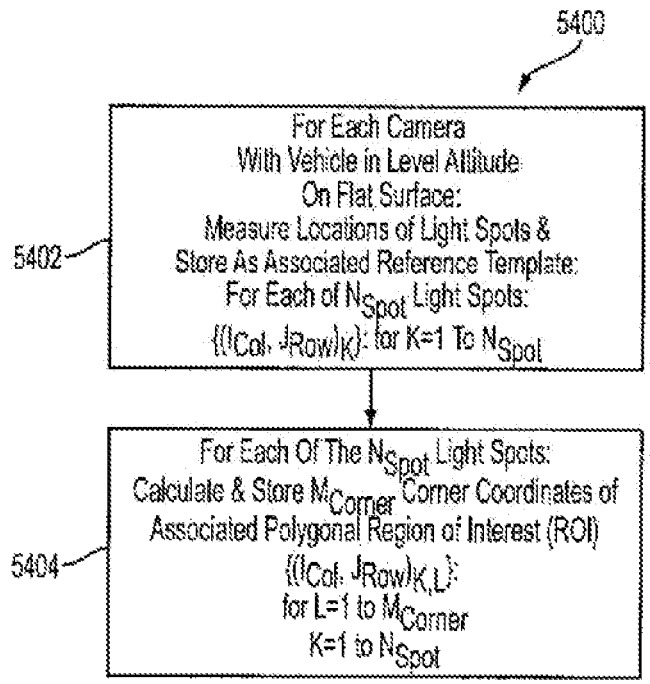
FIG. 54 illustrates a flow chart of an offline calibration process associated with the second process illustrated in FIG. 53.

In accordance with a second set of embodiments, FIGS. 53-70 illustrates a second process 5300 and associated sub-processes 5400, 5800, 5900, 6000 and 6100 for determining the real space 116 down-range coordinate $Z_{World}$ of each of a plurality of distinct light spots 30 of an associated structured light pattern 16 directly from associated left 24.1 and right 24.2 images of a visual scene 128, captured with an associated stereo vision system 36. The second process 5300 provides for locating each distinct light spot image $24^{(q)}$ of each distinct light spot $30^{(q)}$ of the structured light pattern 16 within a corresponding pre-defined corresponding associated region-of-interest $194^{(q)}$ in image space 114, wherein each region-of-interest $194^{(q)}$ is processed separately so as to locate the corresponding associated distinct light spot image $24^{(q)}$ therein, beginning with the regions-of-interest $194^{(q)}$ farthest from the vehicle 12, and then moving progressively closer thereto. For example, referring to FIGS. 55-57, the distinct light spot images $24^{(q)}$ of the associated structured light pattern 16 illustrated in FIG. 55 are in one-to-one correspondence with the corresponding regions-of-interest $194^{(q)}$ illustrated in FIG. 56, the latter of which are illustrated in FIG. 57 overlaid upon a visual scene 128. The regions-of-interest $194^{(q)}$ define regions in image space 114 within corresponding distinct light spot images $24^{(q)}$ can be expected to be located.

The second process 5300 for determining the real space 116 down-range coordinate $Z_{World}$ commences with an offline calibration process of step (5302) prior to real-time operation in the vehicle 12, so as to provide for determining the nominal boundaries of each region-of-interest $194^{(q)}$. More particularly, referring to FIG. 54, an offline calibration process 5400 called from step (5302) commences with step (5402), wherein the vehicle 12 is located on a level surface 32 and the light projection system 18 is turned ON so as to project the associated structured light pattern 16 on the level surface 32, after which the left 24.1 and right 24.2 images thereof are recorded and each distinct light spot $30^{(q)}$ of the structured light pattern 16 is located in image space 114 of each of the associated left 24.1 and right 24.2 images, i.e. the location of each of the distinct light spot image(s) $24^{(q)}$ for each of the $N_{SPOT}$ distinct light spot $30^{(q)}$ within each of the left 24.1 and right 24.2 images is stored as a corresponding reference template for each of the corresponding left 38.1 and right 38.2 cameras. Then, in step (5404), for each of the $N_{SPOT}$ distinct light spot $30^{(q)}$ for each of the corresponding left 38.1 and right 38.2 cameras, the corner coordinates in the corresponding associated image space 114 is calculated for each associated region-of-interest $194^{(q)}$, wherein each region-of-interest $194^{(q)}$ is generally polygonal with $M_{CORNER}$ corners 196. For example, each region-of-interest $194^{(q)}$ illustrated in FIGS. 55 and 56 is rectangular, so as to have four corners 196 that are aligned with one another along within the associated Cartesian array 106 of pixels 108 of each left 24.1 and right 24.2 image. Each region-of-interest $194^{(q)}$ is sufficiently large so as to provide for an expected range of variations of elevation of the surface 32—for example, 40 centimeters either above or below a flat roadway surface 32'—at each corresponding location of the corresponding distinct light spot $30^{(q)}$, so that under actual driving conditions each distinct light spot image $24^{(q)}$ can be expected to be located within each of the associated left 24.1 and right 24.2 images can be expected to be located in the corresponding associated region-of-interest $194^{(q)}$. The structured light pattern 16 and associated regions-of-interest $194^{(q)}$ are configured so that the regions-of-interest $194^{(q)}$ do not overlap with one another. For a given distinct light spot $30^{(q)}$, the corresponding regions-of-interest $194^{(q)}$ for the left 24.1 and right 24.2 images will be relatively laterally displaced relative to one another with respect to the corresponding associated image spaces 114 so as to account for the corresponding disparity DX associated with the down-range $Z_{World}$ location of the distinct light spot $30^{(q)}$.

Given the results of the results of the offline calibration process 5400, the results of which are stored in memory 75 of the image processing system 74, the real time operation of the second process 5300 commences with step (5304), by turning the light projection system 18, 18.1 ON, after which, in step (5306), a first stereo image pair, i.e. left 24.1 and right 24.2 images, is captured by the left 38.1 and right 38.2 cameras of the stereo vision system 36. Then, the light projection system 18, 18.1 turned OFF in step (5308). As with the first process 1900, if the contrast between the distinct light spot image(s) 24$^{(q)}$ and the associated background portion of the image 24 is less than a threshold, then, in step (5310), a second stereo image pair, i.e. left 130.1 and right 130.2 background images, is captured by each of the left 38.1 and right 38.2 cameras without the structured light pattern 16, 16.1, after which, in step (5312), the left 130.1 and right 130.2 background images captured in step (5310) are subtracted from the left 24.1 and right 24.2 images captured in step (5306) so as to generate a corresponding set of left 132.1 and right 132.2 grayscale difference images. Alternatively, if the contrast is sufficiently great—for example, during nighttime operation, —then the left 24.1 and right 24.2 images are acquired continuously so as to provide for carrying out the remaining steps of the second process 5300 for every image frame on the left 24.1 and right 24.2 images, rather than every other image frame on the left 132.1 and right 132.2 grayscale difference images calculated by subtracting left 130.1 and right 130.2 background images from corresponding left 132.1 and right 132.2 grayscale difference images, each of which is acquired at every other image frame.

Then, in step (5314), the vehicle pitch angle θ is either read from a previously determined or measure value, or determined from the most recently determined cross-range $X_{World}$, down-range $Z_{World}$ and elevation $Y_{World}$ coordinates of the plurality of distinct light spots 30 of the structured light pattern 16, for example, as described hereinabove in accordance with FIGS. 47a-c, 48 and 49. The location of the associated distinct light spot image(s) 24$^{(q)}$ in image space 114 is responsive to the vehicle pitch angle θ. Accordingly, because the reference template of the associated regions-of-interest 194$^{(q)}$ corresponds to a level vehicle pitch angle θ, i.e. θ=0, each region-of-interest 194$^{(q)}$ is adjusted responsive to vehicle pitch angle θ before use so as to provide for locating the associated distinct light spot 30$^{(q)}$ therein.

Then, in step (5316), for each of the $N_{SPOT}$ regions-of-interest 194$^{(q)}$ in order of farthest to closest relative to the vehicle 12, each selected region-of-interest 194$^{(q)}$ is processed in step (5318) by a light-spot-location process 5600 illustrated in FIG. 58, and described more fully hereinbelow—so as to locate the locations of the associated distinct light spot images 24$^{(q)}$ within the corresponding region-of-interest 194$^{(q)}$, for each of the left 24.1 and right 24.2 images. Then, in step (5320), if a set of distinct light spot images 24$^{(q)}$ was not found for the selected region-of-interest 194$^{(q)}$, then, in step (5322), either the light spot detection process is repeated, but using a global search, for example, in accordance with the first process 1900 illustrated in FIG. 19, or an associated object discrimination process is commenced—for example, in accordance with above described step (3826) of the roadway surface preview process 3800, —on the basis that the distinct light spot image 24$^{(q)}$ may be displaced outside the associated region-of-interest 194$^{(q)}$ because of the presence of an object 20 of elevation exceeding the assumed range of elevations upon which the region-of-interest 194$^{(q)}$ was originally sized. Otherwise, from step (5320), if a set of distinct light spot images 24$^{(q)}$ had been found for the selected region-of-interest 194$^{(q)}$, then, in step (5324), if additional region-of-interest 194$^{(q)}$ remain to be processed, then in step (5326), the next closest region-of-interest 194$^{(q)}$ is selected, and the above-described steps are repeated beginning with step (5316). Otherwise, from step (5324), if each of the $N_{SPOT}$ regions-of-interest 194$^{(q)}$ have been processed, then in step (5328), the associated down-range $Z_{World}$ and elevation $Y_{World}$ coordinates are determined from the above-determined locations of the distinct light spot images 24$^{(q)}$ as described hereinabove, and returned for subsequent processing, after which the second process 5300 is repeated beginning with step (5304).

Figure 58:
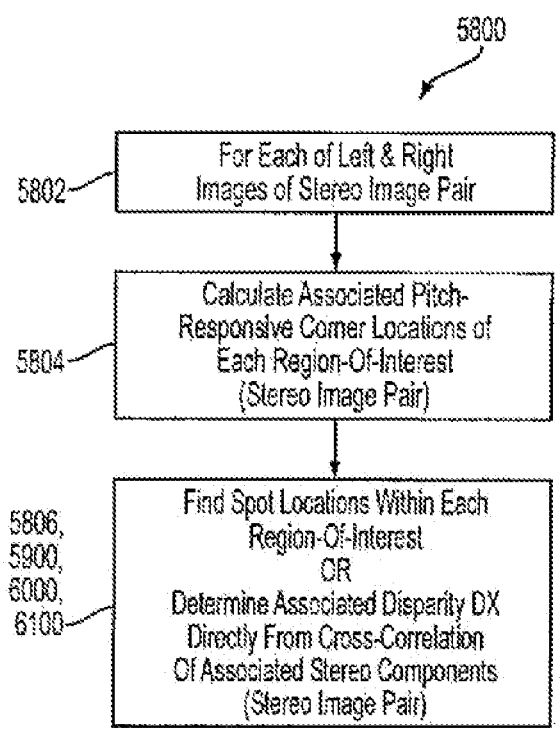
FIG. 58 illustrates a flow chart of a light-spot-location process for either finding light spot locations within a corresponding region-of-interest, or for directly determining an associated disparity, associated with the second process illustrated in FIG. 53.

Returning to step (5318), the associated light-spot-location process 5800 illustrated in FIG. 58 commences with step (5802), wherein for each of the left 132.1 and right 132.2 grayscale difference images or left 24.1 and right 24.2 images of an associated stereo image pair, in step (5804), the pitch-responsive locations of the corners 196 of the associated region-of-interest 194$^{(q)}$ therein are calculated responsive to the vehicle pitch angle θ. Then, in step (5806), either the distinct light spot image 24$^{(q)}$ is located within the region-of-interest 194$^{(q)}$ within each of the left image 24.1 or grayscale difference image 132.1 and right image 24.2 or grayscale difference image 132.2 by any one of three sub-processes 5900, 6000 or 6100 respectively illustrated in FIGS. 59, 60 and 61, respectively; or the associated disparity DX is determined directly from a cross-correlation of the portion of the left image 24.1 or grayscale difference image 132.1 within the associated region-of-interest 194$^{(q)}$, cross-correlated with the portion of the right image 24.2 or grayscale difference image 132.2 within the region-of-interest 194$^{(q)}$.

Figure 59:
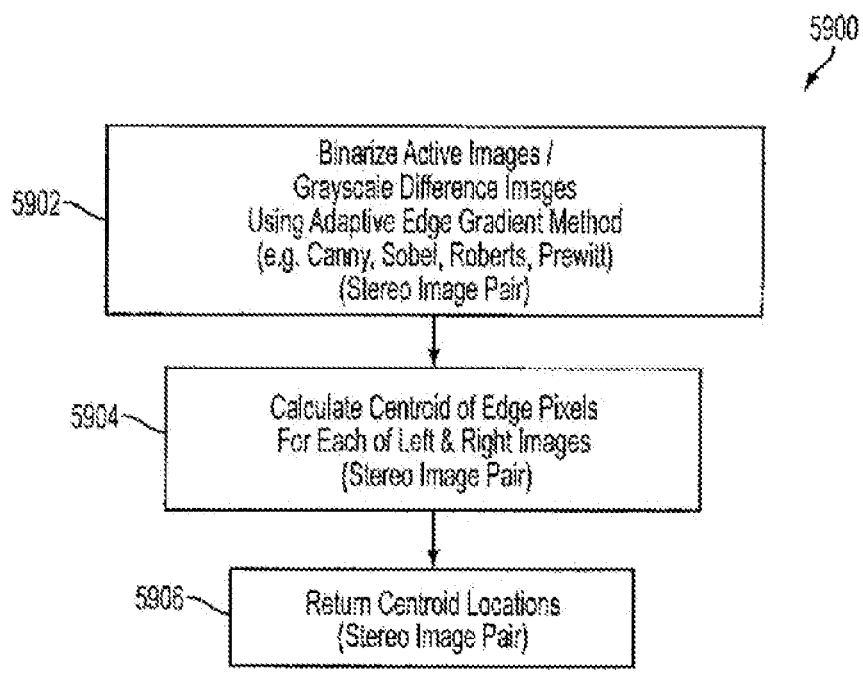
FIG. 59 illustrates a flow chart of a first sub-process for finding a light spot location within a corresponding region-of-interest, associated with the second process illustrated in FIG. 53.

Referring to FIG. 59, in accordance with the first sub-process 5700, commencing with step (5902), each of the left 132.1 and right 132.2 grayscale difference images—or, if only active left 24.1 and right 24.2 images are recorded, then each of the left 24.1 and right 24.2 images—within the associated region-of-interest 194$^{(q)}$ are each binarized using an adaptive edge gradient method, for example, using either a Canny filter, a Sobel filter, a Roberts filter, or a Prewitt filter, that provide for generating a binarized image while also sharpening the edges of the associated distinct light spots 30. Then, in step (5904), the location of each associated distinct light spot image 24$^{(q)}$ within the region-of-interest 194$^{(q)}$ in image space 114 is given by the centroid of the associated resulting edge points that result from the adaptive edge gradient method, after which, in step (5906), the centroid locations 192 of the left 132.1, 24.1 and right 132.2, 24.2 images are returned for the associated region-of-interest 194$^{(q)}$. For example, the centroid location 192 may be calculated from either all or a sampling of the edge points.

Figure 60:
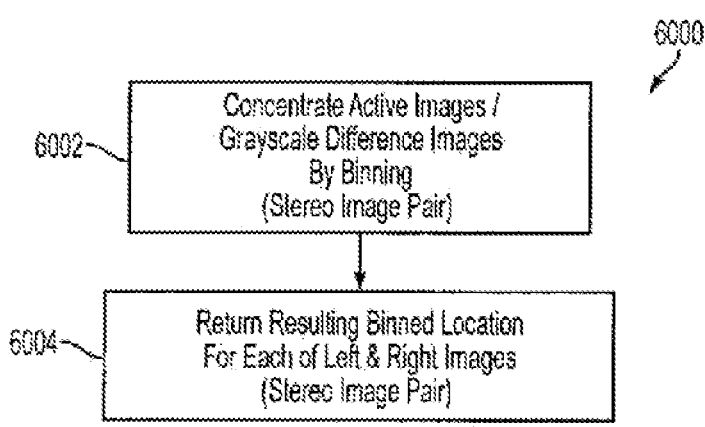
FIG. 60 illustrates a flow chart of a second sub-process for finding a light spot location within a corresponding region-of-interest, associated with the second process illustrated in FIG. 53.

Referring to FIG. 60, in accordance with the second sub-process 5800, in step (6002), portions of each to of the left 132.1 and right 132.2 grayscale difference images—or, if only active left 24.1 and right 24.2 images are recorded, then each of the left 24.1 and right 24.2 images—within the associated region-of-interest 194$^{(q)}$ are concentrated by binning, for example, as described hereinabove for FIGS. 50-52 and equations (54)-(56), and in step (6004), the resulting centroid locations 192 are returned as the resulting binned location of the associated distinct light spot image(s) 24$^{(q)}$ in the associated region-of-interest 194$^{(q)}$ within each of the left 132.1, 24.1 and right 132.2, 24.2 images.

Figure 61:
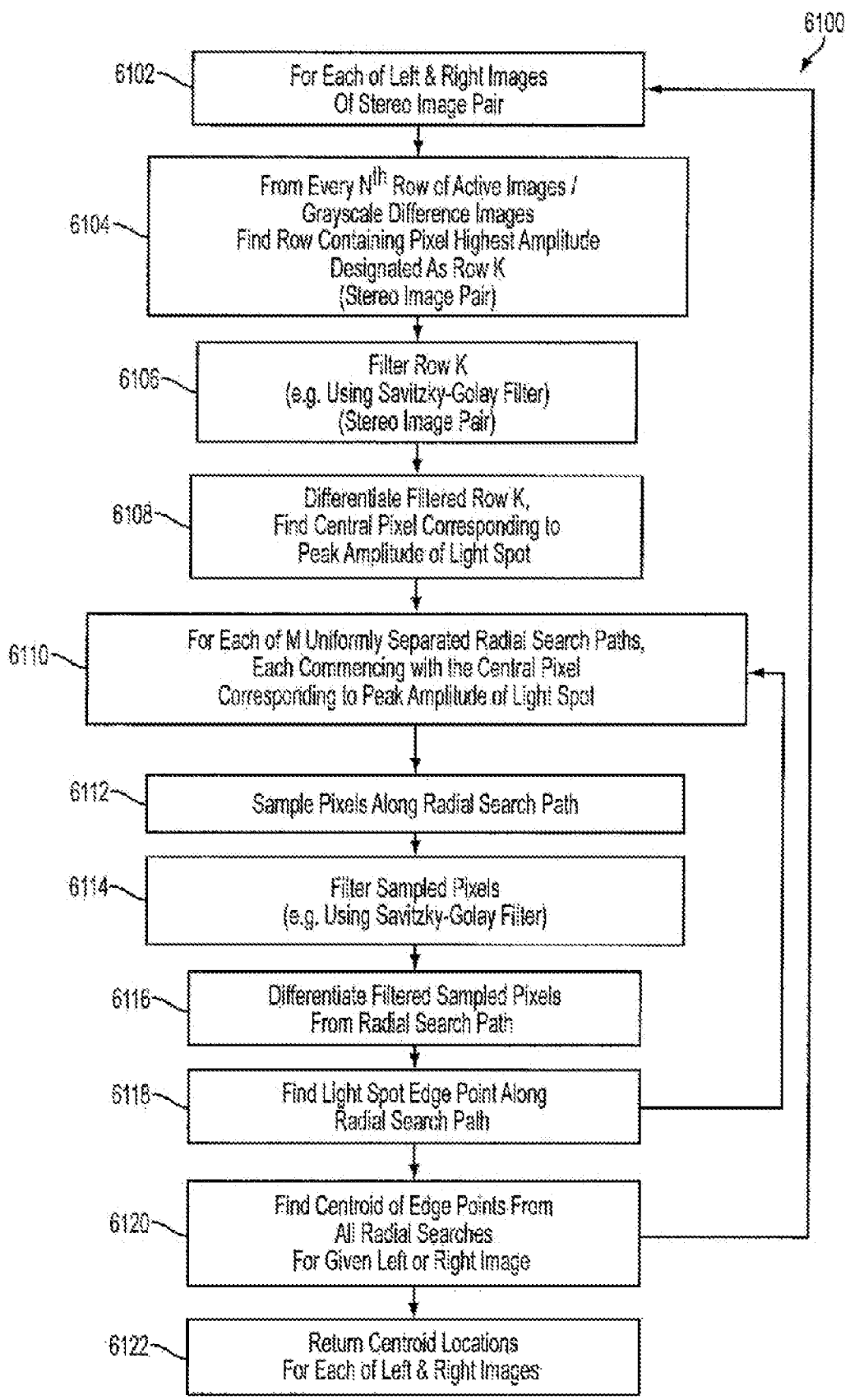
FIG. 61 illustrates a flow chart of a third sub-process for finding a light spot location within a corresponding region-of-interest, associated with the second process illustrated in FIG. 53.
Figure 62:
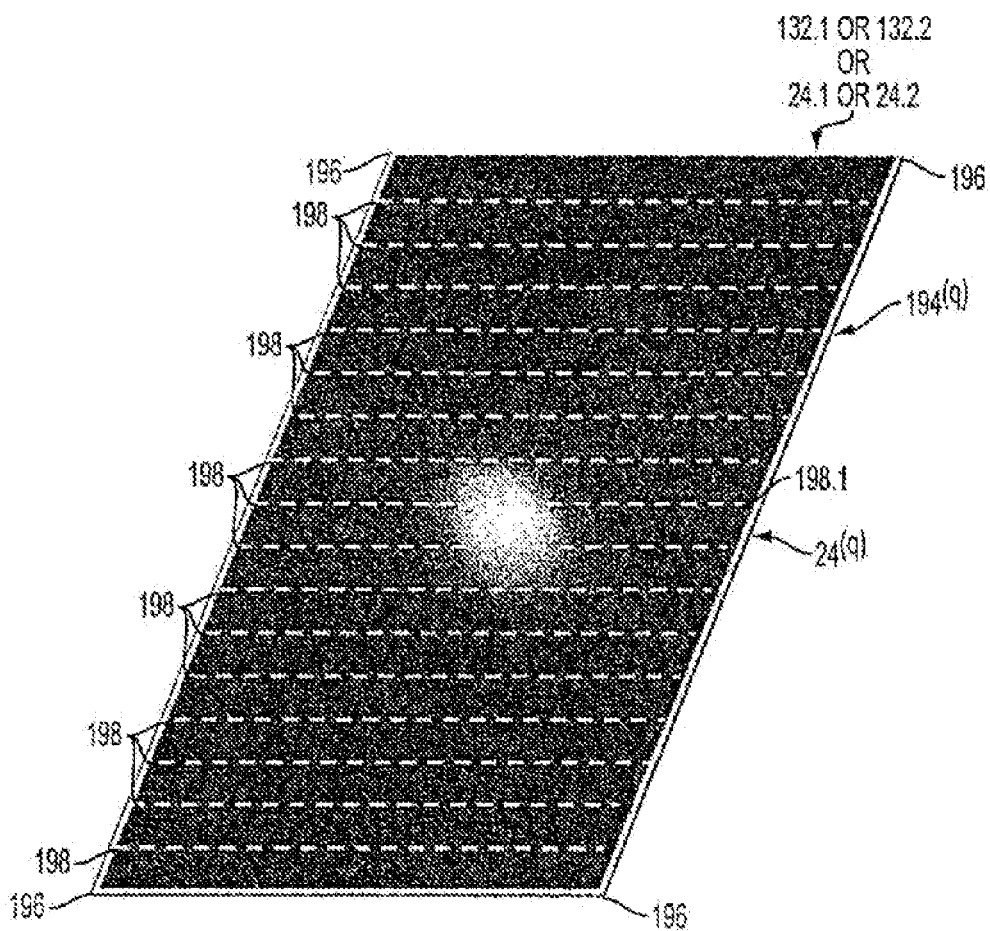
FIG. 62 illustrates an image of a light spot within a region-of-interest, upon which are superimposed a plurality of scan lines used to locate a region of relatively highest energy of the light spot in accordance with the third sub-process illustrated in FIG. 61.
Figure 63:
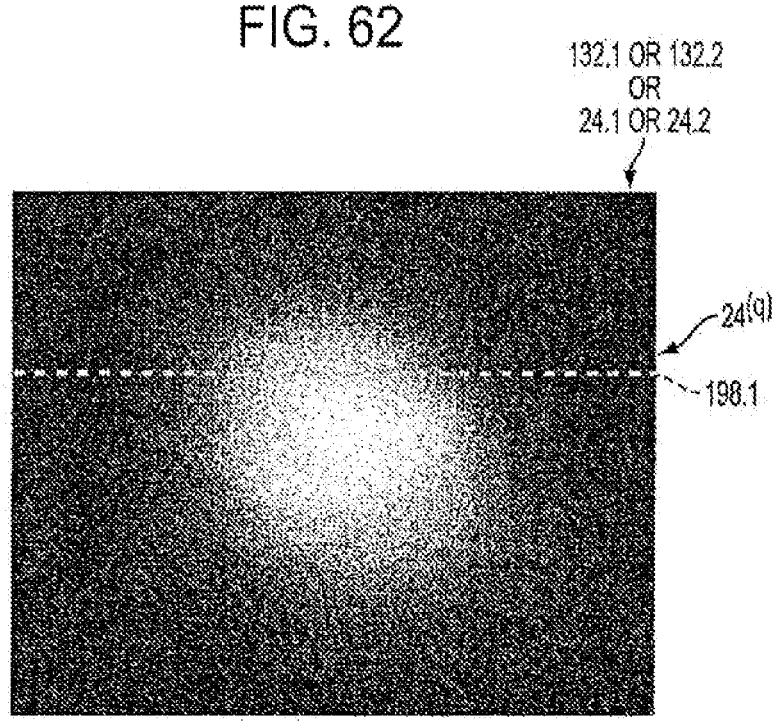
FIG. 63 illustrates a location of a scan line associated with a region of relatively highest energy of the light spot illustrated in FIG. 62.
Figure 64:
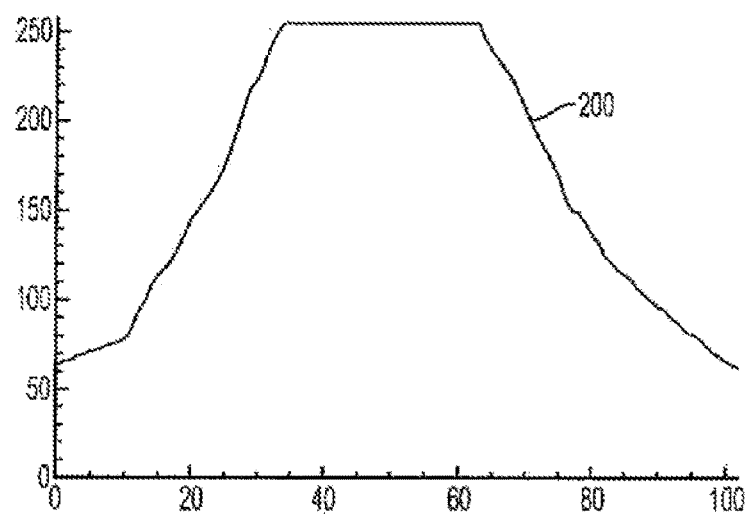
FIG. 64 illustrates a plot of image intensity along the scan line illustrated in FIG. 64.
Figure 65:
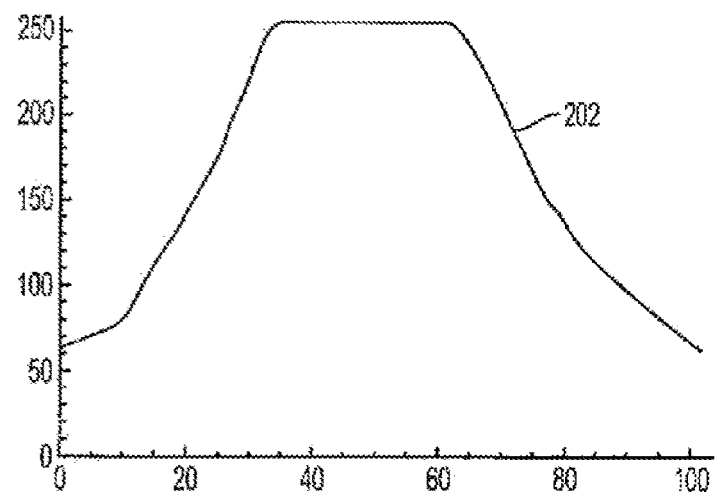
FIG. 65 illustrates the results of filtering the image intensity plot illustrated in FIG. 64 using a Savitzky-Golay filtering process.
Figure 66:
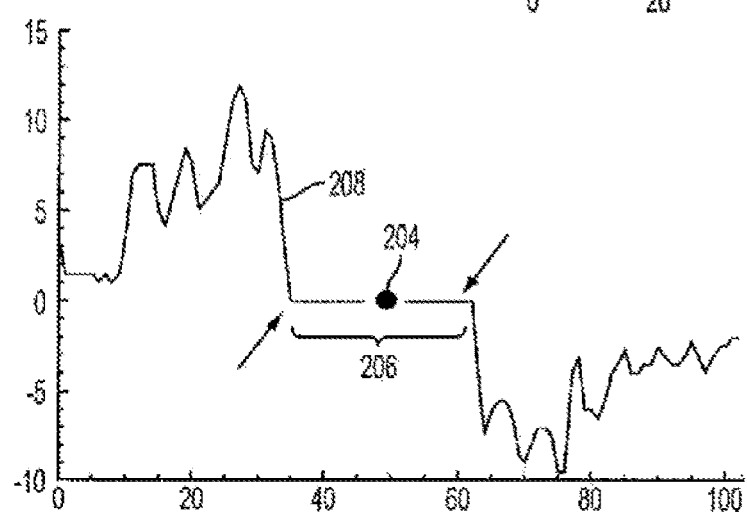
FIG. 66 illustrates the result of spatially differentiating filtered image intensity plot illustrated in FIG. 65, so as to provide for locating a starting location for a subsequent radially-outwards search of the light spot within the region-of-interest.
Figure 67:
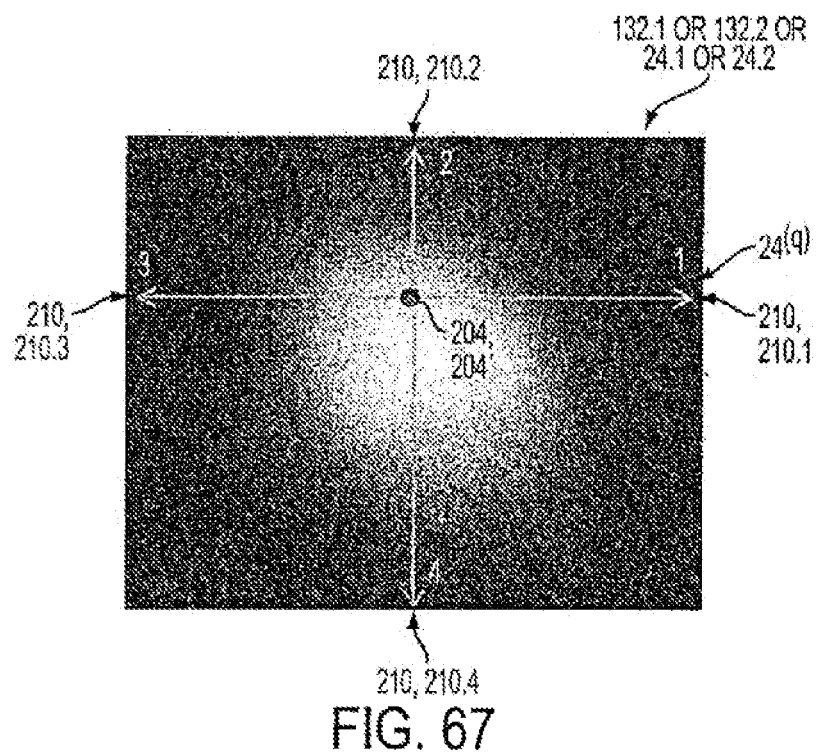
FIG. 67 illustrates the light spot from FIG. 63 upon which is superimposed the starting location from FIG. 66 and four radial search paths emanating therefrom along which the light spot is subsequently analyzed to located the edges thereof.
Figure 68:
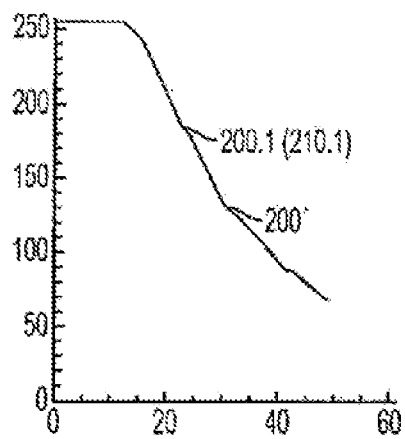
FIG. 68 illustrates a plot of the intensity of the light spot along a first radial search path illustrated in FIG. 67.
Figure 69:
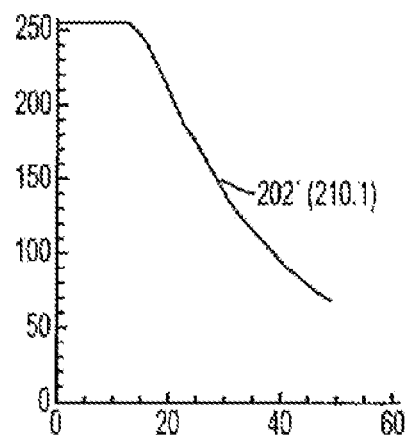
FIG. 69 the results of filtering the image intensity plot illustrated in FIG. 68 using a Savitzky-Golay filtering process.
Figure 70:
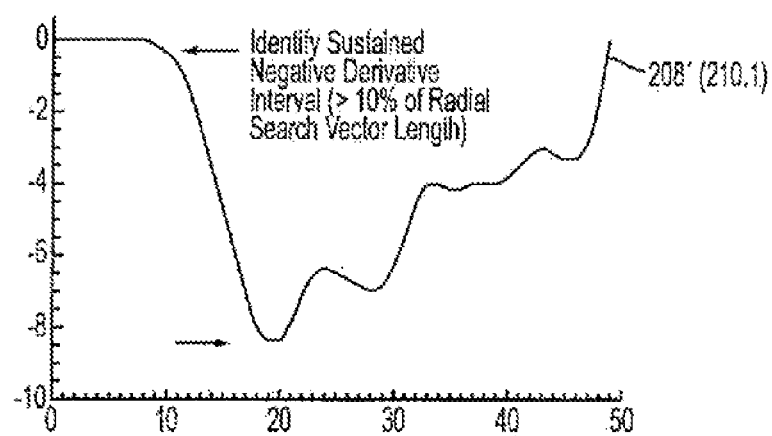
FIG. 70 illustrates the result of spatially differentiating filtered image intensity plot illustrated in FIG. 69, so as to provide for locating an edge of the light spot along the associated radial search path.

Referring to FIG. 61, in accordance with the third sub-process 5000, commencing with step (6102), for the identified region-of-interest 194$^{(q)}$ within each of the left 132.1 and right 132.2 grayscale difference images or left 24.1 and right 24.2 images of an associated stereo image pair, referring also to FIGS. 62 and 63, in step (6104), for every $N^{th}$ row 198 of pixels within the region-of-interest 194$^{(q)}$ in order to find the row 198.1, K, containing a pixel 108 having the greatest amplitude, wherein the amplitude profile 200 of the row 198.1, K, containing a pixel 108 having the greatest amplitude is illustrated in FIG. 64, which, in step (6106), is then filtered with a smoothing filter, for example, a Savitzky-Golay Smoothing Filter, so as to generate a smoothed amplitude profile 202, which is illustrated in FIG. 65. Referring to FIG. 66, the smoothed amplitude profile 202 is then spatially differentiated in step (6108), and the midpoint 204 of a zero amplitude interval 206 is then located on the resulting first spatial derivative profile 208. This midpoint 204 is then located within the region-of-interest 194$^{(q)}$ for use as a central starting point 204 of a radial search process that commences with step (6110) for each of M radial search paths 210, for example, each of which is equi-angularly separated from one another. For example, referring to FIG. 67, four radial search paths 210, 210.1, 210.2, 210.3, 201.4 are identified by numbers 1-4, each of which is separated from one another by ninety degrees. For each radial search paths 210 selected in step (6110), in step (6112) the pixels 108 of the left 132.1 and right 132.2 grayscale difference images or left 24.1 and right 24.2 images within the region-of-interest 194$^{(q)}$ are sampled so as to generate an associated polar amplitude profile 200. For example, FIG. 68 illustrates an associated polar amplitude profile 200, 200.1 of the first radial search path 210, 210.1, for example, which corresponds to a right portion of the amplitude profile 200 illustrated in FIG. 64. Then, in step (6114), the polar amplitude profile 200 is filtered with a smoothing filter, for example, a Savitzky-Golay Smoothing Filter, so as to generate a corresponding smoothed polar amplitude profile 202, for example, which is illustrated in FIG. 69 for the first radial search path 210, 210.1. For example, in one embodiment, for radial search paths 210 along the row 198.1, K containing a pixel 108 having the greatest amplitude, the associated smoothed polar amplitude profile 202' can be extracted from the corresponding smoothed amplitude profile 202 derived in step (6106). Then, in step (6116), the smoothed polar amplitude profile 202 is differentiated, so as to provide for locating the edge of the distinct light spot image 24$^{(q)}$ along the corresponding radial search path 210. For example, FIG. 70 illustrates a polar first spatial derivative profile 208' generated by spatially differentiating the smoothed polar amplitude profile 202' illustrated in FIG. 69 for the first radial search path 210, 210.1. For example, in accordance with one embodiment, for a given polar amplitude profile 200', for example, identified as S and comprising a plurality of elements $S_k$, a relatively large amplitude shift along S is located by first calculating the polar first spatial derivative profile 208', i.e. S', thereof, for example, the central first derivative which is given by:

$$S'_k = \frac{S_{k+1} - S_{k-1}}{2}. \tag{57}$$

Then, in step (6118), the location of an edge point 212 along a given polar amplitude profile 200' is identified from a relatively large change in amplitude thereof with respect to radial distance along the radial search path 210. The polar first spatial derivative profile 208', S', is filtered with a low-pass, zero-phase-shifting filter, for example, a Savitzky-Golay Smoothing Filter, so as to generate the corresponding filtered polar first spatial derivative profile, i.e. S'$_{filt}$', for example, in accordance with the method described in William H. PRESS, Brian P. FLANNERY, Saul A. TEUKOL-SKY and William T. VETTERLING, *NUMERICAL RECIPES IN C: THE ART OF SCIENTIFIC COMPUTING* (ISBN 0-521-43108-5), Cambridge University Press, 1988-1992, pp. 650-655, which is incorporated by reference herein.

More particularly:

$$S'_{filt}(i) = \sum_{n=-n_L}^{n_R} c_n \cdot S'_{i+n}. \tag{58}$$

wherein $n_R$ and $n_L$ are the number of elements of S'$_{filt}$ before and after the location of the filtered value S'$_{filt}(i)$ to be used to calculated the filtered value S'$_{filt}(i)$, and the associated coefficients $c_n$ are given by:

$$c_n = \{(A^T \cdot A)^{-1} \cdot (A^T \cdot e_n)\}_0 = \sum_{m=0}^{M} \{(A^T \cdot A)^{-1}\}_{0m} n^m, \tag{59}$$

wherein M is the desired order of the filter, i.e. the order of an associated underlying polynomial approximating the data, and represents that highest conserved order, and:

$$A_{ij} = i^j \; i = n_L, \ldots, n_R, j = 0, \ldots, M. \tag{60}$$

For example, in one embodiment, the filter order M is set equal to 4, and the symmetric width of the associated moving window is 6, i.e. $n_R$=6 and $n_L$=6, resulting in the following associated filter coefficients from equation (59):

$$c = \{0.04525, -0.08145, -0.05553, 0.04525, 0.16043, 0.24681, 0.27849, 0.24681, 0.16043, 0.04525, -0.05553, -0.08145, 0.04525\} \tag{61}$$

The location of a relatively large amplitude shift along the particular radial search path 210 is then identified as the closest location k to the central starting point 204' (i.e. the smallest value of k) for which the absolute value of the filtered polar first spatial derivative profile, S'$_{filt}$, i.e. S'$_{filt}$(k), exceeds a threshold value, for example, a threshold value of 10, i.e.

$$k_{Edge} = k||S'_{filt}(k)| > 10. \tag{62}$$

This location is found by searching the filtered polar first spatial derivative profile, S'$_{filt}$, radially outwards, for example, beginning with k=0, with increasing values of k, to find the first location k that satisfies equation (62). Generally relatively small changes in amplitude relatively closer to the central starting point 204' than the corresponding edge point 212 are associated with corresponding image structure of the associated distinct light spot image(s) 24$^{(q)}$. The resulting edge index $k_{Edge}$ is then saved and used to identify the corresponding edge point 212. This process is then repeated for each polar amplitude profile 200', S associated with each radial search path 210 so as to define the associated edge profile vector 124". Alternatively, rather than explicitly calculating the first spatial derivative as in equation (57), and then filtering this with the above-described smoothing variant of the above-described Savitzky-Golay Smoothing Filter, the Savitzky-Golay Smoothing Filter may alternatively be configured to generate a smoothed first spatial derivative directly from the data of the polar amplitude profile 200', S, for example, using a parameter value of ld=1 in the algorithm given in the incorporated subject matter from *NUMERICAL RECIPES IN C: THE ART OF SCIENTIFIC COMPUTING*, so as to provide for a convolution of a radial profile with an impulse-response sequence. However, the pre-calculation of the polar first spatial derivative profile 208, S', for example, using equation (57), provides for choosing the associated method, for example, either a central difference as in equation (57), a left difference, a right difference, a second central difference, or some other method. Furthermore, alternatively, some other type of low-pass filter could be used instead of the Savitzky-Golay Smoothing Filter.

Then, if all of the radial search paths 210 have not been searched, steps (6110) through (6118) are repeated for the next radial search path 210 to find the next associated edge point 212. Following step (6118), after each edge point 212 has been located for each radial search path 210, then, in step (6120), the centroid location 192 of the edge points 212 is calculated so as to provide the location of the associated distinct light spot image(s) $24^{(q)}$ within the selected region-of-interest $194^{(q)}$ for the left 132.1 or right 132.2 grayscale difference image or left 24.1 or right 24.2 image of an associated stereo image pair as selected from step (6102). Steps (6102) through (6120) are repeated for both left and right grayscale difference images 132.1, 132.2 or images 24.1, 24.2 are processed, after which, in step (6122), both centroid locations 192 for the selected region-of-interest $194^{(q)}$ in both left and right grayscale difference images 132.1, 132.2 or images 24.1, 24.2, after which, in step (6122), the resulting centroid locations 192 are returned.

Referring to FIGS. 71*a-b*, 72 and 73*a-b*, the light projection system 18, 18.2 of the rearward-looking vehicular path sensing system 10.2 comprises a plurality of laser light sources 50' generally disposed within a transverse region 214 just below the roof line 216, for example, above the rear glass 218 of the illustrated SUV-style vehicle 12', adapted to project a plurality of associated beams of light 52 and thereby generate a corresponding plurality of distinct light spots 30 in a corresponding structured light pattern 16, 16.2, for example, organized as four longitudinally-separated rows $220^{(1)}$, $220^{(2)}$, $220^{(3)}$, $220^{(4)}$ of distinct light spots 30, each row $220^{(1)}$, $220^{(2)}$, $220^{(3)}$, $220^{(4)}$ containing a plurality of distinct light spots 30 laterally distributed across the roadway surface 32', wherein FIGS. 71*b* and 73*b* illustrate corresponding images 24 of the associated structured light pattern 16, 16.2, for example, as acquired with an associated imaging system 34. For example, referring to FIG. 71*b*, in one embodiment, the light projection system 18, 18.2 comprises thirty-six laser diodes 50" organized as four sets of nine, each set providing for generating one of the four longitudinally-separated rows $220^{(1)}$, $220^{(2)}$, $220^{(3)}$, $220^{(4)}$ of distinct light spots 30 with 1.5 meters of down-range spacing 222 and 0.5 meters of cross-range spacing 224 when the vehicle 12 is level on and relative to a flat roadway surface 32', for example, as illustrated in FIGS. 71*a-b* and 72. Referring to FIGS. 73*a-b*, when an object 20 is encountered on the roadway surface 32' so as to become illuminated by one or more of the beams of light 52, which in turn causes the position of the corresponding distinct light spot 30 to become upwardly displaced in the resulting image 24 relative to the corresponding position thereof had the object 20 not been present. Accordingly, as described hereinabove, this upward vertical displacement of the distinct light spot image(s) $24^{(q)}$ associated with an object extending above the roadway surface 32', and the extent thereof, provides for either qualitatively detecting or quantitatively sensing the object 20, so as to provide for responding to the detection thereof. One example of a qualitative detection process would be the determination of whether a sufficient number of distinct light spot image(s) $24^{(q)}$ are displaced by a sufficient amount, i.e. so that corresponding associated thresholds are exceeded. Alternatively, as one example, a quantitative sensing process would provide for determining a size of an object responsive to the displacement of the distinct light spot image(s) $24^{(q)}$ over time, in conjunction with monitoring the corresponding speed or relative displacement of the vehicle 12.

Figures 74A, 74B, 74C:
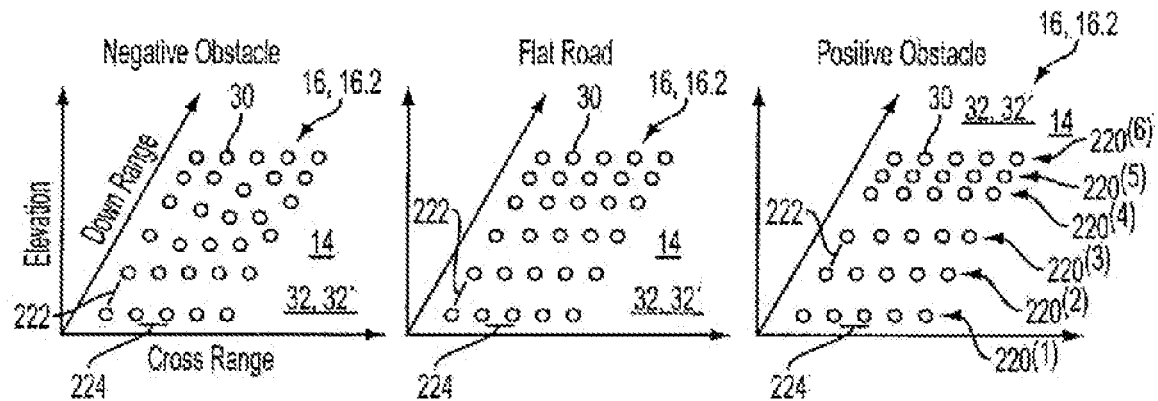
FIG. 74a illustrates an isometric image of a structured light pattern projected by a vehicular path sensing system onto a flat roadway surface by an associated light projection system and viewed by an associated imaging subsystem.
FIG. 74b illustrates an isometric image of the structured light pattern projected by the associated light projection system of the vehicular path sensing system as in FIG. 74a, but onto a roadway surface with a negative path feature, and viewed by the associated imaging subsystem.
FIG. 74c illustrates an isometric image of the structured light pattern projected by the associated light projection system of the vehicular path sensing system as in FIGS. 74a and 74b, but onto a roadway surface with a positive path feature, and viewed by the associated imaging subsystem.

FIGS. 74*a-c*, each illustrate a structured light pattern 16, 16.2 comprising six longitudinally-separated rows $220^{(1)}$, $220^{(2)}$, $220^{(3)}$, $220^{(4)}$, $220^{(5)}$, $220^{(6)}$ of five distinct light spots 30, for a flat roadway surface 32', wherein the initial structured light pattern 16, 16.2 of the distinct light spots 30 on a flat roadway surface 32' is illustrated in FIG. 74*a*. Referring to FIG. 74*b*, the distinct light spot image(s) $24^{(q)}$ of distinct light spots 30 illuminating a dip in the illuminated path 14 are displaced downward in the image 24 relative to the corresponding distinct light spot image(s) $24^{(q)}$ for the flat roadway surface 32' illustrated in FIG. 74*b*, whereas referring to FIG. 74*c*, the distinct light spot image(s) $24^{(q)}$ of distinct light spots 30 illuminating a bump on the illuminated path 14, or an object 20 thereupon, are displaced upward in the image 24 relative to the corresponding distinct light spot image(s) $24^{(q)}$ for the flat roadway surface 32' illustrated in FIG. 74*b*.

The structured light pattern 16 was tested, and the visibility thereof verified, under various conditions of ambient lighting conditions, roadway surface texture and associated projection distances, using a relatively camera having 1024× 768 pixel color resolution, a 75-degree horizontal field of view (FOV) and a 60i frame rate (i.e. 60 frames per second interlaced), using automatic exposure control, wherein the frames were captured in JPEG format with a software frame-grabber.

The imaging system 34 of the rearward-looking vehicular path sensing system 10.2 illustrated in FIGS. 1-2, 71*a-b*, 72 and 73*a-b* incorporates a single camera 38, for example located below the rear glass 218, for example, either proximate to or incorporated in the license plate illumination assembly 226. The single camera 38 provides for a monovision imaging system 34', the image 24 from which, absent the associated light projection system 18, 18.2 and associated structured light pattern 16, 16.2, could otherwise be subject to ambiguities resulting from the combination of the distance to and size of an object being imaged. For example, an image 24 of relatively close, relatively small objects can appear to be similar to a corresponding image 24 of a corresponding similarly-shaped (i.e. having a similar two-dimensional profile) relatively far, relatively large object.

In one set of embodiments, the single camera 38 is shared by or with an OEM-provided production backup-imaging system, the latter of which typically incorporates a color camera. For example, sharing the camera 38 of an otherwise OEM-provided production backup-imaging system provides for simplifying the integration of the rearward-looking vehicular path sensing system 10.2 into the body and electrical system of the vehicle 12, wherein the camera 38 is then aligned and calibrated in accordance with the requirements of the associated OEM-provided production backup-imaging system. For example, in one set of embodiments, the camera 38 has a field of view (FOV) in the range of 135° to 180°. For example, the camera 38 may be constructed from any photoelectric material sensitive to the spectrum of visible light generally from 400 to 700 nanometers. The associated integrated circuit architecture may be either CCD or CMOS. The associated color filter array of the color camera 38 may be any Bayer-like pattern using the primary colors (Red, Green, Blue, and White) or an alternative pattern using the secondary colors (Cyan, Yellow, Green, and Magenta).

The transmission of the image 24 from the camera 38 to the image processing system 74 is adapted to be substantially noise-free so as to provide for processing a relatively high-quality image 24. For example, experiments comparing the analog NTSC (National Television Standards Committee) and digital LVDS (Low Voltage Differential Signaling) formats have shown that analog NTSC is susceptible to voltage fluctuations while digital LVDS is largely immune to voltage fluctuations. Voltage fluctuations commonly occur in the automotive electrical systems and degrade analog NTSC image properties by either blurring edges, corrupting colors, or inducing false/ghost objects.

Figures 75A, 75B:
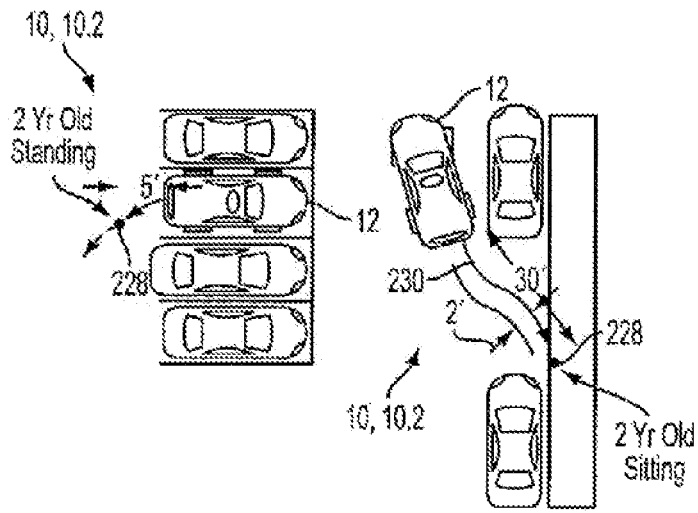
FIG. 75a illustrates a first ACAT (Advanced Collision Avoidance Technologies) scenario of a vehicle backing out of a parking spot in a parking lot, with a two-year old child standing in the prospective path of the vehicle.
FIG. 75b illustrates a second ACAT scenario of a vehicle parallel parking into a parking spot between two other vehicles, with a two-year old standing child on the side of the parking spot.
Figures 75C, 75D:
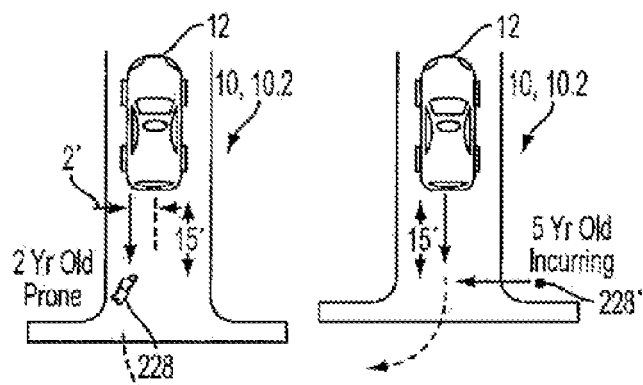
FIG. 75c illustrates a third ACAT scenario of a vehicle backing out of a driveway, with a two-year old child lying prone along the prospective path of the vehicle.
FIG. 75d illustrates a fourth ACAT scenario of a vehicle backing out of a driveway, with a five-year old child located running from the side of the driveway across the prospective path of the vehicle.

The rearward-looking vehicular path sensing system 10.2 can provide for assisting the driver to safely operate the vehicle 12 during a variety of backup maneuvers. For example, referring to FIGS. 75a-d, a variety of prospective child back-over scenarios in accordance with ACAT (Advanced Collision Avoidance Technologies) have been defined for which either a driver of the vehicle 12 would need to be warned, or for which the vehicle 12 might otherwise be automatically braked if the driver does not otherwise take evasive action. For example, FIG. 75a illustrates a first ACAT scenario of a vehicle 12 backing out of a parking spot with a two-year old child 228 standing 5 feet behind the vehicle 12 in the center of a prospective curved path of the backing vehicle 12. FIG. 75b illustrates a second ACAT scenario of a vehicle 12 parallel parking into a parking spot between two other vehicles, with a standing two-year old child 228 on the side of the parking spot about 30 feet from the right-rear corner of the vehicle 12, 2 feet to the right of the prospective centerline path 230 of the vehicle 12. FIG. 75c illustrates a third ACAT scenario of a vehicle 12 backing out of a driveway, with a two-year old child 228 lying prone 15 feet behind the vehicle 12, 2 feet to the left of the prospective centerline path 230 of the vehicle 12. FIG. 75d illustrates a fourth ACAT scenario of a vehicle 12 backing out of a driveway with a five-year old child 228' running from the side of the driveway along a path 15 feet behind the vehicle 12 that is transverse to the prospective path of the vehicle 12. Furthermore, the rearward-looking vehicular path sensing system 10.2 can provide for warning of cross-traffic, curbs, barriers or other objects before or during prospective backup maneuvers, either out of or into a parking location. Furthermore, the rearward-looking vehicular path sensing system 10.2 can provide for warning the driver while the vehicle 12 is driven forward, for example, of an impending collision by a following vehicle.

Figure 76:
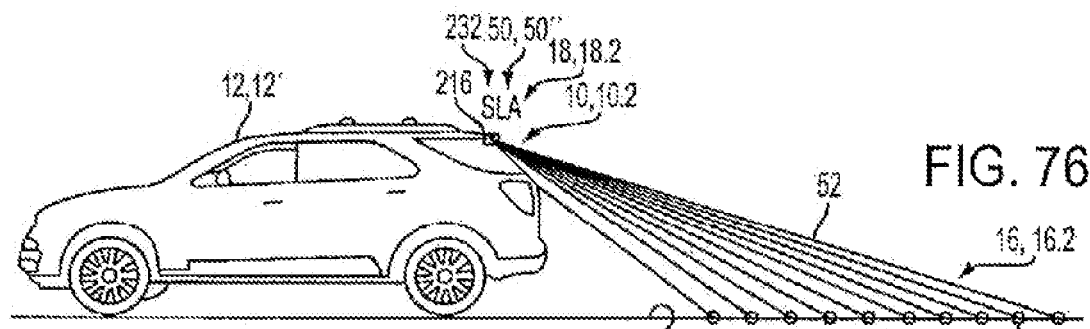
FIG. 76 illustrates a vehicle with a first aspect of a rearward-looking vehicular path sensing system projecting a structured light pattern rearwards from a structured light array comprising a plurality of individual laser diodes.
Figure 77A:
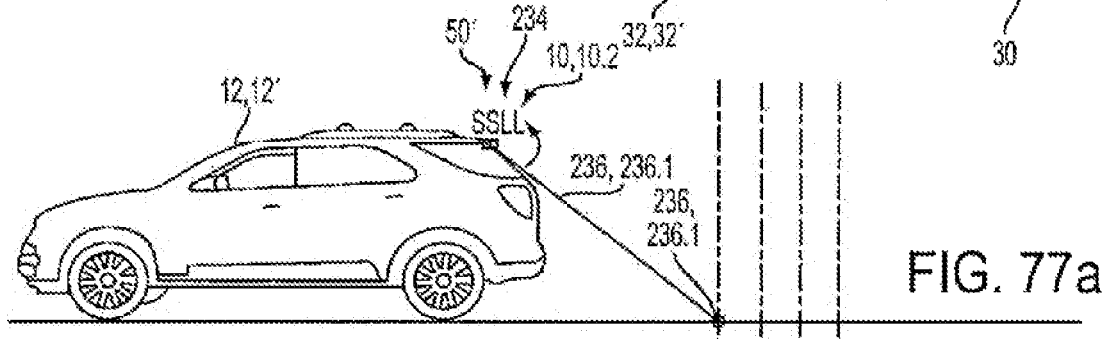
FIGS. 77a-d illustrates a vehicle with a second aspect of a rearward-looking vehicular path sensing system projecting scanned-structured light lines at respectively farther distances rearward from the vehicle.
Figure 77B:
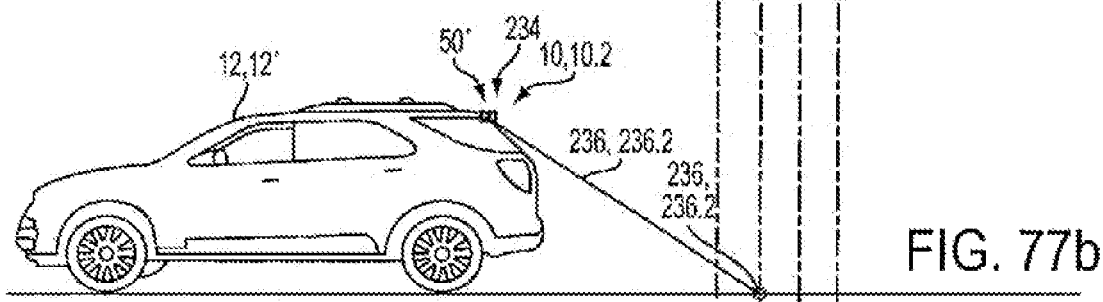
Figure 77C:
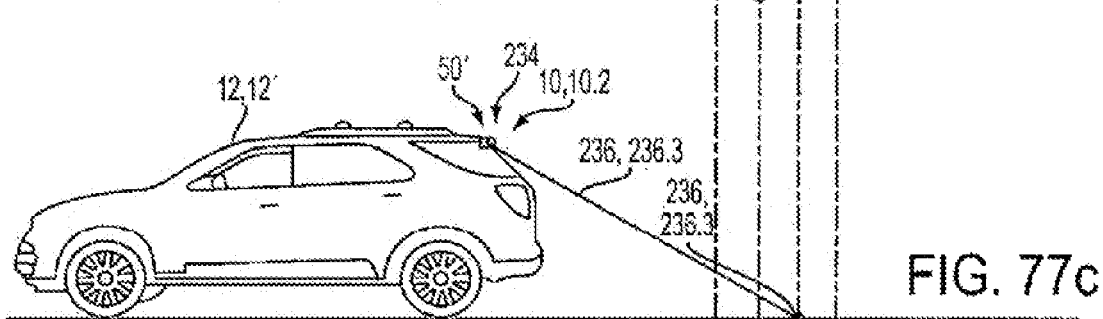
Figure 77D:
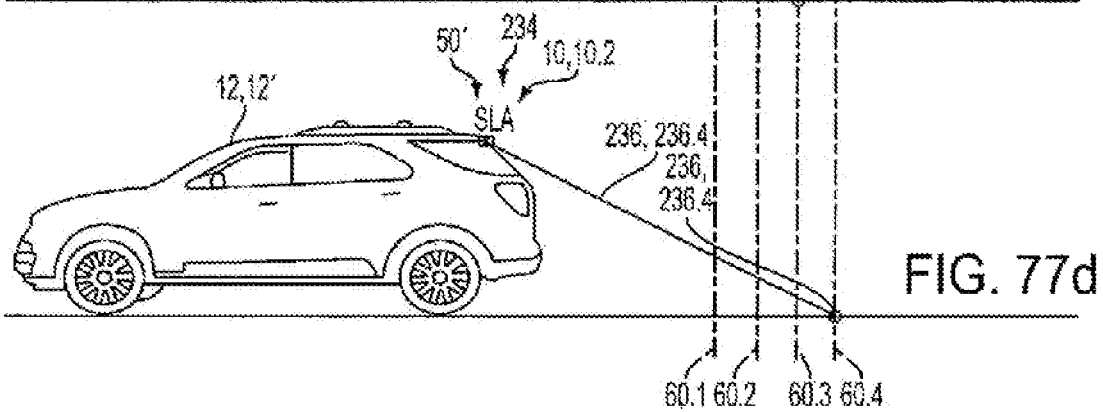

Referring to FIG. 76, in accordance with a first aspect, the light projection system 18, 18.2 of a rearward-looking vehicular path sensing system 10.2 comprises a structured light array (SLA) 232 comprising a plurality of individual laser diode 50" light sources 50, each of which generates a corresponding beam of light 52 projected downwards at associated elevation and azimuth angles from within the transverse region 214 below the roof line 216 at the rear of the vehicle 12', so as to project onto the roadway surface 32' an associated structured light pattern 16, 16.2 comprising a plurality of distinct light spots 30.

As with the forward-looking vehicular path sensing system 10.1, the light sources 50 could either be transversely distributed within the transverse region 214 so that the associated beams of light 52 are each along a corresponding plane 54 that is both substantially parallel to the roll axis 44 of the vehicle 12 and substantially parallel to the yaw axis 56 (i.e. vertical axis) of the vehicle 12, and substantially perpendicular to the pitch axis 58 (i.e. transverse horizontal axis) of the vehicle 12, or one or more beams of light 52 could be generated from a relatively narrow transverse region so as to be oriented at particular associated elevation and azimuth angles relative to the roll axis 44 of the vehicle 12, so as to provide for a relatively more compact light projection system 18, 18.2. Furthermore, one or more of the associated distinct light spots 30 could be generated from a common light source 50, either using one or more associated beam splitters to generated the separate associated beams of light 52, or scanning an associated beam of light 52, wherein one or more beams of light 52 could be scanned.

Referring to FIGS. 77a-d, in accordance with a second aspect, the light projection system 18, 18.2 of a rearward-looking vehicular path sensing system 10.2 comprises a scanning light line generator 234 comprising a scanned laser light source 50' that projects scanned-structured light lines (SSLL) 236 at various longitudinal locations 60 rearward from the vehicle 12, for example, beginning with a first scanned structured light line 236.1 at a relatively closest longitudinal location 60.1 and then successively generating second 236.2 and subsequent 236.3, 236.4 scanned-structured light lines at successively farther longitudinal locations 60.2, 60.3, 60.4. The scanned-structured light lines (SSLL) 236 could comprise either a continuous line of light, or a plurality of distinct light spots 30 or light line segments along the line.

Figure 78A:
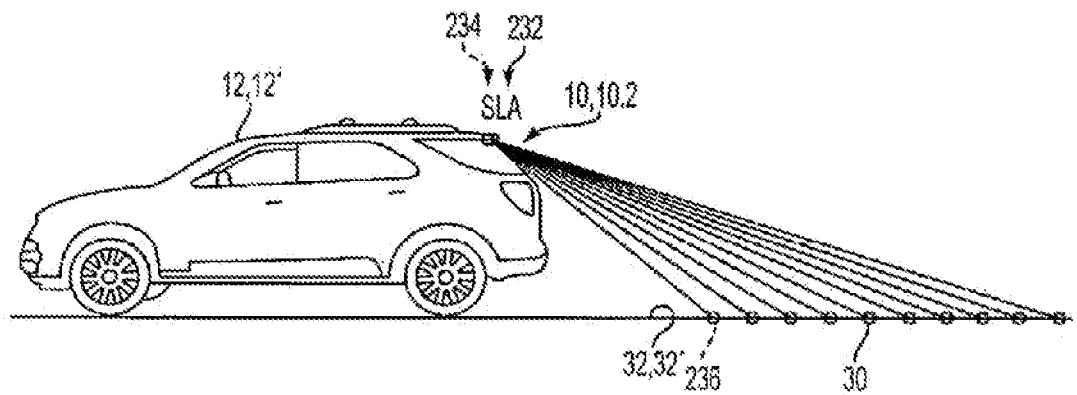
FIG. 78a illustrates a vehicle with a first or second aspect of a rearward-looking vehicular path sensing system projecting a structured light pattern rearwards from a structured light array onto a level roadway surface.
Figure 78B:
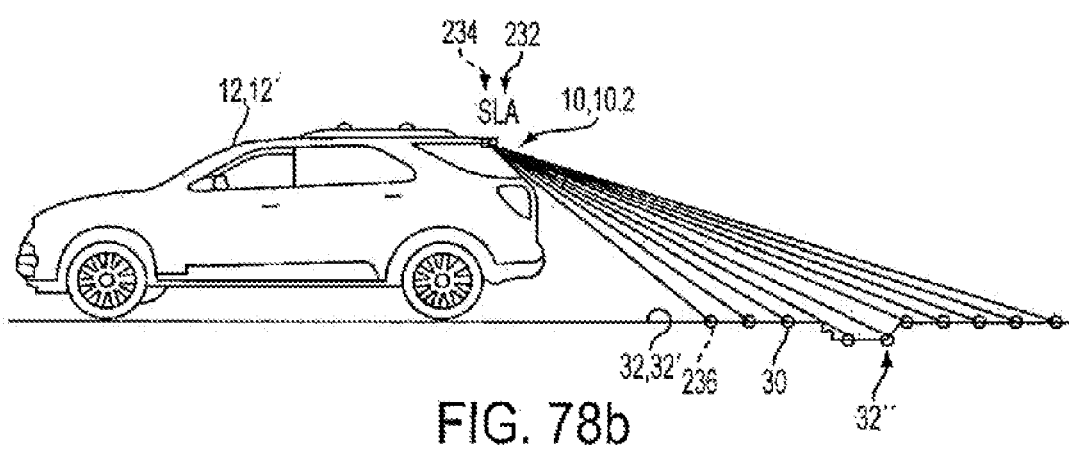
FIG. 78b illustrates a vehicle with a first or second aspect of a rearward-looking vehicular path sensing system projecting a structured light pattern rearwards from a structured light array onto a roadway surface with a depression therein.
Figure 79:
FIG. 79 illustrates halftone image of a visual scene rearward of a vehicle operating with a first aspect of a rearward-looking vehicular path sensing system projecting a structured light pattern rearwards from a structured light array comprising a plurality of individual laser diodes.

Referring to FIGS. 78a and 78b, either the plurality of distinct light spots 30 generated by a structured light array 232, or the plurality of scanned-structured light lines 236 generated by the scanning light line generator 234, follow the contour of the roadway surface 32', and provide for detecting either objects 20 on, or depression 32" in, a roadway surface 32', from changes in the locations of the images 24 of the distinct light spots 30 relative to corresponding locations for a flat roadway surface 32'. For example, FIG. 78a illustrates a side-view elevation profile of a plurality of either distinct light spots 30 or scanned-structured light lines 236 on a flat roadway surface 32', whereas FIG. 78b illustrates the effect thereon of a depression 32" in the roadway surface 32'. For example, FIGS. 79 and 80 respectively illustrate half-tone images of a visual scene 128 which include structured light patterns 16, 16.2 comprising a plurality of distinct light spots 30 and a plurality of scanned-structured light lines 236, respectively.

For a light projection system 18, 18.2 generating a plurality of distinct light spots 30, in accordance with one aspect, the elevation Y of the surface 32 of the path 14, or an object 20 thereupon, may be ascertained from the relative row position(s) $110^{(q)}$ of the distinct light spot image(s) $24^{(q)}$ relative to their corresponding nominal row position(s) $110'^{(q)}$, for example, by either relating the difference between a given row position $110^{(q)}$ and a corresponding nominal row position $110'^{(q)}$ to a corresponding elevation Y of the corresponding distinct light spot $30^{(q)}$ relative to a flat roadway surface 32', or by processing the difference between a given row position $110^{(q)}$ and a corresponding nominal row position $110'^{(q)}$ directly with respect to an associated count of pixels 108. For example, the difference may be compared with a corresponding threshold in either real (for example, with respect to distance or angle) or image space.

Figure 81:
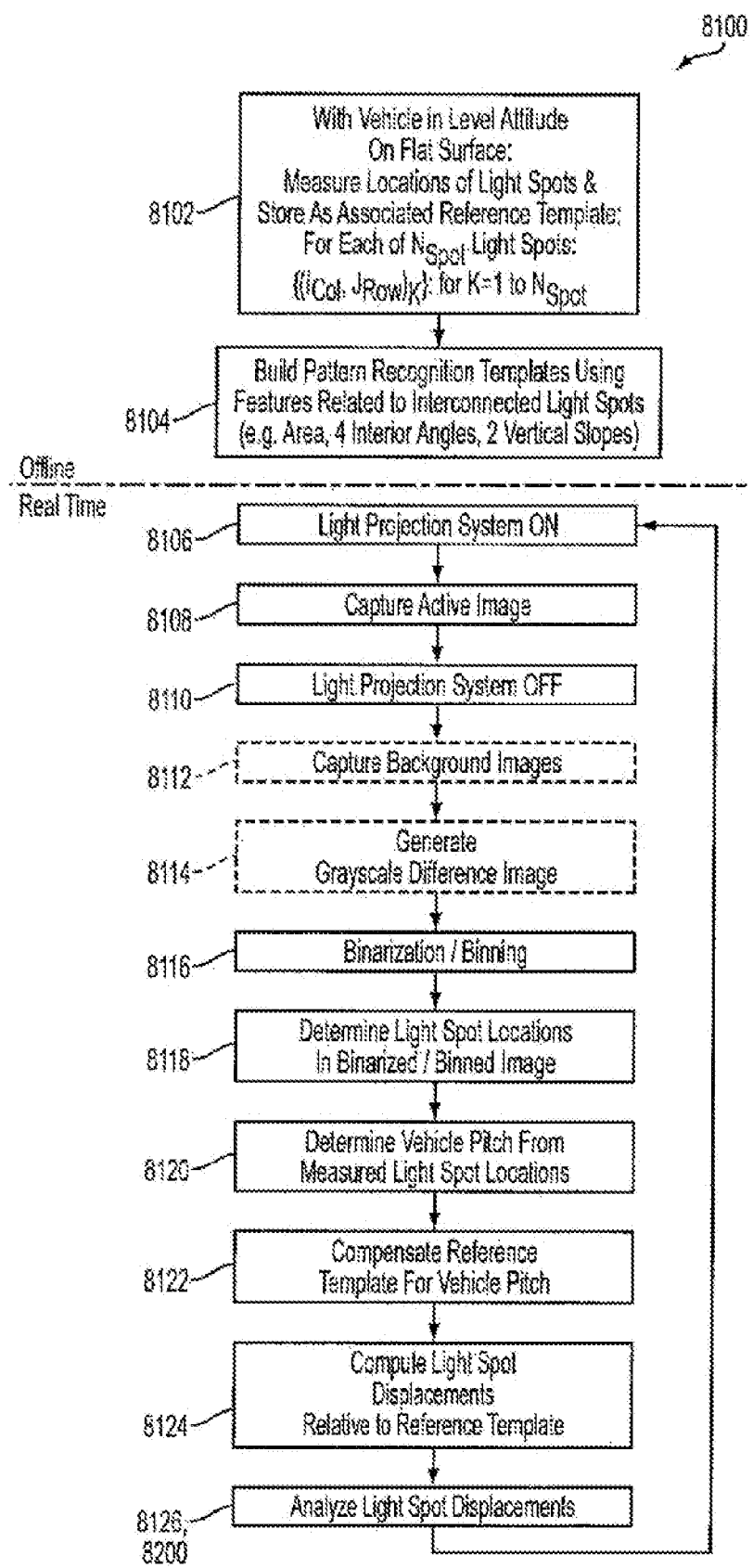
FIG. 81 illustrates a flow chart of a process of a vehicular path sensing system incorporating an associated mono-vision system that provides for detecting objects along the path of a vehicle.
Figure 82:
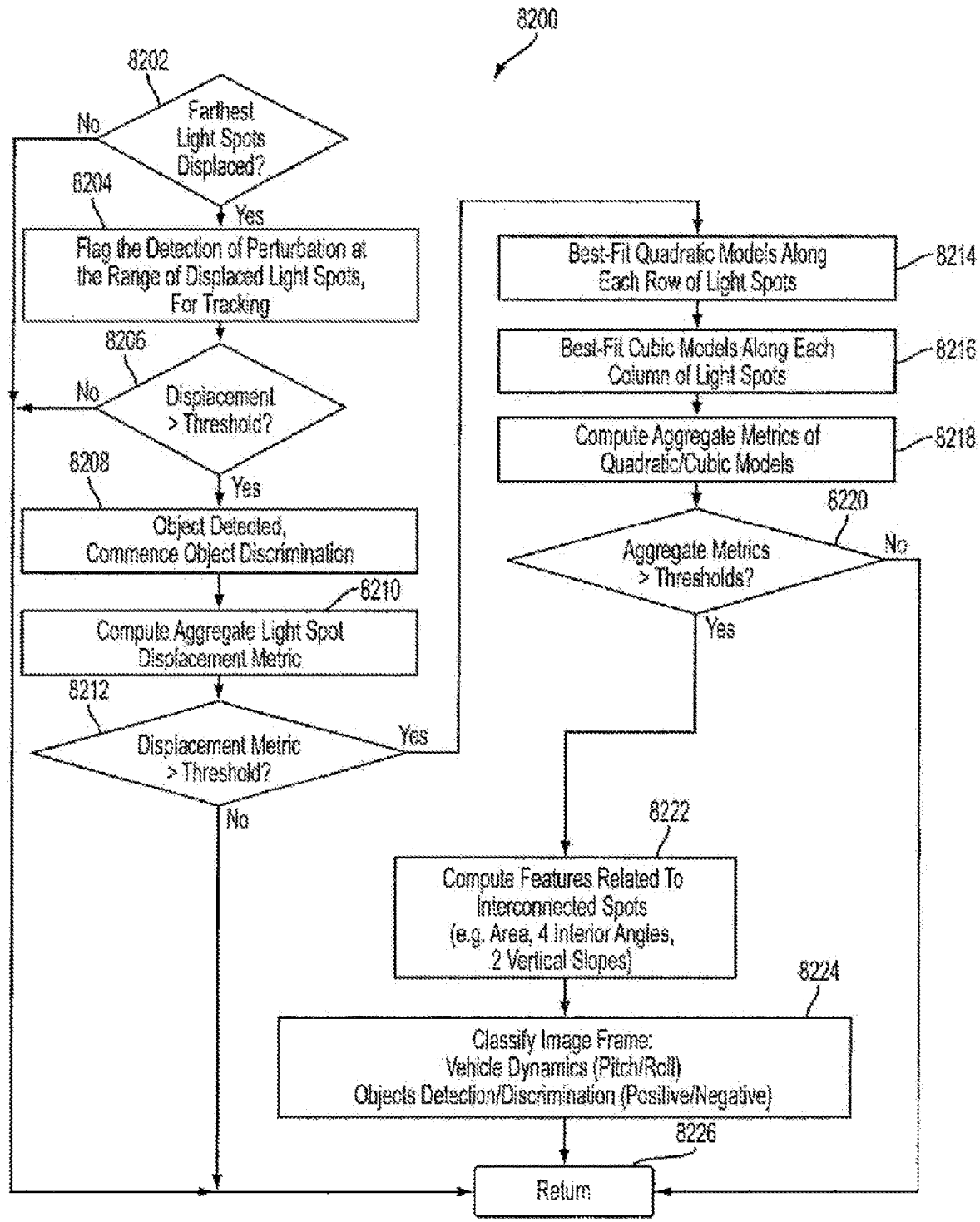
FIG. 82 illustrates a flow chart of a sub-process for analyzing light-spot displacements that are detected in the process illustrated in FIG. 81, so as to provide for detecting therefrom objects along the path of the vehicle.

Referring to FIGS. 81 and 82, in accordance with an associated object detection process 8100, a second aspect of the vehicular path sensing system 10 provides for sensing an elevation Y of the surface 32 of the path 14, or an object 20 thereupon, in image space, by comparing the location in image space of distinct light spot image(s) $24^{(q)}$ with a corresponding nominal location(s) of corresponding nominal distinct light spot image(s) $24'^{(q)}$ imaged during a calibration of the vehicular path sensing systems 10 on a surface 32 of know geometry, for example, a flat roadway surface 32'. For example, in steps (8102) and (8104), the column $I_{COL}'$, $112'^{(q)}$ and row $J_{ROW}'$, $110'^{(q)}$ calibration coordinates of each distinct light spot $30^{(q)}$ are determined with the vehicle 12 on a flat roadway surface 32' and saved as stored reference information 26, i.e. a corresponding calibration, in the associated image processing system 74 as an associated reference template 240, for example, as illustrated in FIG. 83b. For example, this calibration can be accomplished either after final assembly when the vehicle 12 is manufactured, or during subsequent servicing, by operating the light projection system 18 with the vehicle 12 on a flat surface 32 and recording the resulting image 24 of the associated structured light pattern 16. Then, during operation of the vehicular path sensing systems 10, the actual column $I_{COL}$, $112^{(q)}$ or row $J_{ROW}$, $110^{(q)}$ coordinates of each distinct light spot $30^{(q)}$ are compared with the corresponding column $I_{COL}'$, $112'^{(q)}$ or row $J_{ROW}'$, $110'^{(q)}$ calibration coordinates in order to determine the elevation Y of the surface 32 of the path 14, for example, so as to provide for detecting an object 20 thereupon. For example, a difference between the actual row coordinate $J_{ROW}$ $110^{(q)}$ and the corresponding row calibration coordinate $J_{ROW}'$, $110'^{(q)}$ provides for a measure of the elevation Y of the surface 32 of the path 14, or of an object 20 thereupon, relative to the flat roadway surface 32' upon which the vehicular path sensing systems 10 was calibrated. For example, a threshold $J_{ROW}^{Threshold(q)}$ in row pixel space may be used to detect whether the corresponding distinct light spot $30^{(q)}$ is above a corresponding elevation Y above the roadway surface 32'.

Figure 83A:
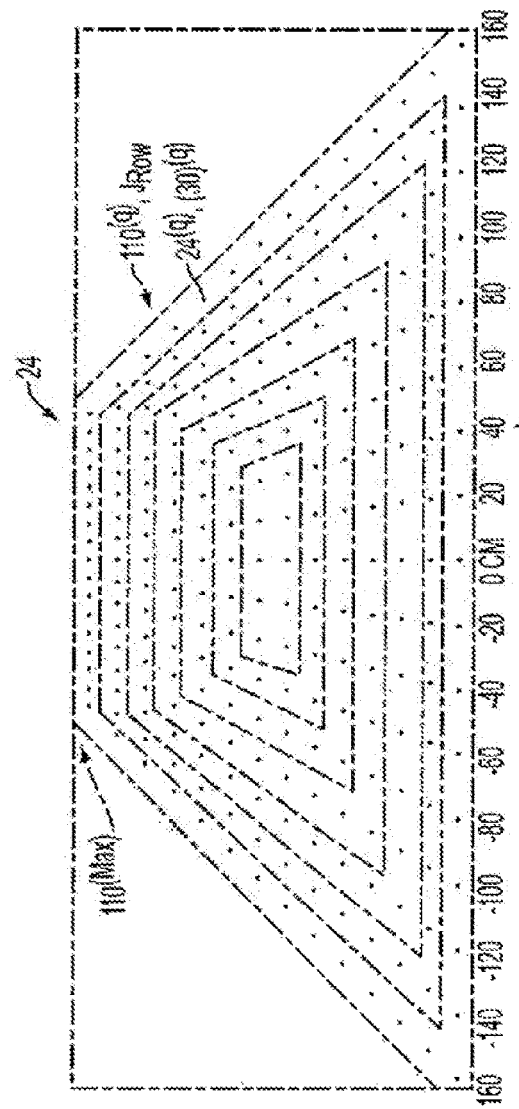
FIG. 83a illustrates an image of a plurality of distinct light spots of a structured light pattern as images by a mono-vision system of a rearward-looking vehicular path sensing system, further illustrating boundaries between associated nesting rings of distinct light spots developed during associated image processing.
Figure 83B:
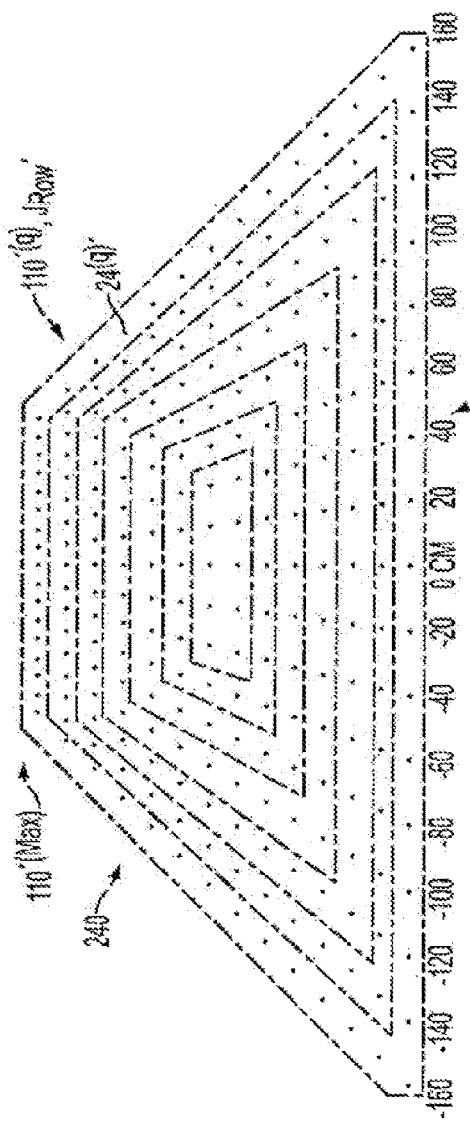
FIG. 83b illustrates a reference template image of a structured light pattern corresponding to that of FIG. 83a, but with the vehicle on a flat roadway surface.

The real-time operation of the second aspect of the vehicular path sensing system 10 commences with steps (8106) through (8116) which correspond to steps (1902) through (1912) for the first process 1900 illustrated in FIG. 19, but for a mono-image rather than a stereo image, for example, so as to either use the active image 24 directly if sufficient contrast as described hereinabove, or to generate a grayscale difference image 132, which, as in step (8116), is either binarized or binned so as to generate a binarized image 134, for example, as illustrated in FIG. 83a. Then, in step (8118) the locations of the distinct light spot images $24^{(q)}$ in the binarized image 134 is determined, and in step (8120), the vehicle pitch angle θ is determined therefrom as described hereinabove in accordance with FIGS. 47a-c, 48 and 49, but using a priori down-range coordinates $Z_{World}$ of the distinct light spots $30^{(q)}$ associated with the corresponding distinct light spot images $24^{(q)}$ for those distinct light spot images $24^{(q)}$ that are not substantially displaced relative to the associated reference template 240, for example, for distinct light spot images $24^{(q)}$ corresponding to distinct light spots $30^{(q)}$ that are relatively close to the vehicle 12 that have not yet been displaced by an object 20 on the roadway surface 32'.

Alternatively, the location of the distinct light spot images $24^{(q)}$ can be determined in accordance with steps (5302) through (5326) of the second process 5300 and associated sub-processes 5400 and 5800 in cooperation with sub-processes 5900, 6000 or 6100, but for a single binarized image 134, instead of a pair of left 134.1 and right 134.2 binarized images.

Then, in step (8122), the reference template 240 is compensated to account for the vehicle pitch angle θ, i.e. the locations of the nominal distinct light spot image(s) $24'^{(q)}$ in the reference template 240 are adjusted to account for the vehicle pitch angle θ, after which, in step (8124), the displacements of the distinct light spot images $24^{(q)}$ in the binarized image 134 relative to the corresponding nominal distinct light spot image(s) $24'^{(q)}$ in the reference template 240 are computed, which are then analyzed in step (8126) by an associated light spot displacement analysis process 8200 illustrated in FIG. 82.

Referring to FIG. 82, the light spot displacement analysis process 8200 commences with step (8202), wherein if the maximum relative displacement of the distinct light spot images $24^{(q)}$ in the farthest row $110^{(MAX)}$ of the binarized image 134 of the structured light pattern 16, 16.2 relative to the corresponding nominal distinct light spot image(s) $24'^{(q)}$ of the farthest row $110'^{(MAX)}$ of the reference template 240 does not exceed a threshold, then an object 20 has not been detected, so that the light spot displacement analysis process 8200 proceeds to step (8226) which returns to the associated object detection process 8100, which then repeats steps (8106)-(8126) thereof so as to acquire and process another image 24. The rationale for step (8202) is that as the vehicle 12 backs up, any disturbance to the associated roadway surface 32' will first affect the portion of the structured light pattern 16, 16.2 relatively farthest from the vehicle 12 before affecting the portions of the structured light pattern 16, 16.2 relatively closer to the vehicle 12. Accordingly, if the farthest row $110^{(MAX)}$ of the structured light pattern 16, 16.2 has not been disturbed, then if the vehicle 12 is backing up initially on a relatively undisturbed roadway surface 32', then the remaining relatively closer portions of the structured light pattern 16, 16.2 will also not be disturbed.

Otherwise, from step (8202), if the distinct light spot image(s) $24^{(q)}$ of the relatively farthest row $110^{(MAX)}$ of the binarized image 134 are sufficiently displaced relative to the corresponding nominal distinct light spot image(s) $24'^{(q)}$ of the farthest row $110'^{(MAX)}$ of the reference template 240, then in step (8204) the nominal down-range coordinate $Z_c$ of the farthest row $110'^{(MAX)}$ of the reference template 240, which is assumed to be the down-range coordinate $Z_c$ of the farthest row $110^{(MAX)}$ of the binarized image 134, is flagged as a possible location of an object 20 to be detected and tracked. Then, in step (8206), if the maximum relative displacement of the distinct light spot images $24^{(q)}$ of the relatively farthest row $110^{(MAX)}$ of the binarized image 134 relative to the corresponding nominal distinct light spot image(s) $24'^{(q)}$ of the farthest row $110'^{(MAX)}$ of the reference template 240 is not greater than a threshold, indicating the that the elevation of the prospective object 20 is less than a threshold, then the light spot displacement analysis process 8200 proceeds to step (8226) which then returns to the object detection process 8100 as described hereinabove. The relative displacement in image space 114 can be related back to a corresponding elevation coordinate $Y_{World}$ using an a priori associated down-range coordinate $Z_{World}$ for the farthest row $110^{(MAX)}$ of the reference template 240 as determined during the above-described calibration process of steps (8102) and (8104) assuming the vehicle 12 is level, i.e. θ=0, which is typical during backup maneuvers. If from step (8206) the displacement exceeds the threshold, then, in step (8208), an object 20 is assumed to have been detected, and an associated object discrimination process is commenced with step (8210), wherein an aggregate light spot displacement metric A is calculated, for example, given by:

$$\Delta = \sum_{k=1}^{N_{Spot}} \sqrt{\left(I_{COL}^{ref}(k) - I_{COL}^{spot}(k)\right)^2 + \left(J_{ROW}^{ref}(k) - J_{ROW}^{spot}(k)\right)^2} \quad (63)$$

which is the sum of all relative displacements of the distinct light spot image(s) $24^{(q)}$ of the binarized image 134 relative to the corresponding nominal distinct light spot image(s) $24'^{(q)}$ of the reference template 240, for example, with each relative displacement given by the corresponding Euclidian distance in image space 114 between each distinct light spot image $24^{(q)}$ and the corresponding nominal distinct light spot image $24'^{(q)}$. Then, in step (8212), if the aggregate light spot displacement metric does not exceed a threshold, then and object 20 of sufficient size is assumed to not have been detected, and the light spot displacement analysis process 8200 proceeds to step (8226) which then returns to the object detection process 8100 as described hereinabove.

Figure 84:
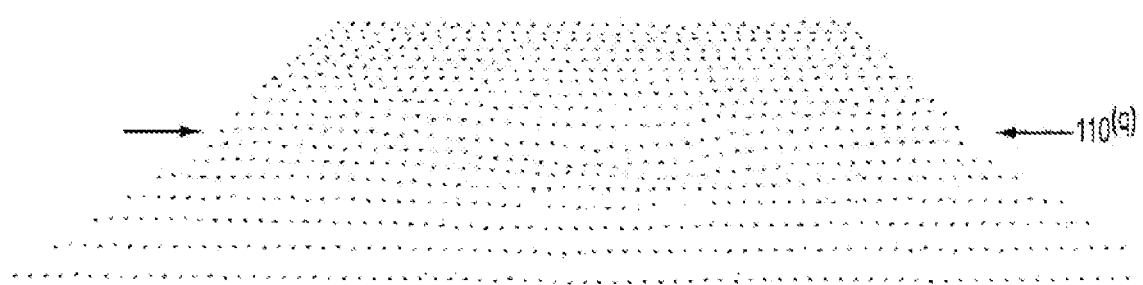
FIG. 84 illustrates a selection of a row of light spots that are to be modeled with a best-fit polynomial model in accordance with the sub-process illustrated in FIG. 82.
Figure 85:
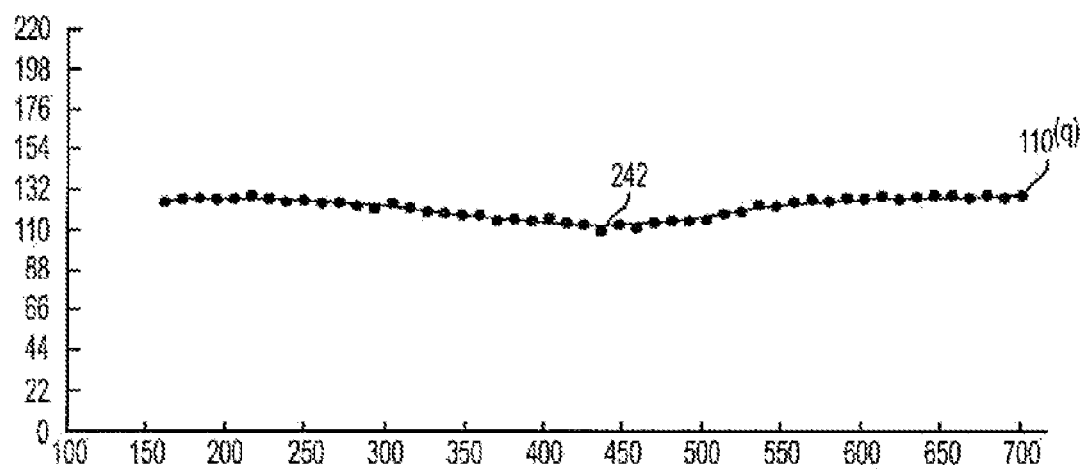
FIG. 85 illustrates a best-fit polynomial model of the row of light spots selected in FIG. 84.

Otherwise, from step (8212), if the aggregate light spot displacement metric exceeds the threshold, then, referring also to FIGS. 84-85, in step (8214), a each row $J_{ROW}$, $110^{(q)}$ of distinct light spot images $24^{(q)}$ is modeled with a best-fit quadratic model 242, beginning from the row $J_{ROW}$, $110^{(1)}$ of distinct light spot images $24^{(q)}$ closest to the vehicle 12, and proceeding outwards to the farthest row $110^{(MAX)}$ of distinct light spot images $24^{(q)}$. Then in step (8216), each column $I_{COL}$, 112 of distinct light spot images $24^{(q)}$ is similarly modeled with a best-fit cubic model 244, beginning with the outward columns $I_{COL}$, and proceeding therefrom laterally inwards. Then, in step (8218), a set of aggregate metrics are computed for each of the best fit quadratic model 242. The aggregate metrics for each fitted model provide a measure of goodness-of-fit of the model to the data. Accordingly, an aggregate metric in excess of a threshold is indicative of a displacement of the distinct light spot images $24^{(q)}$ that cannot be accurately modeled with a best-fit quadratic model 242 that would inherently be relatively smooth, as would result from a disturbance to the structured light pattern 16, 16.2 that could be indicative of an object 20 on, or other disturbance to, the roadway surface 32'. For example, a object 20 on the roadway surface 32' would cause the associated distinct light spot images $24^{(q)}$ to be substantially higher in image space 114 than the corresponding best-fit quadratic model 242 at the corresponding column $k_m$, location, whereas as substantial depression in the roadway surface 32' would cause the associated distinct light spot images $24^{(q)}$ to be substantially lower in image space 114 than the corresponding best-fit quadratic model 242 at the corresponding column $I_{COL}$ location. For example, in one set of embodiments, separate aggregate metrics $\Delta+$, $\Delta-$ are respectively computed as follows, so as to provide for separately accounting for substantial positive and negative elevations of the path 14, respectively:

$$BFP(I_{COL}) = a_0 + a_1 \cdot I_{COL} + a_2 \cdot I_{COL}^2 + \ldots + a_n \cdot I_{COL}^n \quad (64)$$

$$\Delta^+ = \sum_{I_{COL}=I_{MIN}}^{I_{MAX}} \text{Min}((J_{ROW}(I_{COL}) - BFP(I_{COL})), 0) \quad (65)$$

$$\Delta^- = \sum_{I_{COL}=I_{MIN}}^{I_{MAX}} \text{Min}((BFP(I_{COL}) - J_{ROW}(I_{COL})), 0) \quad (66)$$

Wherein $BFP(I_{COL})$ is the best fit polynomial model, e.g. the best-fit quadratic model 242, that provides a model of the row $J_{ROW}$ value of the distinct light spot images $24^{(q)}$ as a function of column $I_{COL}$ location, and $J_{ROW}(I_{COL})$ is the corresponding actual row $J_{ROW}$ value of the distinct light spot images $24^{(q)}$.

Figure 86:
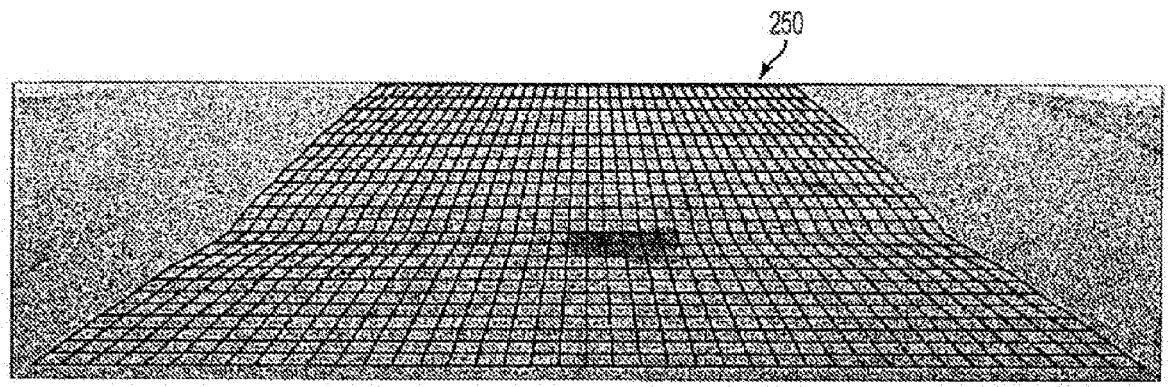
FIG. 86 illustrates a set of tiles, the corners of which are defined by the locations of light spots projected on a roadway surface.
Figure 87:
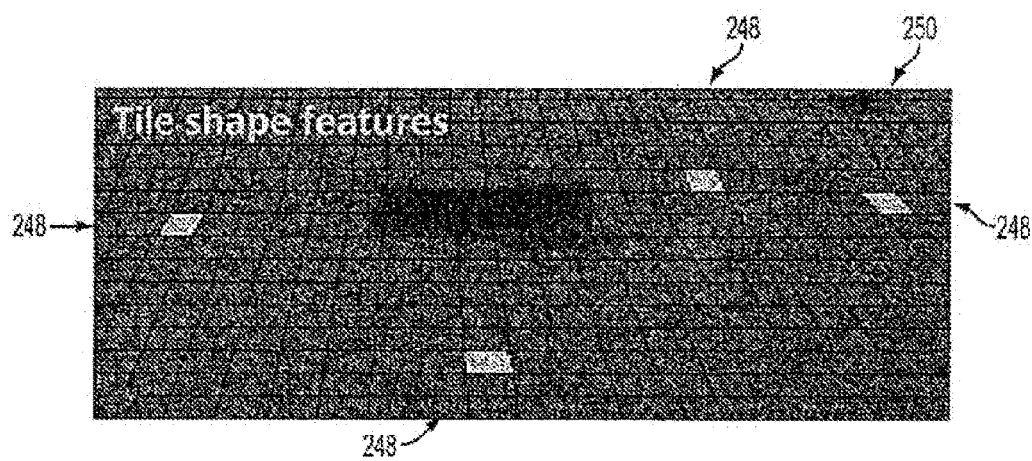
FIG. 87 illustrates a subset of tiles within the set of tiles illustrated in FIG. 86.
Figure 88:
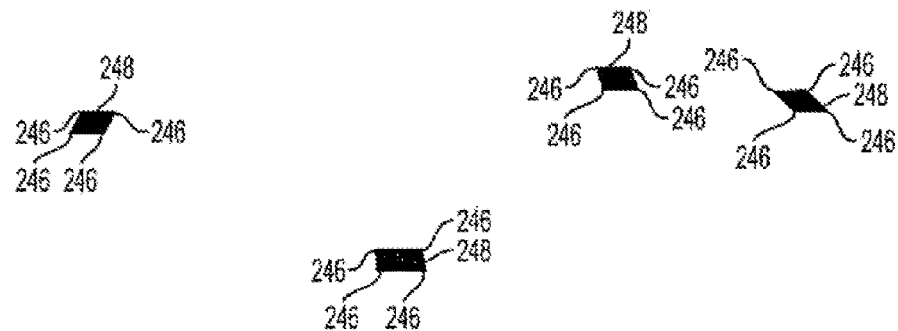
FIG. 88 illustrates the subset of tiles illustrated in FIG. 87 in isolation from the associated set of tiles.

If, from step (8220), the magnitude of the aggregate metric does not exceed a corresponding associated threshold—so as to indicate that the roadway surface 32' is relatively undisturbed,—then the light spot displacement analysis process 8200 proceeds to step (8226) which then returns to the object detection process 8100 as described hereinabove. Referring to FIG. 86, the intersections of best-fit quadratic models 242 and best fit cubic models 244 in combination for all of the distinct light spot images $24^{(q)}$ of the structured light pattern 16, 16.2 define the corners 246 of a plurality of tiles 248 of an associated grid 250, wherein the geometric features—e.g. shapes and sizes—of the tires 248 are responsive to the elevation profile 22' of the underlying surface 32, including the roadway surface 32' and any objects 20 thereupon. If, from step (8220), the magnitude of the aggregate metric exceeds an associated threshold so as to indicate that the roadway surface 32' has been disturbed, —then, in step (8222), a plurality of geometric features are calculated for the tiles 248, either for all or a subset corresponding to regions of greatest variance between the distinct light spot images $24^{(q)}$ and the associated best-fit quadratic 242 or cubic 244 model. These geometric features of a given tile 248 include, but are not necessarily limited to, the area of the tile 248, the magnitudes of the four interior angles, and the vertical slopes of the of the sides of tile 248. Then, in step (8224), the image 24 is classified, so as to provide for determining the vehicle pitch $\theta$ and roll $\beta$ angles, and so as to provide for object detection and discrimination, for example, in accordance with the above-described method of step (3826) of the roadway surface preview process 3800. For example, as part of the process of step (8224), the geometric features of selected tiles 248 can be compared with the corresponding features of corresponding tiles 248 as determined for a flat roadway surface 32' during step (8104) of the associated calibration process. For example, FIGS. 84 and 85 illustrates a subset of tiles 248 selected for analysis, with the tiles 248 respectively within and isolated from the associated grid 250, respectively.

Referring to FIGS. 89a-b, 90a-b, and 91a-b, the shape of the distinct light spot image(s) $24^{(q)}$ varies with the pitch and roll attitude of the vehicle 12, and accordingly, may be analyzed to provide measures of vehicle pitch angle $\theta$ and vehicle roll angle $\beta$. For example, FIG. 89a illustrates a distinct light spot image(s) $24^{(q)}$ of a distinct light spot 30, the latter of which is generated by a beam of light 52 projected from the vehicle 12 onto a roadway surface 32', with the vehicle 12 substantially level relative thereto, i.e. not subject to either roll or pitch. During either step (1912) of the first process 1900 illustrated in FIG. 19, or step (5902) of the first sub-process 5900 illustrated in FIG. 59, or step (8116) of the object detection process 8100 illustrated in FIG. 81, the associated binarized image 134 may be generated using an associated adaptive edge gradient method, for example, a Canny Edge Detection process, that can be then be modeled as an ellipse, for example, using a Hough transform, from which the orientation of the associated axes thereof provides for measures of vehicle pitch angle $\theta$ and vehicle roll angle $\beta$. For example, FIG. 83a illustrates a distinct light spot 30 having an edge profile 252 that is substantially circular. In comparison, FIGS. 90a and 90b respectively illustrate an image of a plurality of distinct light spots 30, and corresponding edge profiles 238, for a corresponding plurality of beams of light 52 projected from a vehicle 12 that is exhibiting a not insubstantial vehicle roll angle β, whereas FIGS. 91a and 91b respectively illustrate an image of a plurality of distinct light spots 30, and corresponding edge profiles 252, for a corresponding plurality of beams of light 52 projected from a vehicle 12 that is subject to a not insubstantial vehicle pitch angle θ. For example, a measure of vehicle pitch angle 61 may be used to estimate the down-range coordinate $Z_{World}$ of the associated distinct light spots 30 from a perturbation to the corresponding nominal locations thereof associated with the corresponding stored reference information 26.

Figure 80:
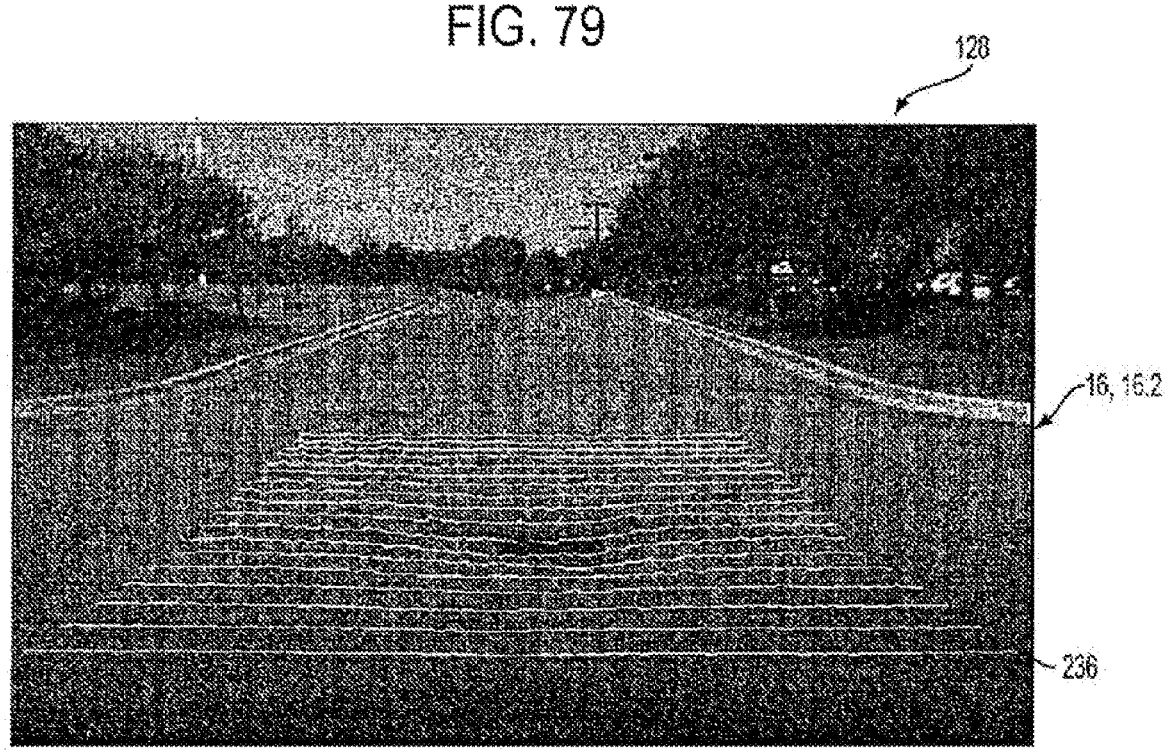
FIG. 80 illustrates halftone image of a visual scene rearward of a vehicle operating with a second aspect of a rearward-looking vehicular path sensing system projecting a plurality of scanned-structured light lines at respectively farther distances rearward from the vehicle.
Figure 92:
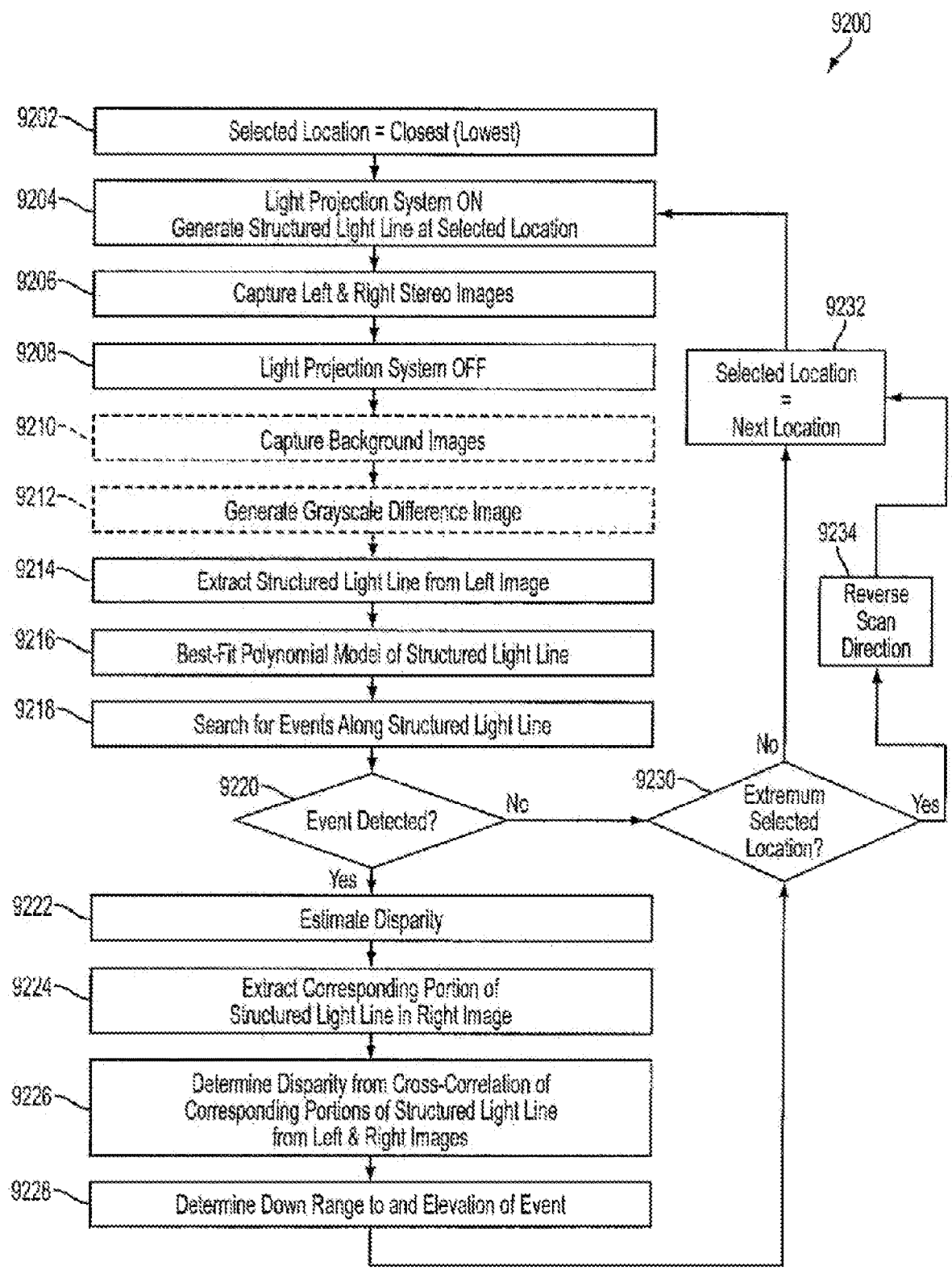
FIG. 92 illustrates a flow chart of a process of a vehicular path sensing system incorporating an associated stereo-vision system that provides for detecting objects along the path of a vehicle responsive to scanned-structured light lines projected across the path.

Referring again to FIGS. 77a-77d and to FIG. 80, and referring to FIG. 92, in accordance with another aspect, a vehicular path sensing systems 10 can be adapted to sense the path 14 of the vehicle 12 using a light projection system 18 that incorporates a scanning light line generator 234 that projects a plurality of scanned-structured light lines 236 at successively farther locations from the vehicle 12, and that incorporates a stereo vision system 36 so as to provide for determining the down-range $Z_{World}$ and elevation V World coordinates of portions of the scanned-structured light lines 236 that are associated with objects 20 on, or disturbances to, the roadway surface 32'.

Referring to FIG. 92, the associated path sensing process 9200 commences with step (9202) in which the location relatively closest (i.e. which is lowest in the left 24.1 and right 24.2 images) to the vehicle 12 is selected as the location where the scanned-structured light line 236 is to be projected. Then, in step (9204), the light projection system 18 is turned ON and the scanned-structured light line 236 is generated at the selected location, and in step (9206), the left 24.1 and right 24.2 images of the visual scene 128 are acquired by the left 38.1 and right 38.2 cameras of the stereo vision system 36, after which the light projection system 18 is turned OFF in step (9208). If the contrast between the image of the scanned-structured light line 236 and the associated background portion of the image 24 is less than a threshold, then, in step (9210), a second stereo image pair, i.e. left 130.1 and right 130.2 background images, is captured by each of the left 38.1 and right 38.2 cameras without the scanned-structured light line 236, after which, in step (9212), the left 130.1 and right 130.2 background images captured in step (9210) are subtracted from the left 24.1 and right 24.2 images captured in step (9206) so as to generate a corresponding set of left 132.1 and right 132.2 grayscale difference images. Alternatively, if the contrast is sufficiently great—for example, during nighttime operation, —then the left 24.1 and right 24.2 images are acquired continuously so as to provide for carrying out the remaining steps of the path sensing process 9200 for every image frame on the left 24.1 and right 24.2 images, rather than every other image frame on the left 132.1 and right 132.2 grayscale difference images calculated by subtracting left 130.1 and right 130.2 background images from corresponding left 132.1 and right 132.2 grayscale difference images, each of which is acquired at every other image frame.

Then, in step (9214), the image of the scanned-structured light line 236 is extracted from the one of the left 132.1, 24.1 or right 132.2, 24.2 images, for example, from the left image 132.1, 24.1, and in step (9216), the resulting image of the scanned-structured light line 236 is modeled with best-fit polynomial, for example, a best-fit quadratic, for example, as described hereinabove for step (8214) of the light spot displacement analysis process 8200 described hereinabove, and illustrated in FIGS. 84 and 85. Then, in step (9218), the best-fit polynomial model is compared with the original image of the scanned-structured light line 236 from which the model was derived, so as to determine if there are any locations therealong of sufficient difference therebetween—for example, using the above-described aggregate aggregate metrics Δ+, Δ− of equations (65) and (66)—so as to indicate the occurrence of an "event" that could be indicative of a substantial disturbance to the roadway surface 32' or the presence of an object 20 thereupon.

If, in step (9220), such an "event" is detected, then, in step (9222), the corresponding disparity DX associated with the down-range coordinate $Z_{World}$ of the selected location of the scanned-structured light line 236 is estimated, for example, using equation (22). Then, in step (9224), using the disparity DX estimated from step (9222), a portion of the image of the scanned-structured light line 236 from the other of the left 132.1, 24.1 or right 132.2, 24.2 images, for example, from the right image 132.2, 24.2, corresponding to the detected "event" is extracted therefrom, and in step (9226), the actual disparity DX is determined from a cross-correlation of the corresponding extracted portions of the scanned-structured light line 236 from the left 132.1, 24.1 and right 132.2, 24.2 images. For example, each portion of the scanned-structured light line 236 from each of the left 132.1, 24.1 and right 132.2, 24.2 images is represented as a row coordinate $J_{ROW}$ as a function of column coordinate $I_{COL}$, and the cross-correlation is given as a function of relative shift of the column coordinate $I_{COL}$, wherein the value of relative shift of the column coordinate $I_{COL}$ at the peak value of the cross-correlation function is then used to determine the corresponding actual disparity DX. Then, in step (9228), the down-range $Z_{World}$ and elevation $Y_{World}$ coordinates of the "event" are determined therefrom, for example, using equations (22) and (7), after which, in step (9230), if the currently selected location of the where the scanned-structured light line 236 is to be projected is not at an extremum, either the farthest or closest possible location, then in step (9232), the next farthest or closest location is selected, depending upon the associated scan direction, and the path sensing process 9200 repeats beginning with step (9204), otherwise, in step (9234), the scan direction is reversed, and the path sensing process 9200 then continues with step (9232), with the selected location of where the scanned-structured light line 236 is to be projected being selected along the scan direction. If, from step (9220), an "event" is not detected, then the process continues with step (9230). Accordingly, the scanned-structured light line 236 are alternately scanned from closest to farthest location, and then from farthest to closest location, in repetition.

Alternatively, the scanned-structured light lines 236 could be generated at all locations simultaneously—which would require a relatively greater amount of total laser power—in which case the path sensing process 9200 would be adapted to capture a single set of left 24.1 and right 24.2 images of all scanned-structured light lines 236, and then successively processing the associated scanned-structured light lines 236 from closest to farthest using the single set of left 24.1 and right 24.2 images before acquiring the next set of left 24.1 and right 24.2 images.

Figure 93:
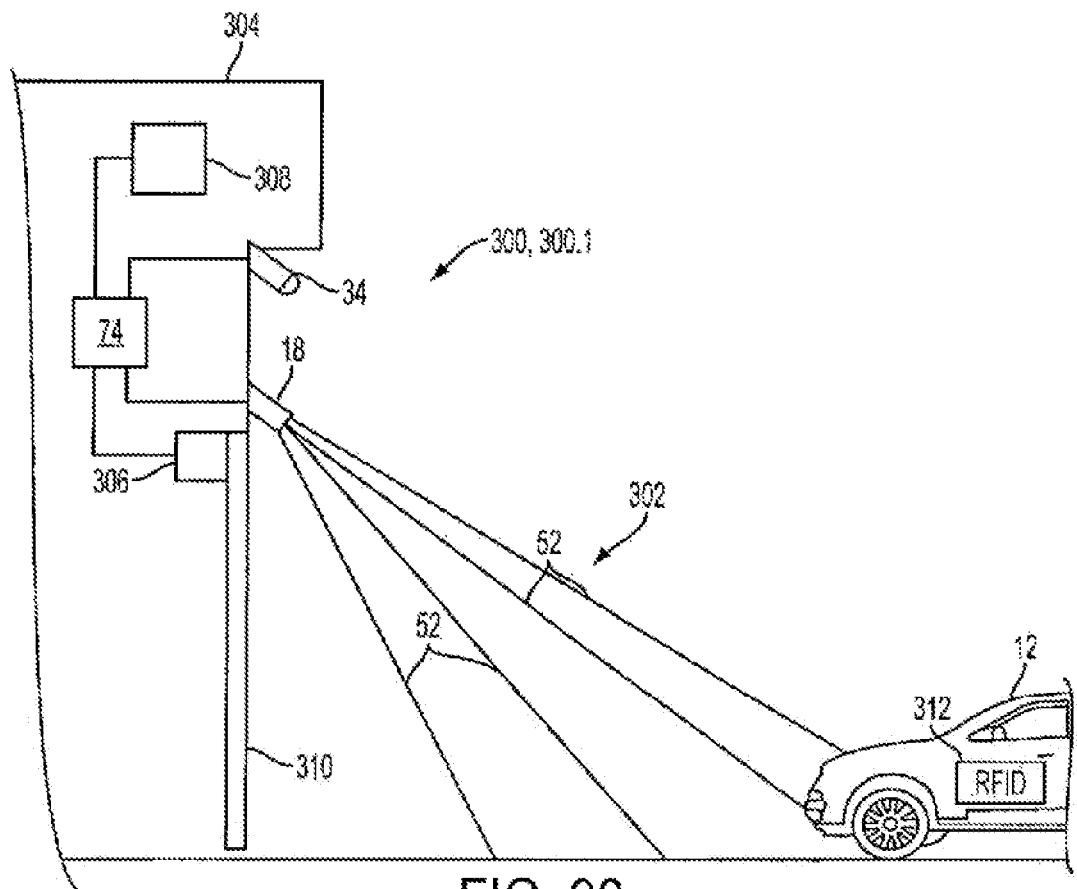
FIG. 93 illustrates a first embodiment of a path sensing system for detecting objects from a fixed location.
Figure 94:
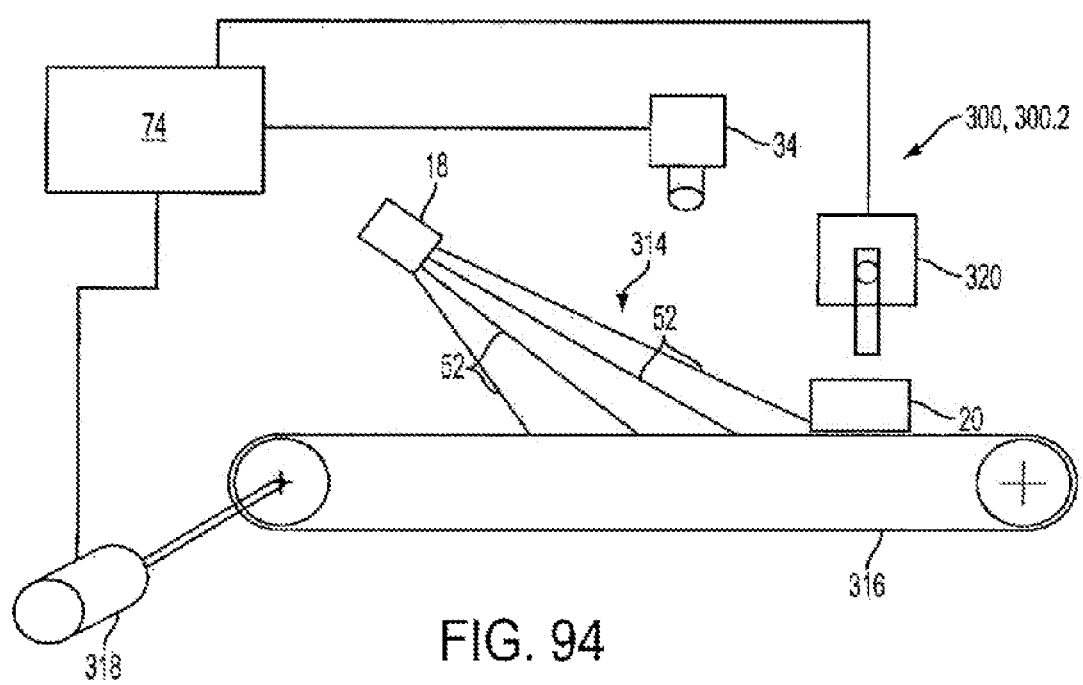
FIG. 94 illustrates a second embodiment of an object detection system for detecting objects from a fixed location.

Referring to FIGS. 92 and 94, the light projection system 18, imaging system 34 and associated image processing system 74 of the above-described vehicular path sensing systems 10 may be incorporated in a path sensing system 300 for sensing a path from a relatively fixed location. For example, referring to FIG. 93, a first embodiment of a path sensing system 300, 300.1 provides for detecting ingress to, or egress from, a region 302 proximate to a building 304, wherein the associated light projection system 18 and imaging system 34 of the path sensing system 300.1 depend from the building 304 at respective vertically-separated locations above the region 302 to be sensed. For example, the path sensing system 300, 300.1 may be adapted to control a garage-door opener 306 or to provide an input to an associated security system 308, so as to provide for automatically opening a garage door 310 responsive to an approach of an authorized vehicle 12, for example, where the authorization is verified by the security system 308 responsive to an RFID tag 312 in or on the vehicle 12, or responsive to some other identification signal provided by the vehicle 12. Furthermore, the path sensing system 300, 300.1 provides for identifying the size of objects 20 intruding into the region 302 proximate to a building 304 regardless of temperature and without requiring external sensors, to which the associated security system 308 can respond in a customary manner. Referring to FIG. 94, a second embodiment of a path sensing system 300, 300.2 provides for sensing a region 314 on a conveyer belt 316, for example, so as to provide for detecting objects 20 thereupon. In one set of embodiments, the path sensing system 300, 300.2 provides for controlling either or both a motor 318 driving the conveyer belt 316 or an object picking or selecting system 320 that provides for moving objects 20 on or from the conveyer belt 316 responsive to a detection thereof by the path sensing system 300, 300.2. Each of the above-described path sensing systems 300, 300.1, 300.2 is otherwise configured and operates in accordance with any of the above-described vehicular path sensing systems 10, 10.1, 10.2, but operating from a relatively fixed location.

Accordingly, the projected structured light patterns 16, 16.1, 16.2 of the above-described vehicular path sensing systems 10 and path sensing systems 300 provide for imposing a detectable structure on the visual scene 128, so as to provide for object detection under otherwise suboptimal viewing conditions, such as low ambient illumination; non-textured objects or obstacles, such as uniformly painted speed bumps or wet reflective roads; high speeds; defective windshield wipers; defective headlights; conditions that would otherwise lead to image blurring such as low ambient illumination, high exposure timing, and rolling shutter image read-out, and when used with a stereo vision system 36 provides for robust stereo matching, even under these conditions. The associated light projection system 18, 18.1, 18.2 could be adapted to operate at a plurality of different wavelengths, for example, using laser diodes 50″ of various colors, such as green, red, blue and purple, so as provide for further enhancing texture when using color-capable cameras 38.

It should be understood that either aspect of the vehicular path sensing system 10, i.e. using either a stereo-vision imaging system 36 or a mono-vision imaging system 34′, could be used at either the front or rear of the vehicle, and processing using a mono-vision imaging system 34′ could be used with one of the two cameras 38.1, 38.2 of a stereo vision system 36 in the event of a failure of the other of the two cameras 38.2, 38.1.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the" or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of the appended claims, and any and all equivalents thereof.

What is claimed is:

1. A method of sensing a physical feature of or along a path of a vehicle, comprising:
    a. projecting a structured light pattern from a vehicle onto a path upon which said vehicle may travel, so as to generate either a plurality of light lines or a plurality of light spots on said path, wherein at least two of said plurality of light lines or said plurality of light spots are at different down-range locations relative to said vehicle;
    b. capturing from said vehicle at least one image of said structured light pattern;
    c. comparing at least one image-space location of at least one light line or light spot of said plurality of light lines or said plurality of light spots with a corresponding at least one reference image-space location of a set of a plurality of predetermined reference image-space locations;
    d. determining if a light spot of said plurality of light spots, or a portion of a light line or said plurality of light lines, exists for which a corresponding said at least one image-space location is substantially different from said corresponding at least one reference image-space location; and
    e. associating a reference world-space down-range location of said corresponding at least one reference image-space location with said light spot or said portion of said light line or said plurality of light lines, wherein said at least one reference image-space location and said reference world-space down-range location are stored for each of said plurality of light lines or said plurality of light spots, and each said at least one reference image-space location and said reference world-space down-range location corresponds to when a corresponding said at least one light line or light spot, or a similar light line or light spot, is projected from said vehicle onto a nominal relatively flat surface in world-space.

2. The method of sensing a physical feature of or along a path of a vehicle as recited in claim 1, further comprising detecting the presence of either an object on or a disturbance of said path responsive to said at least one image-space location that is substantially different from said corresponding at least one reference image-space location, wherein a location of said object on or said disturbance of said path relative to said vehicle is responsive to a relatively closest down-range location for which said at least one image-space location is substantially different from said corresponding at least one reference image-space location.

3. The method of sensing a physical feature of or along a path of a vehicle as recited in claim 1, wherein the operation of comparing at least one said image-space location of at least one light spot of said plurality of light spots with said corresponding at least one reference image-space location of said set of said plurality of predetermined reference image-space locations comprises sequentially comparing for different down-range locations relative to said vehicle, beginning with a relatively farthest down-range location and continuing with successively closer down-range locations until comparing for a relatively closest down-range location.

4. The method of sensing a physical feature of or along a path of a vehicle as recited in claim 1, wherein the operation of comparing at least one said image-space location of at least one light spot of said plurality of light spots with said corresponding at least one reference image-space location of said set of said plurality of predetermined reference image-space locations comprises sequentially comparing for different down-range locations relative to said vehicle, beginning with a relatively closest down-range location and continuing with successively farther down-range locations until comparing for a relatively farthest down-range location.

5. The method of sensing a physical feature of or along a path of a vehicle as recited in claim 1, wherein the operation of comparing at least one said image-space location of at least one light spot of said plurality of light spots with said corresponding at least one reference image-space location of said set of said plurality of predetermined reference image-space locations comprises:
   a. sequentially comparing for different down-range locations relative to said vehicle, beginning with a relatively farthest down-range location and continuing with successively closer down-range locations until comparing for a relatively closest down-range location, then
   b. sequentially comparing for different down-range locations relative to said vehicle, beginning with a relatively closest down-range location and continuing with successively farther down-range locations until comparing for a relatively farthest down-range location, then
   c. performing steps a and b at least once.

6. The method of sensing a physical feature of or along a path of a vehicle as recited in claim 1, further comprising, for each light spot of said plurality of light spots:
   a. locating a plurality of pixels associated with said light spot in said at least one image; and
   b. determining a location of said light spot in said at least one image responsive to said plurality of pixels associated with said light spot in said at least one image.

7. The method of sensing a physical feature of or along a path of a vehicle as recited in claim 6, wherein the operation of locating said plurality of pixels associated with said light spot in said at least one image for each light spot of said plurality of light spots comprises searching a predetermined region-of-interest in said at least one image associated with said light spot.

8. The method of sensing a physical feature of or along a path of a vehicle as recited in claim 7, further comprising determining a pitch angle of said vehicle responsive to at least one image-space separation of at least one pair of said plurality of light spots, wherein each said light spot of said at least one pair of said plurality of light spots are at different world-space down-range locations and are at a substantially common world-space cross-range location, and a location of said predetermined region-of-interest in said at least one image is modified responsive to said pitch angle.

9. The method of sensing a physical feature of or along a path of a vehicle as recited in claim 6, wherein the operation of determining said location of said light spot in said at least one image comprises successively calculating centroids of each of a plurality of subsets of said plurality of pixels associated with said light spot in said at least one image so as to generate a single centroid that is representative of said location of said light spot in said at least one image.

10. The method of sensing a physical feature of or along a path of a vehicle as recited in claim 6, wherein the operation of determining said location of said light spot in said at least one image comprises:
   a. using an adaptive gradient method to determine an edge profile of said light spot from said plurality of pixels associated with said light spot in said at least one image; and
   b. calculating said location of said light spot in said at least one image responsive to said edge profile.

11. The method of sensing a physical feature of or along a path of a vehicle as recited in claim 10, wherein the operation of calculating said location of said light spot in said at least one image comprises calculating either a centroid of said edge profile, an average pixel location of said edge profile, or a median pixel location of said edge profile.

12. The method of sensing a physical feature of or along a path of a vehicle as recited in claim 10, further comprising:
   a. determining a best-fit ellipse associated with said edge profile; and
   b. determining at least one of a pitch angle or a roll angle of said vehicle responsive to an orientation of said best-fit ellipse in said at least one image.

13. The method of sensing a physical feature of or along a path of a vehicle as recited in claim 6, wherein the operation of determining said location of said light spot in said at least one image comprises successively binning said plurality of pixels associated with said light spot in said at least one image so as to generate a single binned pixel that is representative of said location of said light spot in said at least one image.

14. The method of sensing a physical feature of or along a path of a vehicle as recited in claim 6, wherein the operation of determining said location of said light spot in said at least one image comprises:
   a. locating a plurality of edge points of said light spot, wherein each edge point of said plurality of edge points is located responsive to a Savitzky-Golay filtering process of said plurality of pixels along a corresponding polar direction relative to a nominal center of said plurality of pixels, and
   b. determining said location of said light spot in said at least one image from a centroid of said plurality of edge points.

15. The method of sensing a physical feature of or along a path of a vehicle as recited in claim 1, further comprising:
   a. determining a first aggregate metric responsive to a composite displacement of said plurality of light spots above said nominal relatively flat surface;
   b. determining a second aggregate metric responsive to a composite displacement of said plurality of light spots below said nominal relatively flat surface; and
   c. responsive to said first and second aggregate metrics, determining whether or not there is likely a substantial object on said path or a substantial disturbance of said path.

16. The method of sensing a physical feature of or along a path of a vehicle as recited in claim 1, further comprising:
   a. fitting at least one first polynomial to a corresponding at least one row of said plurality of light spots in image space; and
   b. determining a first aggregate metric of said at least one first polynomial responsive to a degree to which said at least one first polynomial mathematically fits said corresponding at least one row of said plurality of light spots in said image space.

17. The method of sensing a physical feature of or along a path of a vehicle as recited in claim 16, wherein said at least one first polynomial is quadratic.

18. The method of sensing a physical feature of or along a path of a vehicle as recited in claim 1, further comprising:
   a. fitting at least one second polynomial to a corresponding at least one column of said plurality of light spots in image space; and
   b. determining a second aggregate metric of said at least one second polynomial responsive to a degree to which said at least one second polynomial mathematically fits said corresponding at least one column of said plurality of light spots in said image space.

19. The method of sensing a physical feature of or along a path of a vehicle as recited in claim 18, wherein said at least one second polynomial is cubic.

20. The method of sensing a physical feature of or along a path of a vehicle as recited in claim 1, further comprising:
   a. fitting at least one first polynomial to a corresponding at least one row of said plurality of light spots in image space;
   b. determining a first aggregate metric of said at least one first polynomial responsive to a degree to which said at least one first polynomial mathematically fits said corresponding at least one row of said plurality of light spots in said image space;
   c. fitting at least one second polynomial to a corresponding at least one column of said plurality of light spots in image space;
   d. determining a second aggregate metric of said at least one second polynomial responsive to a degree to which said at least one second polynomial mathematically fits said corresponding at least one column of said plurality of light spots in said image space; and
   e. responsive to said first and second aggregate metrics, determining whether or not there is likely a substantial object on said path or a substantial disturbance of said path.

21. The method of sensing a physical feature of or along a path of a vehicle as recited in claim 1, further comprising:
   a. fitting at least one first polynomial to a corresponding at least one row of said plurality of light spots in image space;
   b. determining a first aggregate metric of said at least one first polynomial responsive to a degree to which said at least one first polynomial mathematically fits said corresponding at least one row of said plurality of light spots in said image space;
   c. fitting at least one second polynomial to a corresponding at least one column of said plurality of light spots in image space;
   d. determining a second aggregate metric of said at least one second polynomial responsive to a degree to which said at least one second polynomial mathematically fits said corresponding at least one column of said plurality of light spots in said image space;
   e. determining at least one feature related to a corresponding at least one tile, wherein said at least one tile is bounded by said at least one first polynomial for corresponding to a first row of said plurality of light spots, said at least one first polynomial corresponding to a second row of said plurality of light spots, said at least one second polynomial corresponding to a first column of said plurality of light spots, and said at least one second polynomial corresponding to a second column of said plurality of light spots, wherein said first and second rows of said plurality of light spots are adjacent to one another, and said first and second columns of said plurality of light spots are adjacent to one another; and
   f. detecting or discriminating a physical feature of or along said path in said at least one image responsive to said at least one feature.

22. The method of sensing a physical feature of or along a path of a vehicle as recited in claim 21, wherein said at least one feature is selected from the group consisting of an area of said at least one tile, a set of four interior angles of said at least one tile, and a pair of vertical slopes of said at least one tile.

23. The method of sensing a physical feature of or along a path of a vehicle as recited in claim 1, wherein said structured light pattern comprises said plurality of light lines, each line of said plurality of light lines is oriented substantially transverse to said path of said vehicle, and each said line of said plurality of light lines is separated in down-range from one another.

* * * * *